US008306576B2

(12) United States Patent
Cho et al.

(10) Patent No.: US 8,306,576 B2
(45) Date of Patent: Nov. 6, 2012

(54) MOBILE TERMINAL CAPABLE OF PROVIDING HAPTIC EFFECT AND METHOD OF CONTROLLING THE MOBILE TERMINAL

(75) Inventors: Seon Hwi Cho, Seoul (KR); Tae Yong Kim, Seoul (KR); Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 342 days.

(21) Appl. No.: 12/473,061

(22) Filed: May 27, 2009

(65) Prior Publication Data

US 2009/0325647 A1    Dec. 31, 2009

(30) Foreign Application Priority Data

Jun. 27, 2008  (KR) .................... 10-2008-0061813
Aug. 21, 2008  (KR) .................... 10-2008-0082020

(51) Int. Cl.
*H04M 1/00*  (2006.01)
*H04B 1/38*  (2006.01)
(52) U.S. Cl. .................... 455/567; 379/418; 455/566
(58) Field of Classification Search ............ 455/567; 379/418
See application file for complete search history.

(56) References Cited

U.S. PATENT DOCUMENTS

| 7,801,569 | B1* | 9/2010 | Zellner ............... 455/567 |
| 2005/0245296 | A1* | 11/2005 | Hong et al. ............ 455/575.3 |
| 2006/0238531 | A1* | 10/2006 | Wang ................. 345/211 |
| 2008/0090619 | A1* | 4/2008 | Jong et al. ............ 455/566 |
| 2008/0216324 | A1* | 9/2008 | Tauer ................. 30/42 |
| 2009/0215432 | A1* | 8/2009 | Matsuoka ............. 455/412.2 |

* cited by examiner

*Primary Examiner* — Christopher M Brandt
*Assistant Examiner* — Jing Gao
(74) *Attorney, Agent, or Firm* — Birch, Stewart, Kolasch & Birch, LLP

(57) ABSTRACT

A method of controlling a mobile terminal and which includes storing a plurality of haptic vibrations respectively representing different functions performed in a single application to be executed on the mobile terminal, executing a function for the single application is on the mobile terminal, selecting a corresponding haptic vibration that represents the function executing on the terminal, and generating the selected corresponding haptic vibration using a plurality of vibration modules disposed on the mobile terminal in which a first vibration module is activated and at least one second vibration module is activated to represent the function being executed on the mobile terminal.

20 Claims, 45 Drawing Sheets

(a)　　　　　(b)　　　　　(c)

(a)   (b)

| TYPES OF OPERATION | SPEED OF CHANGE OF IMAGE | RATE OF CHANGE OF IMAGE |
|---|---|---|
| OPERATION TYPE | OPERATION TYPE | OPERATION TYPE |
| CONNECTING CALL | 1 | 10% |
| CONNECTING BLUETOOTH | 2 | 20% |
| RECEIVING FILE | 3 | 30% |
| SENDING FILE | 4 | 40% |
| ... | ... | ... |

(a)      (b)      (c)

(a)          (b)

(c)

(b)

(a)

(a)          (b)

(a)  (b)  (c)

RATE OF CHANGE

| CLASSIFY |
|----------|
| 10% |
| 20% |
| 30% |
| 40% |
| ... |

OBJECT SIZE

| CLASSIFY |
|----------|
| 1/N |
| 2/N |
| 3/N |
| 4/N |
| ... |

(a)                                    (b)

(a)                                    (b)

(a)              (b)

(a)              (b)

(a)   (b)

(a)   (b)

(a)             (b)

(a)

(b)

(a)

(b)

MOVE IMAGE

OUTPUT VIBRATION (a)

VIBRATION INTENSITY OF FIRST VIBRATION DEVICE

VIBRATION INTENSITY OF SECOND VIBRATION DEVICE (b)

ENLARGE IMAGE (OR ZOOM-IN)

DRIVE THIRD VIBRATION DEVICE

REDUCE IMAGE (OR ZOOM-OUT)

DRIVE FIRST AND SECOND VIBRATION DEVICE (a) ENLARGE IMAGE (OR ZOOM-IN)

(B) REDUCE IMAGE (OR ZOOM-OUT)

MOBILE TERMINAL CAPABLE OF PROVIDING HAPTIC EFFECT AND METHOD OF CONTROLLING THE MOBILE TERMINAL

CROSS-REFERENCE TO A RELATED APPLICATION

This application claims the priority benefit of Korean Patent Application No. 10-2008-0061813, filed on Jun. 27, 2008 and No. 10-2008-82020, filed on Aug. 21, 2008, in the Korean Intellectual Property Office, the disclosures of which are incorporated herein by reference.

BACKGROUND OF THE INVENTION

1. Field of the Invention

The present invention relates to a mobile terminal and corresponding method for providing various haptic effects in response to variations in a displayed screen image or an operating state of the terminal.

2. Description of the Related Art

Mobile terminals are portable devices, which can provide users with various services such as a voice calling service, a video calling service, an information input/output service, and a data storage service. Mobile terminals also now provide additional services allowing users to capture photos or moving pictures, play music files or moving image files, play game programs, receive broadcast programs and use wireless Internet services. Mobile terminals thus now function as multimedia players.

Mobile terminals also include complex user interface (UI) environments, in which users are allowed to search for and choose desired functions. In addition, some mobile terminals include a double-sided liquid crystal display (LCD) or a full touch screen. However, because the mobile terminals are small in size, there is a restriction in allocating sufficient space for a UI device (such as a display device or a keypad). In addition, the GUIs provided with the mobile terminals are also complicated and sometimes tedious to use because of the large number of menus and icons that are included and have to be executed.

SUMMARY OF THE INVENTION

Accordingly, one object of the present invention is to address the above-noted and other problems.

Another object of the present invention is to provide a mobile terminal and corresponding method that provides various haptic effects so as to allow a user to easily recognize variations in a screen image displayed or an operating state with his or her sense of touch.

To achieve these and other advantages and in accordance with the purpose of the present invention, as embodied and broadly described herein, the present invention provides in one aspect a method of controlling a mobile terminal and which includes storing a plurality of haptic vibrations respectively representing different functions performed in a single application to be executed on the mobile terminal, executing a function for the single application on the mobile terminal, selecting a corresponding haptic vibration that represents the function executing on the terminal, and generating the selected corresponding haptic vibration using a plurality of vibration modules disposed on the mobile terminal in which a first vibration module is activated and at least one second vibration module is activated to represent the function being executed on the mobile terminal.

In another aspect, the present invention provides a mobile terminal including a wireless communication unit configured to wirelessly communicate with at least one other terminal, a memory configured to store a plurality of haptic vibrations respectively representing different functions performed in a single application to be executed on the mobile terminal, a plurality of vibration modules disposed on the mobile terminal, and a controller configured to select a corresponding haptic vibration that represents a function of the single application executing on the terminal, and to activate a first vibration module and at least one second vibration module to represent the function of the single application being executed on the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown. In addition, the term 'mobile terminal' in the following description refers to a mobile phone, a smart phone, a laptop book computer, a digital broadcast receiver, a personal digital assistant (PDA), a portable multimedia player (PMP), a navigation device, etc.

Figure 1:
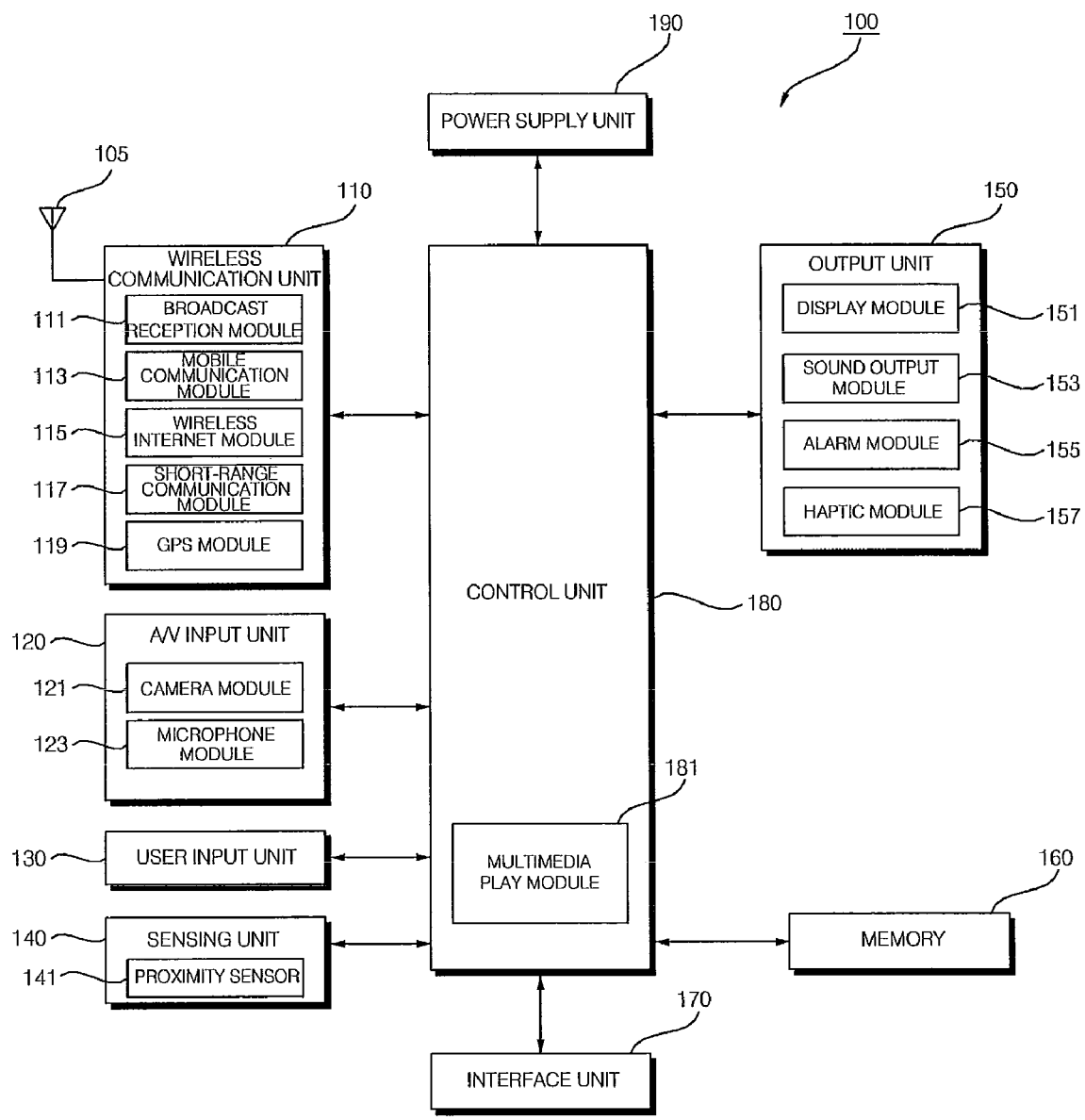
FIG. 1 is a block diagram illustrating a mobile terminal according to an embodiment of the present invention.

FIG. 1 is a block diagram illustrating a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a control unit 180, and a power supply unit 190. Two or more of the wireless communication unit 110, the A/V input unit 120, the user input unit 130, the sensing unit 140, the output unit 150, the memory 160, the interface unit 170, the control unit 180, and the power supply unit 190 may be incorporated into a single unit, or some of the units may be divided into two or more smaller units.

In addition, in FIG. 1, the wireless communication unit 110 includes a broadcast reception module 111, a mobile communication module 113, a wireless Internet module 115, a short-range communication module 117, and a global positioning system (GPS) module 119. The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this instance, the broadcast-related information may be received by the mobile communication module 113, rather than by the broadcast reception module 111. The broadcast-related information may come in various forms, for example, an electronic program guide (EPG) of the digital multimedia broadcasting (DMB) system or an electronic service guide (ESG) of the digital video broadcast-handheld (DVB-H) system.

Further, the broadcast reception module 111 may receive the broadcast signal using various broadcasting systems such as the digital multimedia broadcasting-terrestrial (DMB-T) system, the digital multimedia broadcasting-satellite (DMB-S) system, the media forward link only (MediaFLO) system, the DVB-H system, and the integrated services digital broadcast-terrestrial (ISDB-T) system. In addition, the broadcast reception module 111 may be configured to be suitable for nearly all types of broadcasting systems other than those set forth herein. The broadcast signal and/or the broadcast-related information received by the broadcast reception module 111 may also be stored in the memory 160. In addition, the mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

Further, the wireless Internet module 115 is a module for wirelessly accessing the Internet, and may be embedded in the mobile terminal 100 or be installed in an external device. Also, the short-range communication module 117 is a module for short-range communication, and may use various short-range communication techniques such as Bluetooth, radio frequency identification (RFID), infrared data association (IrDA), ultra wideband (UWB), and ZigBee.

In addition, the GPS module 119 receives position information from a plurality of GPS satellites, and the A/V input unit 120 is used to receive audio signals or video signals. In FIG. 1, the A/V input unit 120 includes a camera module 121 and a microphone module 123. The camera module 121 processes various image frames such as still images or moving images captured by an image sensor during a video call mode or an image capturing mode. The image frames processed by the camera module 121 may be displayed by a display module 151 included in the output unit 150. Further, the image frames processed by the camera module 121 may be stored in the memory 160 or may be transmitted outside the mobile terminal 100 through the wireless communication unit 110. The mobile terminal 100 may also include two or more camera modules 121.

In addition, the microphone module 123 receives external sound signals during a call mode, a recording mode, or a voice recognition mode with the use of a microphone and converts the sound signals into electrical sound data. In the call mode, the mobile communication module 113 converts the electrical sound data into data that can be readily transmitted to a mobile communication base station and then outputs the data obtained by the conversion. The microphone module 123 may also use various noise removal algorithms to remove noise that may be generated during the reception of external sound signals. Further, the user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

In addition, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slide-type mobile phone, the sensing unit 140 can determine whether the mobile terminal 100 is opened or closed. In addition, the sensing unit 140 can determine whether the mobile terminal 100 is powered by the power supply unit 190 and whether the interface unit 170 is connected to an external device. In FIG. 1, the sensing unit 140 also includes a proximity sensor 141 that determines whether there is an entity nearby and approaching the mobile terminal 100 without any mechanical contact with the entity. More specifically, the proximity sensor 141 can detect an entity that is nearby and approaching by detecting a change in an alternating magnetic field or the rate of change of static capacitance. The sensing unit 140 may also include two or more proximity sensors 141.

Also, the output unit 150 may output audio signals, video signals and alarm signals. The output unit 150 in FIG. 1 includes the display module 151, a sound output module 153, an alarm module 155, and a haptic module 157. The display module 151 displays various information processed by the mobile terminal 100. For example, if the mobile terminal 100 is in a call mode, the display module 151 can display a user interface (UI) or a graphic user interface (GUI) for making or receiving a call. If the mobile terminal 100 is in a video call mode or an image capturing mode, the display module 151 can display a UI or a GUI for capturing or receiving images.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may also include two or more display modules 151. For example, the mobile terminal 100 may include an external display module and an internal display module.

Further, the sound output module 153 may output audio data received by the wireless communication unit 110 during a call reception mode, a call mode, a recording mode, a voice recognition mode, or a broadcast reception mode or may output audio data present in the memory 160. In addition, the sound output module 153 may output various sound signals associated with the functions of the mobile terminal 100 such as receiving a call or a message. The sound output module 153 may also include a speaker and a buzzer. In addition, the alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may also output a signal upon receiving a call signal or a message. In addition, the alarm module 155 may receive a key signal and may output a signal as feedback to the key signal. Thus, once a signal is output by the alarm module 155, the user can recognize that an event has occurred. A signal for notifying the user of the occurrence of an event may also be output by the display module 151 or the sound output module 153.

In addition, the haptic module 157 can provide various haptic effects (such as vibration) that can be perceived by the user. If the haptic module 157 generates vibration as a haptic effect, the intensity and the pattern of vibration generated by the haptic module 157 may be altered in various manners. The haptic module 157 can also synthesize different vibration effects and output the result of the synthesization. Alternatively, the haptic module 157 can sequentially output different vibration effects. Further, the haptic module 157 can provide various haptic effects, other than vibration, by using a pin array that moves perpendicularly to a contact skin surface, by injecting or sucking in air through an injection hole or a suction hole, by stimulating the surface of the skin, by contacting an electrode, by using an electrostatic force, or by realizing the sense of heat or cold using a device capable of absorbing heat or generating heat. The haptic module 157 can also be configured to enable the user to recognize a haptic effect using the kinesthetic sense of the fingers or the arms. The mobile terminal 100 may also include two or more haptic modules 157.

Further, the memory 160 stores various programs for the operation of the control unit 180. In addition, the memory 160 temporarily stores various data such as a phonebook, messages, still images, or moving images. The memory 160 may also include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may also operate a web storage, which performs the functions of the memory 160 on the Internet.

In addition, the interface unit 170 can interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 can also receive data from an external device or be powered by an external device. The interface unit 170 can transmit data provided by an external device to other components in the mobile terminal 100 or transmit data provided by other components in the mobile terminal 100 to an external device.

In addition, the control unit 180 controls the overall operations of the mobile terminal 100. For example, the control unit 180 performs various control operations regarding making/receiving a voice call, transmitting/receiving data, or making/receiving a video call. In FIG. 1, the control unit 180 includes a multimedia play module 181, which plays multimedia data. The multimedia play module 181 may be implemented as a hardware device and may be installed in the control unit 180. Alternatively, the multimedia play module 181 may be implemented as a software program. Further, the power supply unit 190 is supplied with power by an external power source or an internal power source and supplies power to other components in the mobile terminal 100. The mobile terminal 100 may include a wired/wireless communication system and a satellite-based communication system, and may be configured to be able to operate in a communication system transmitting data as frames or packets.

Figure 2:
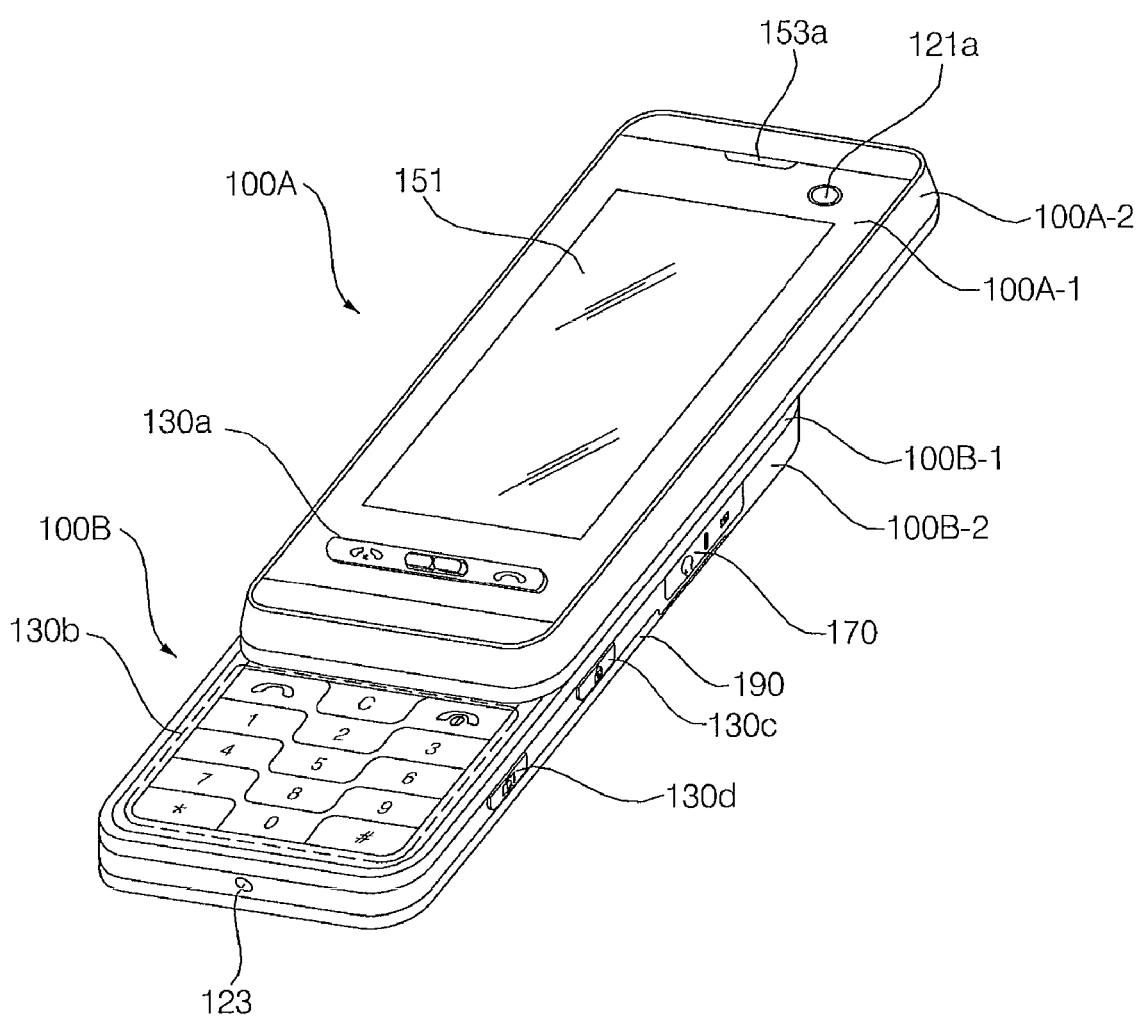
FIG. 2 is a front perspective view illustrating the mobile terminal shown in FIG. 1.
Figure 3:
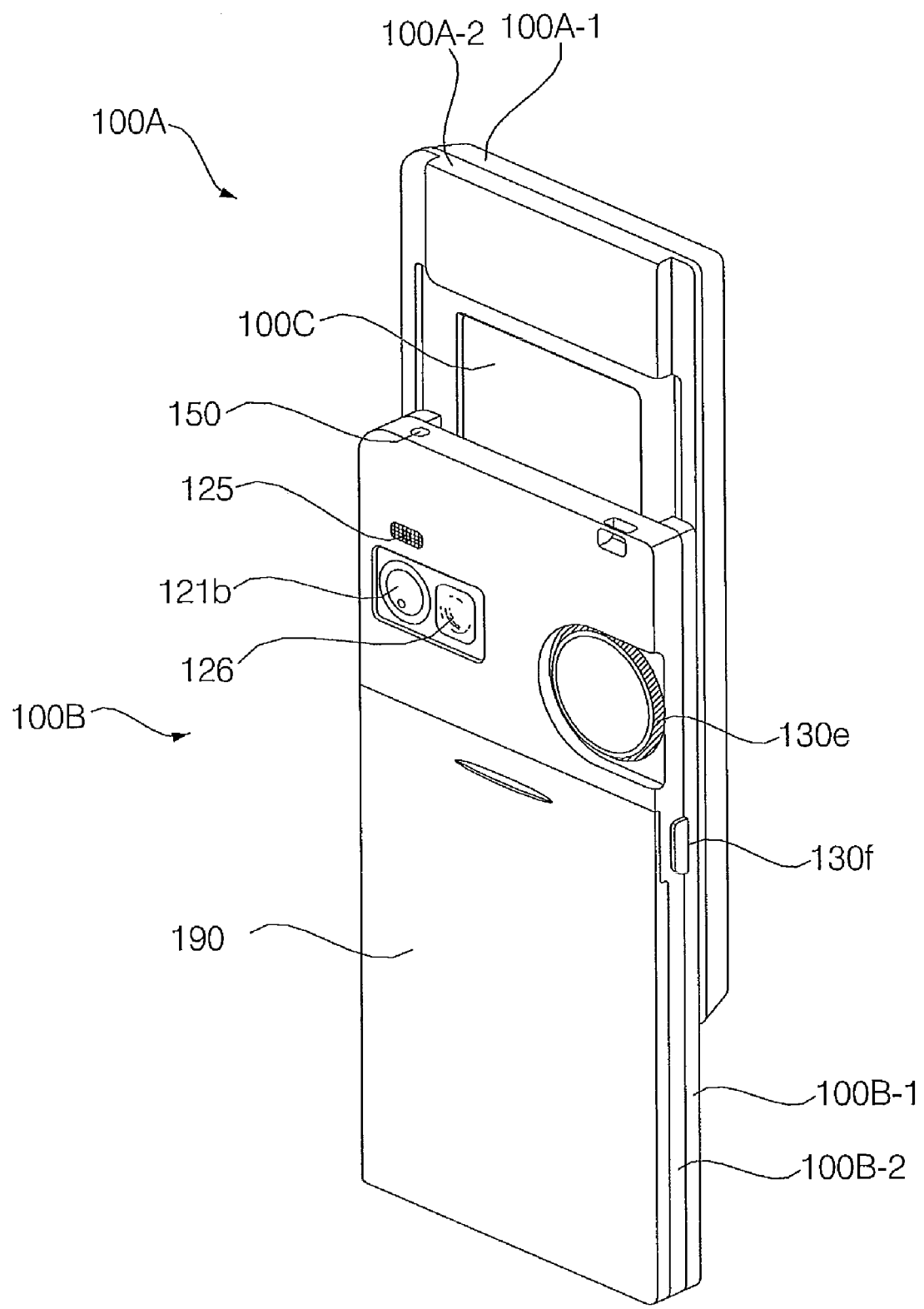
FIG. 3 is a rear perspective view illustrating the mobile terminal shown in FIG. 1.

An exterior of the mobile terminal 100 will now be described in detail with reference to FIGS. 2 and 3. In FIGS. 2 and 3, the mobile terminal 100 is a slide-type mobile phone. However, the present invention is not restricted to a slide-type mobile phone, and can be applied to various mobile phones, other than a slide-type mobile phone. First, FIG. 2 is a front perspective view illustrating the mobile terminal 100 shown in FIG. 1. Referring to FIG. 2, the mobile terminal 100 includes a first body 100A and a second body 100B configured to be able to slide in at least one direction along the first body 100A. When the first body 100A overlaps the second body 100B, the mobile terminal 100 is closed, and when the first body 100A exposes at least part of the second body 100B, the mobile terminal 100 is opened. Also, when the mobile terminal 100 is closed, the mobile terminal 100 generally operates in a standby mode, and may be manually released from the standby mode by the user. When the mobile terminal 100 is opened, the mobile terminal 100 generally operates in a call mode, and may be placed in a standby mode either manually by the user or automatically after the lapse of a predetermined amount of time.

Further, as shown in FIG. 2, the first body 100A includes a first front case 100A-1 and a first rear case 100A-2, which form the exterior of the first body 100A. Various electronic products are also installed in the empty space between the first front case 100A-1 and the first rear case 100A-2. At least one intermediate case may be additionally disposed between the first front case 100A-1 and the first rear case 100A-2. In addition, the first front case 100A-1 and the first rear case 100A-2 may be formed of a synthetic resin through injection molding, or be formed of a metal such as stainless steel (STS) or titanium (Ti).

In addition, the display module 151, a first sound module 153a, a first camera 121a and a first user input module 130a are disposed in the first body 100A, and particularly, in the first front case 100A-1. The display module 151 may include an LCD or an OLED, which visually represents information. Also, because a touch pad is configured to overlap the display module 151 and thus to realize a layer structure, the display module 151 may serve as a touch screen. Thus, it is possible for the user to input information to the display module 151 simply by touching the display module 151.

Further, the first sound module 153a may be implemented as a receiver or a speaker, and the first camera 121a may be configured to capture a still image or a moving image of the user. The second body 100B also includes a second front case 100B-1 and a second rear case 100B-2, which form the exterior of the second body 100B. As shown, a second user input module 130b is disposed at the front of the second body 100B, and particularly, at the front of the second front case 100B-1. Third and fourth user input modules 130c and 130d, the microphone 123 and the interface unit 170 are also disposed in the second front case 100B-1 or the second rear case 100B-2.

In addition, the first through fourth user input modules 130a through 130d may be collectively referred to as the user input unit 130. The user input unit 130 may also adopt various manipulation methods that provide tactile feedback to the user. For example, the user input unit 130 may be implemented as a dome switch or a touch pad which receives a command or information upon being pushed or touched by the user. Alternatively, the user input unit 130 may be implemented as a wheel, a jog dial, or a joystick. The first user input module 130a may also allow the user to input such commands as 'start', 'end', and 'scroll', and the second user input module 130b may allow the user to input numbers, characters or symbols. The third and fourth user input modules 130c and 130d may serve as hot keys for activating certain functions of the mobile terminal 100.

In addition, the microphone 123 is configured to receive the voice of the user or other sounds, and the interface unit 170 may also serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100. The interface unit 170 may also be a SIM or a UIM or may be a card socket for an exterior-type card such as a memory card for storing data. Further, the power supply unit 190 is inserted in the second rear case 100B-2 and may be a rechargeable battery and be coupled to the second body 100B so as to be able to be attached to or detached from the second body 100B.

Next, FIG. 3 is a rear perspective view illustrating the mobile terminal 100 shown in FIG. 2. Referring to FIG. 3, a fifth user input module 130e and a second camera 121b are disposed at the rear of the second rear case 100B-2 of the second body 100B. The fifth user input module 130e in FIG. 3 is a wheel type input unit. In addition, a sixth user input module 130f is disposed on a lateral side of the second body 100B. The second camera 121b also has a different photographing direction from that of the first camera 121a shown in FIG. 2. In addition, the number of pixels of the second camera 121b may be different from the number of pixels of the first camera 121a. For example, the first camera 121a may be used to capture an image of the face of the user and then transmit the captured image during a video call. Thus, a low-pixel camera module may be used as the first camera 121a. In addition, the second camera 121b may be used to capture an image of an ordinary subject. Given that images captured by the second camera 121b generally do not need to be transmitted, a high-pixel camera module may be used as the second camera 121b.

A camera flash 125 and a mirror 126 are also disposed near the second camera 121b. The camera flash 125 illuminates a subject when the second camera 121b captures an image of the subject, and the user may look in the mirror 126 for taking a self shot. A second sound output module may also be provided in the second rear case 100B-2, and be used to realize a stereo function along with the first sound output module 153a. The second sound output module may also be used during a speaker-phone mode. Further, an antenna for receiving a broadcast signal may also be disposed on one side of the second rear case 100B-2, and be installed so as to be able to be retracted from the second body 100B-2. As shown in FIG. 3, a slider module 100C is disposed on the first rear case 100A-2 of the first body 100A, and couples the first body 100A and the second body 100B so that the first body 100A can slide along the second body 100B. The slider module 100C may also be partially exposed by the second front case 100B-1.

In addition, the second camera 121b is illustrated in FIG. 3 as being disposed on the second body 100B, but the present invention is not restricted to this arrangement. For example, at least one of the antenna, the second camera 121b and the camera flash 125 may be mounted on the first body 100A, and particularly, the first rear case 100A-2 of the first body 100A. In this instance, whichever of the antenna, the second camera 121b and the camera flash 125 is mounted on the first rear case 100A-2 may be protected by the second body 100B when the mobile terminal 100 is closed. The first camera 121a may also be able to rotate and thus to cover the photographing direction of the second camera 121a. In this instance, the second camera 121b may be optional.

Figure 4:
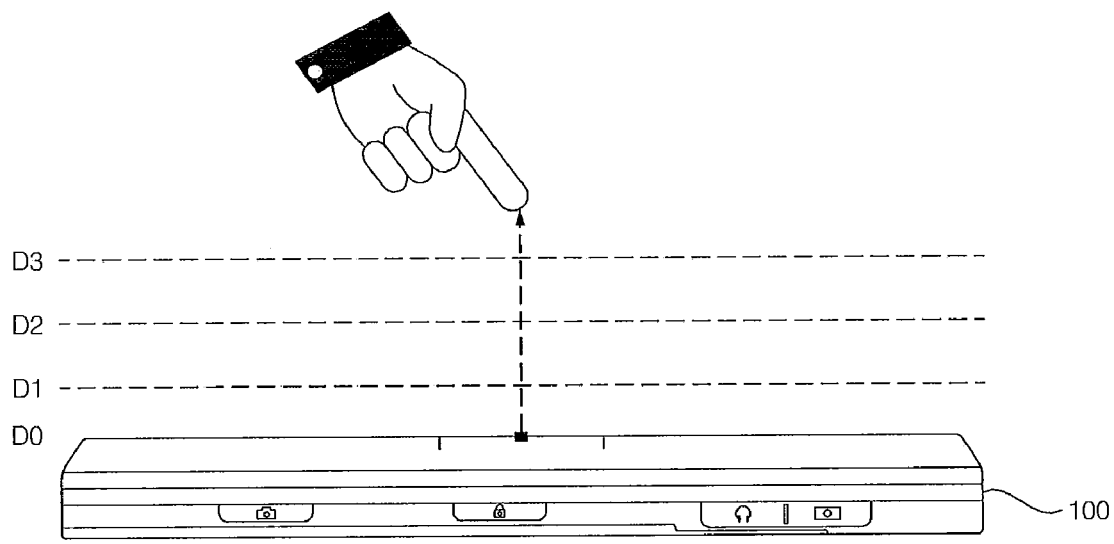
FIG. 4 is a diagram for explaining the operation of a proximity sensor.

Next, FIG. 4 is a diagram for explaining an operation of the proximity sensor 141 shown in FIG. 1. Referring to FIG. 4, if an entity, for example, the user's finger, is nearby and approaching the display module 151, the proximity sensor 141 detects the user's finger and outputs a proximity signal. The proximity signal output by the proximity sensor 141 varies according to the distance between the display module 151 and the user's finger. For example, a proximity signal output by the proximity sensor 141 when the user's finger is located at position D3 is different from a proximity signal output by the proximity sensor 141 when the user's finger is located at position D2 or D1. More than one proximity sensor 141 having different detection ranges may also be provided. In this instance, it is possible to determine how close the user's finger is to the mobile terminal 100 by comparing a plurality of proximity signals respectively output by the proximity sensors 141.

Alternatively, more than one proximity sensor 141 can be disposed in different regions in the display module 151. In this instance, it is possible to determine which part of the display module 151 is touched or approached by the user's finger and/or whether the user's finger moves within a close range of the display module 151 by determining which of the proximity sensor 141 outputs a proximity signal. Therefore, the control unit 180 can perform various control operations according to the degree to which the user's finger is close to the display module 151 and the position on the display module 151 touched or approached by the user's finger.

Figure 5A:
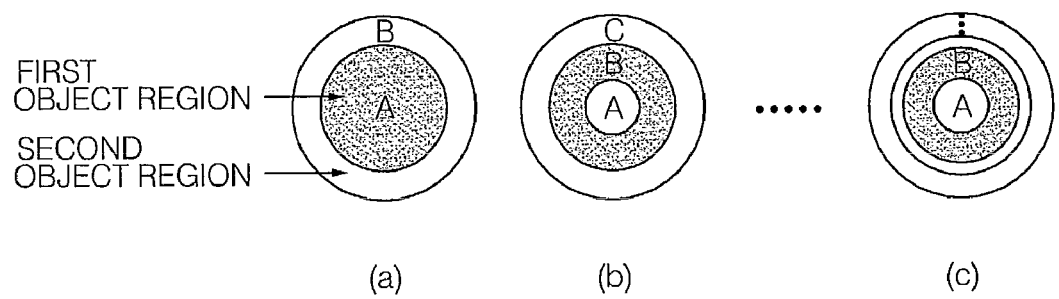
FIGS. 5A and 5B are diagrams for explaining a proximity region and a haptic region.
Figure 5B:
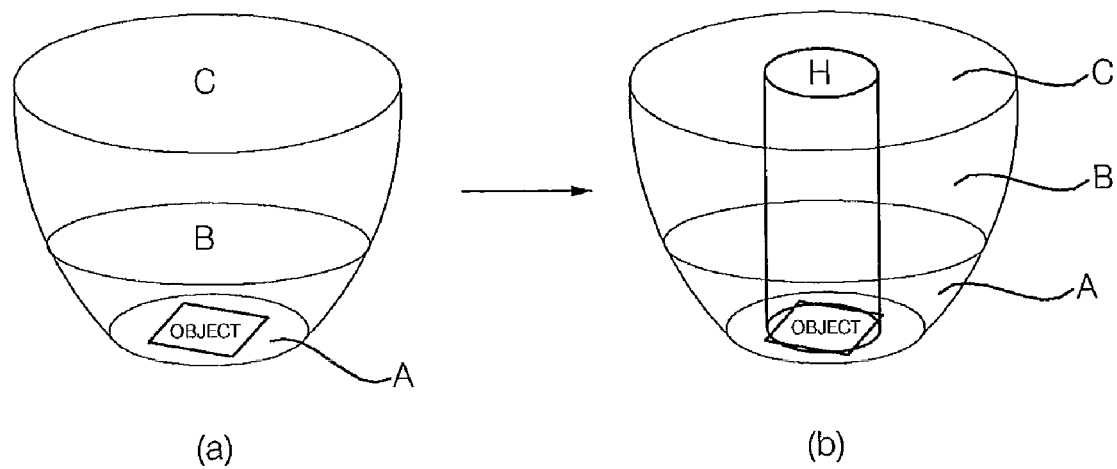

Next, FIGS. 5A and 5B are diagrams for explaining a proximity region from which a proximity signal is output and a haptic region for which a haptic effect is generated. Referring to FIG. 5A(a), when an object such as a menu icon, a control icon, a touch key or an item for controlling the operation of the mobile terminal 100 is displayed on the screen of the display module 151 as being circular in shape, the object may be divided into a first object region A corresponding to a central portion of the object, and a second object region B corresponding to a boundary portion of the object and surrounding the first object region A. Different haptic effects having different intensities or different patterns may also be generated for the first and second object regions A and B. For example, if the second object region B is touched, a first vibration may be generated. On the other hand, if the first object region A is touched, a second vibration having a higher intensity than that of the first vibration may be generated.

In addition, a proximity region and a haptic region may both need to be set in an object. However, the proximity region and the haptic region may not necessarily coincide with each other. That is, the haptic region may be narrower or wider than the area of the proximity region. For example, referring to FIG. 5A(a), the area of the first and second regions A and B combined may be set as a proximity region, and the first object region A may be set as a haptic region. Alternatively, referring to FIG. 5A(b), an object may be divided into three object regions: first through third object regions A through C. Still alternatively, referring to FIG. 5A(c), an object may be divided into N object regions. Once an object is divided into two or more object regions, the haptic module 157 can generate different types of haptic effects for the object regions. Even when an object is divided into three or more object regions, a haptic region and a proximity region may be set in the object to occupy different parts of the object.

Further, an object may be displayed in various shapes, other than a circular shape, and may be divided in various manners. That is, referring to FIGS. 5A(a)-(c), an object may be divided into a number of concentric object regions. Alternatively, an object may be divided in various manners, other than the concentric manner. For example, an object may be divided into a number of horizontal object regions, a number of vertical object regions, a number of fan-shaped object regions or a combination thereof. The area of a proximity region may also vary according to the degree of proximity between the display module 151 and an entity that is nearby and approaching the display module 151. That is, referring to FIG. 5B(a), the area of a proximity region may gradually decrease from C to B and from B to A according to the degree of proximity between the display module 151 and the entity. Alternatively, the area of a proximity region may gradually increase according to the degree of proximity between the display module 151 and the entity. However, the area of a haptic region may be uniformly maintained regardless of the distance from the display module 151, as indicated by reference character H of FIG. 5A(b).

Figure 6:
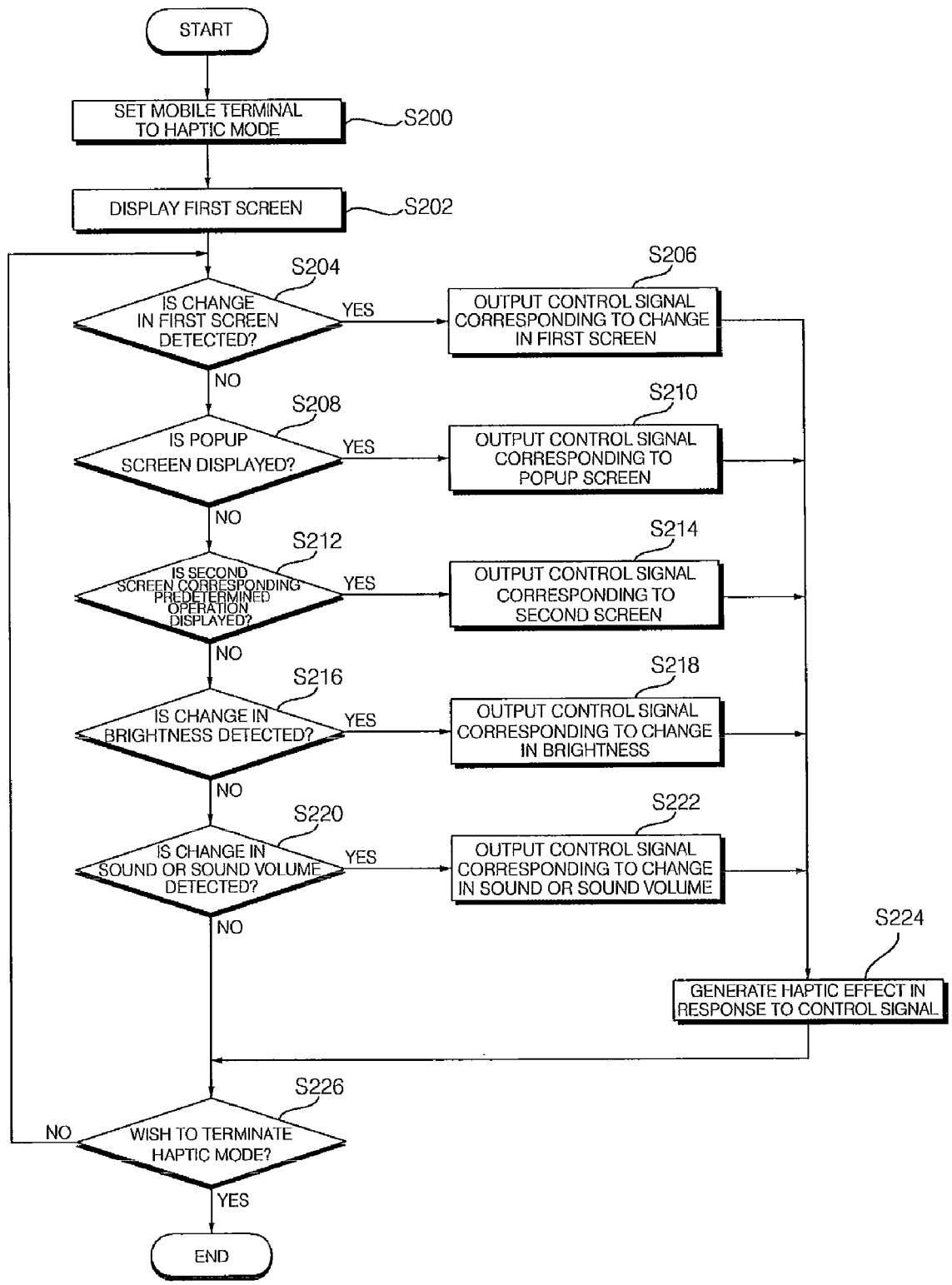
FIG. 6 is a flowchart illustrating a method of controlling a mobile terminal according to a first embodiment of the present invention.

Next, FIG. 6 is a flowchart illustrating a method of controlling a mobile terminal according to a first embodiment of the present invention. Referring to FIG. 6, the mobile terminal 100 is placed into a haptic mode (such as a vibration output mode) in response to a user command (S200). The mobile terminal 100 may be placed in the haptic mode through a default setting or user setting. In addition, an additional menu for placing the mobile terminal 100 in or releasing the mobile terminal 100 from the haptic mode may be provided.

Thereafter, the control unit 180 displays a first screen corresponding to a menu or operation chosen by the user on the screen of the display module 151 (S202). Then, the control unit 180 determines whether the first screen has changed (S204). If a change in the first screen is detected (Yes in S204), the control unit 180 outputs a control signal corresponding to the change in the first screen (S206). The control signal output by the control unit 180 is a signal for controlling the haptic module 157 to generate a haptic effect corresponding to the change in the first screen. In addition, the first screen may vary in accordance with a change in the operating state of the mobile terminal 100. Examples of the change in the first screen include the appearance of a new icon on the first screen or the disappearance of an existing icon from the first screen, a change in the shape of an icon displayed on the first screen, a change in the scale of the first screen, the rotation of the first screen, a change in the shape of an image displayed on the first screen, etc.

Further, the control signal output by the control unit 180 is transmitted to the haptic module 157, and the haptic module 157 generates a haptic effect corresponding to the control signal output by the control unit 180 (S224). Also, if a popup window is displayed on the first screen (Yes in S208), the control unit 180 outputs a control signal corresponding to the popup screen (S210), and the haptic module 157 generates a haptic effect corresponding to the display of the popup window in response to the control signal (8224). In addition, if the display module 151 displays a second screen corresponding to a predetermined operation, instead of the first screen, under the control of the control unit 180 (Yes in S212), the control unit 180 outputs a control signal corresponding to the second screen (S214), and the haptic module 157 generates a haptic effect corresponding to the display of the second screen under the control of the control unit 180 (S224).

Also, if a change in the brightness of a screen currently being displayed by the display module 151 is detected (Yes in S216), the control unit 180 outputs a control signal corresponding to the change in the brightness of the screen (S218), and the haptic module 157 generates a haptic effect corresponding to the change in the brightness of the screen under the control of the control unit 180 (S224). If a change in sound or sound volume is detected (Yes in S220), the control unit 180 outputs a control signal corresponding to the sound change or the sound volume change (S222), and the haptic module 157 generates a haptic effect corresponding to the sound change or the sound volume change under the control of the control unit 180 (S224). The haptic module 157 may also generate a haptic effect according to a brightness value or a sound volume value set using a menu for setting brightness or sound volume.

For example, as the brightness of the screen currently being displayed by the display module 151 increases, the intensity of vibration generated by the haptic module 157 may gradually increase. On the other hand, as the brightness of the screen currently being displayed by the display module 151 decreases, the intensity of vibration generated by the haptic module 157 may gradually decrease. The haptic module 157 may also be configured to generate a haptic effect upon detecting a change in the operating state of the mobile terminal 100. Further, operations S204 through S224 may be repeatedly performed until the mobile terminal 100 is released from the haptic mode (S226). In this embodiment, it is possible to generate different haptic effects for different types of changes in the operating state of the mobile terminal 100 such as changes in a screen or changes in a popup screen. Thus, it is possible for the user to recognize changes in the operating state of the mobile terminal 100 using the haptic effects.

Figure 7:
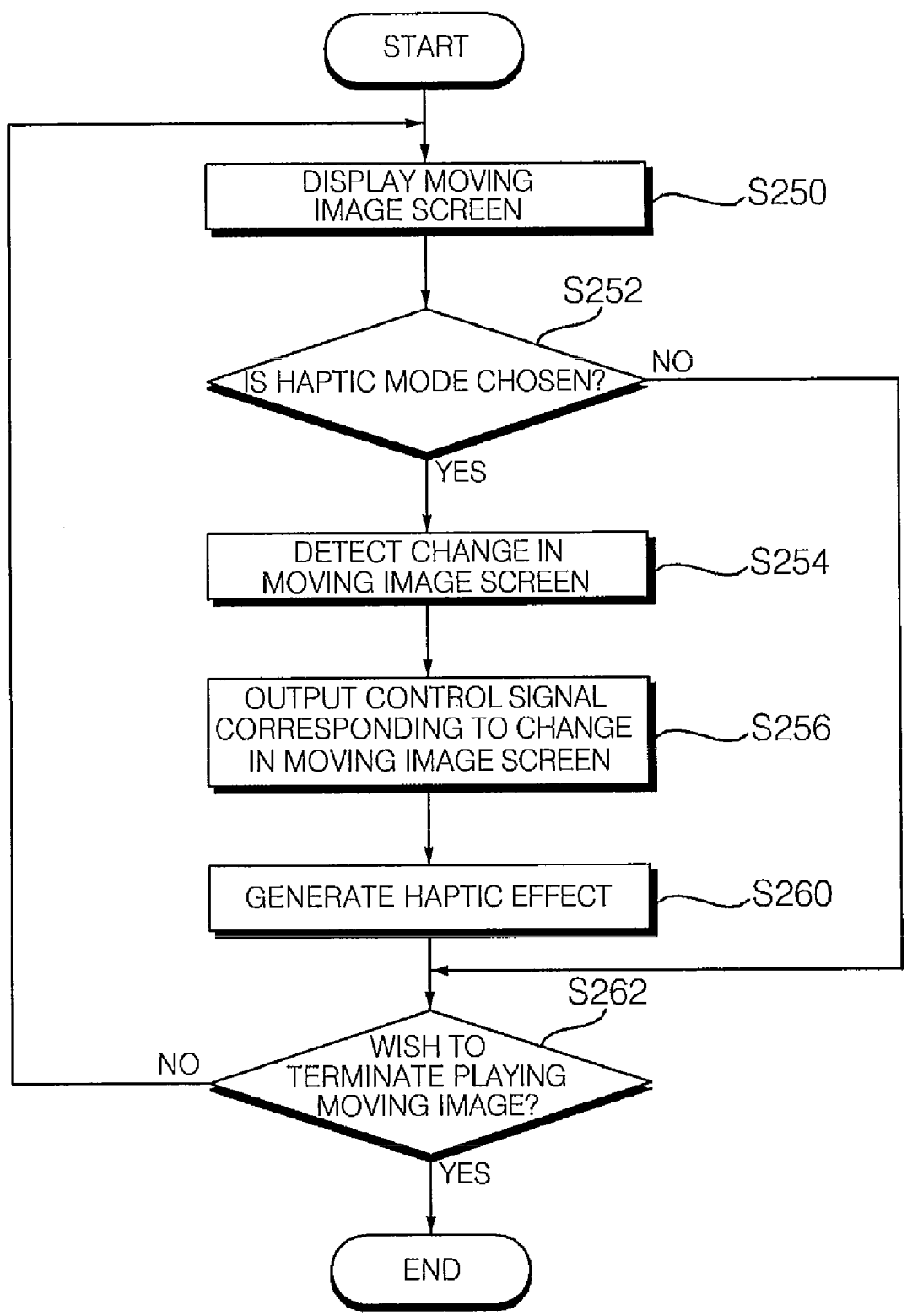
FIG. 7 is a flowchart of a method illustrating controlling a mobile terminal according to a second embodiment of the present invention.

Next, FIG. 7 is a flowchart illustrating a method of controlling a mobile terminal according to a second embodiment of the present invention. The generation of a tactile effect upon detecting a variation in a moving image screen will hereinafter be described in detail with reference to FIG. 7. Referring to FIG. 7, if a menu for playing a multimedia file is called in response to a user command and a moving image file to be played is chosen, the control unit 180 displays a moving image screen for playing the chosen moving image file on the screen of the display module 151 (S250). If a haptic mode is chosen (Yes in S252), the control unit 180 detects a change in the moving image screen (S254).

Examples of the change in the moving image screen include a considerable change (e.g., greater than a predetermined amount) of the moving image screen between previous and current frames and a considerable change of a predetermined object in the moving image screen between the previous and current frames. The user may also determine the type of change in the moving image screen that the haptic module 157 should respond to. Further, the control unit 180 outputs a control signal corresponding to the change in the moving image screen (S256). Then, the haptic module 157 generates a haptic effect corresponding to the change in the moving image screen in response to the control signal output by the control unit 180 (S260). Operations S250 through S260 may be repeatedly performed until the play of the chosen moving image file is terminated (S262). In this manner, it is possible to generate various haptic effects upon detecting a change in a moving image screen by placing the mobile terminal 100 in the haptic mode during the play of a moving image file.

Figure 8:
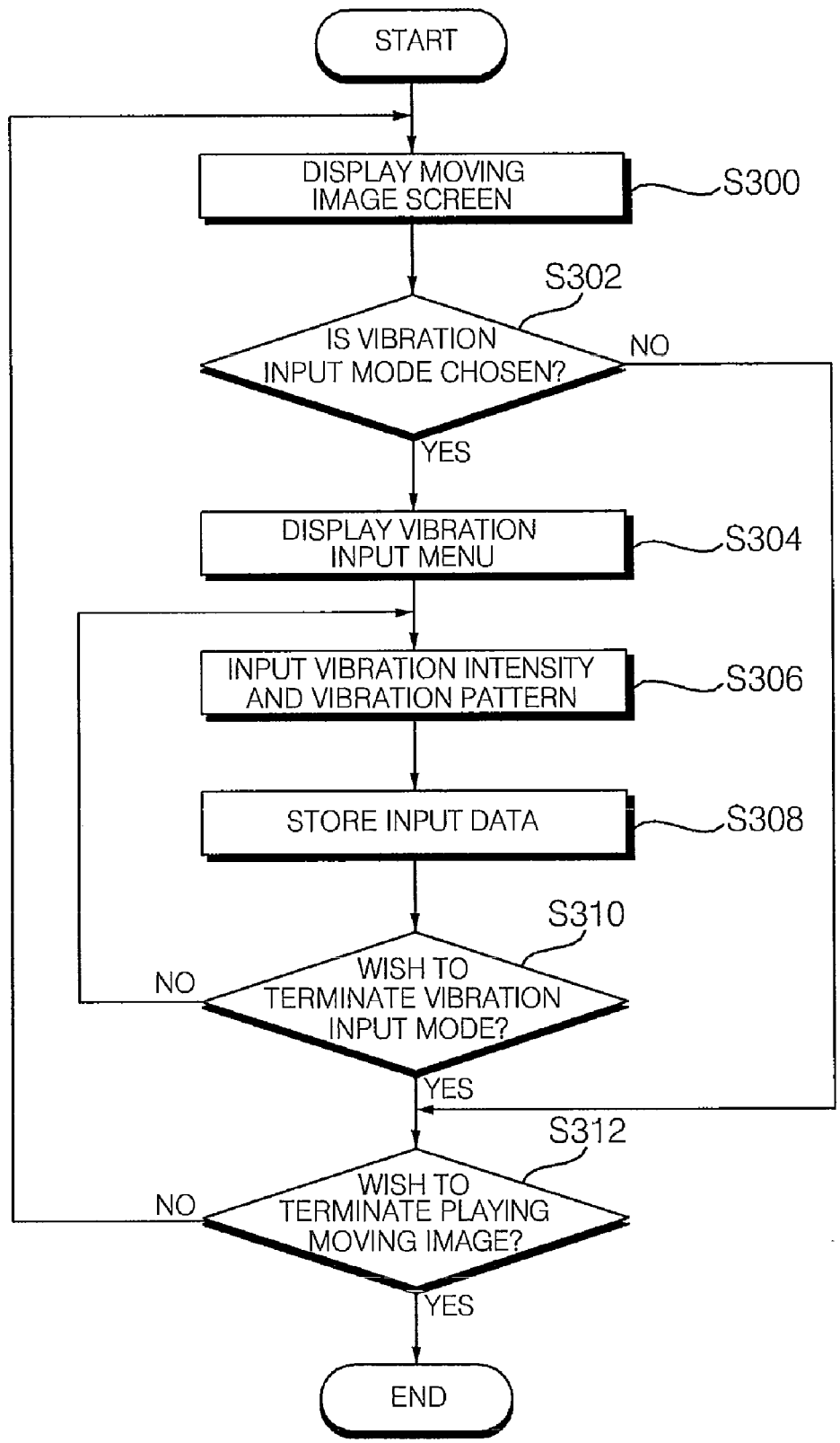
FIG. 8 is a flowchart illustrating a method of controlling a mobile terminal according to a third embodiment of the present invention.

FIG. 8 is a flowchart illustrating a method of controlling a mobile terminal according to a third embodiment of the present invention. The generation of a haptic effect desired by the user for a moving image screen will hereinafter be described in detail with reference to FIG. 8. Referring to FIG. 8, if a menu for playing a multimedia file is called in response to a user command and a moving image file to be played is chosen, the control unit 180 displays a moving image screen for playing the chosen moving image file on a touch screen, i.e., the screen of the display module 151 (S300). If a vibration input mode is chosen in response to a touch input (Yes in S302), the control unit 180 displays a vibration input menu for inputting a vibration signal on the screen of the display module 151 (S304). If vibration data such as the intensity and the pattern of vibration for the moving image screen is received from the vibration input menu (S306), the control unit 180 links the vibration data to the chosen moving image file and stores the vibration data linked to the chosen moving image file (S308). The control unit 180 may also store synchronization data for synchronizing the vibration data with the chosen moving image file.

Operations S300 through S308 may be repeatedly performed until the mobile terminal 100 is released from the vibration input mode (S310). If the mobile terminal 100 is released from the vibration input mode (Yes in S310), the control unit 180 determines whether the user wants to terminate the play of a moving image file (S312). If the user does not want to terminate the play of a moving image file (No in S312), the method returns to operation S300. Thus, in this embodiment, vibration data may be stored in advance in connection with a moving image file chosen by the user. Thus, during the play of the moving image file, vibration may be generated according to the vibration data. Further, vibration may be generated as a haptic effect. However, the present invention is not restricted to this. That is, various haptic effects, other than vibration may, may be generated during the play of a moving image file. Also, if the user wants to terminate the moving image file (Yes in S312), the process ends.

Figure 9:
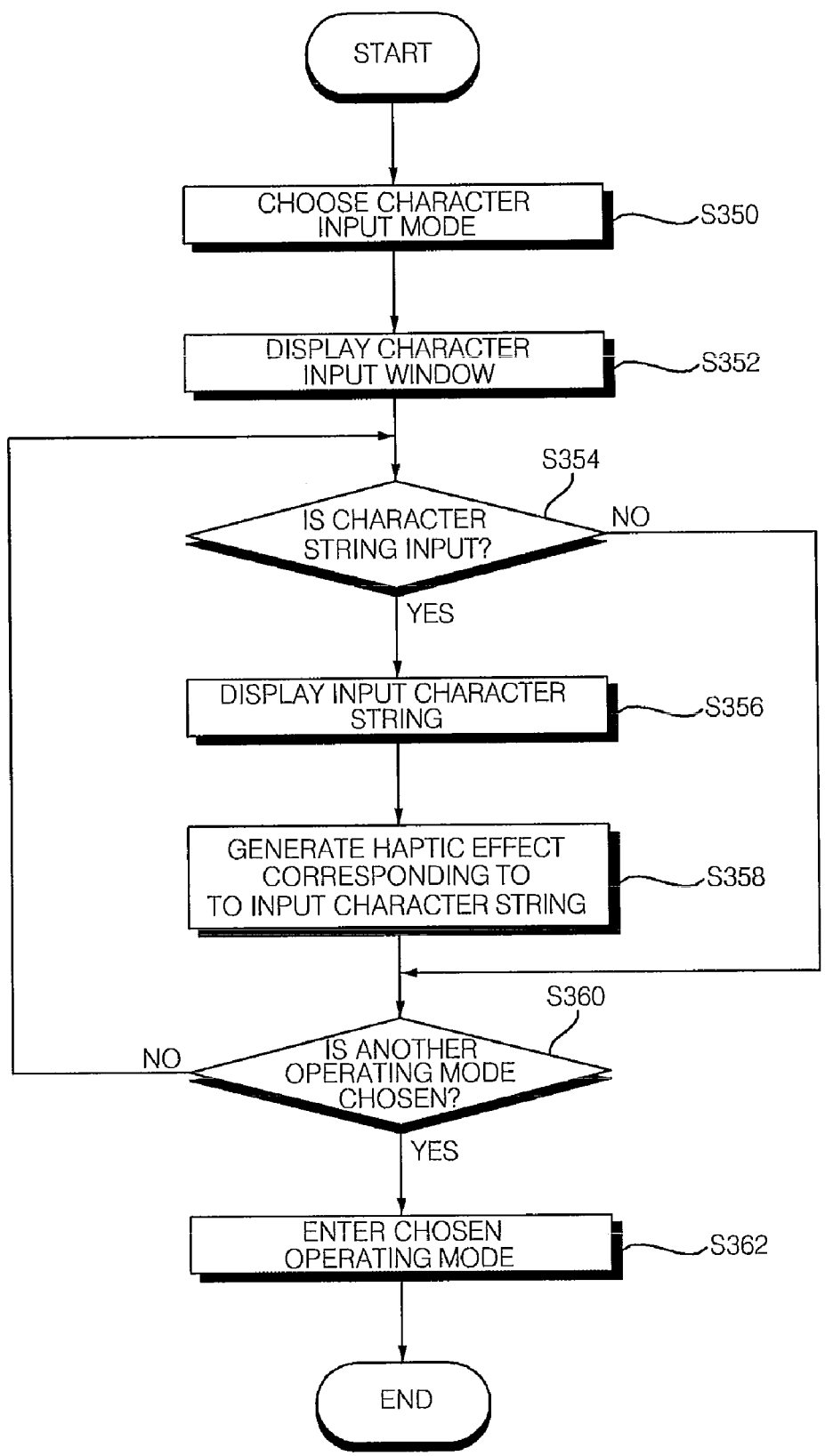
FIG. 9 is a flowchart illustrating a method of controlling a mobile terminal according to a fourth embodiment of the present invention.

Next, FIG. 9 is a flowchart illustrating a method of controlling a mobile terminal according to a fourth embodiment of the present invention. The generation of a haptic effect (particularly, a vibration effect) in response to the input of a touch key will hereinafter be described in detail with reference to FIG. 9. Referring to FIG. 9, if a character input mode for making a call, sending a message, or searching for a phone number or a file is chosen in response to a user command (S350), the control unit 180 displays a character input window on a touch screen, i.e., the screen of the display module 151 (S352).

Thereafter, the control unit 180 determines whether a character string has been input to the character input window through touch input (S354). If a character string been input to the character input window (Yes in S354), the control unit 180 displays the input character string in a predetermined area on the screen of the display module 151 (S356). However, the control unit 180 may perform an operation, other than displaying the input character string on the screen of the display module 151, according to the type of menu. The control unit 180 also analyzes the input character string and outputs a control signal corresponding to the input character string based on the results of the analysis. Then, the haptic module 157 generates a haptic effect corresponding to the input character string under the control of the control unit 180 (S358). That is, the haptic module 157 outputs various types of vibration effects according to the configuration of each character in the input character string. The user may determine in advance the intensity and pattern of vibration to be output for the input character string.

If an operating mode other than the character input mode is chosen (Yes in S360), the control unit 180 controls the mobile terminal 100 to be placed in the operating mode (S362). If no other operating mode is chosen (No in S360), the method returns to operation S354. In this manner, various types of vibration effects may be output according to the configuration of each character in the input character string. Thus, the user may easily identify the input character string based on the intensity and the pattern of vibration may output by the haptic module 157. For this, the input character string may be divided into three constituents, i.e., an initial consonant, a medial vowel and a final consonant, and three types of vibration effects respectively corresponding to the three constituents may be output according to the configuration of the input character string. If the input character string is 'thanks', a first vibration corresponding to initial consonants 't' and 'h', in the input character string, a second vibration corresponding to medial vowel 'a' in the input character string and a third vibration corresponding to final consonants 'n', 'k' and 's' in the input character string may be sequentially output according to the configuration of the input character string. Alternatively, the first vibration, the second vibration and the third vibration may be synthesized, and the result of the synthesization may be output according to the configuration of the input character string.

Alternatively, the input character string may be divided into two constituents, i.e., one or more vowel and one or more consonant, and two types of vibration effects respectively corresponding to the two constituents may be output according to the configuration of the input character string. For example, if the input character string is 'Hello', a fourth vibration corresponding to consonants 'H', 'l', and 'l' in the input character string and a fifth vibration corresponding to vowels 'e' and 'o' in the input character string may be sequentially output according to the configuration of the input character string. Alternatively, the fourth vibration and the fifth vibration may be synthesized, and the result of the synthesization may be output according to the configuration of the input character string.

Still alternatively, different types of vibration effects may be output for different syllables, different morphemes, for different parts of speech, or for different words. If the input character string includes one or more numerals, a vibration corresponding to each of the numerals may also be output. If the input character string includes an emoticon such as '^^', a frequently-used phrase such as 'I am in a conference now', or a special character such as '☆' or '♡', a vibration corresponding to the emoticon, the frequently-used phrase, or the special character may also be output. In addition, different types of vibration may be output for different types of character input modes such as a Korean input mode, an English input mode, a numeral input mode, a key pad input mode and an italic input mode. In this embodiment, the vibration is generated as a haptic effect. However, the present invention is not restricted to this. That is, the present invention can be applied to various haptic effects, other than vibration.

Figure 10:
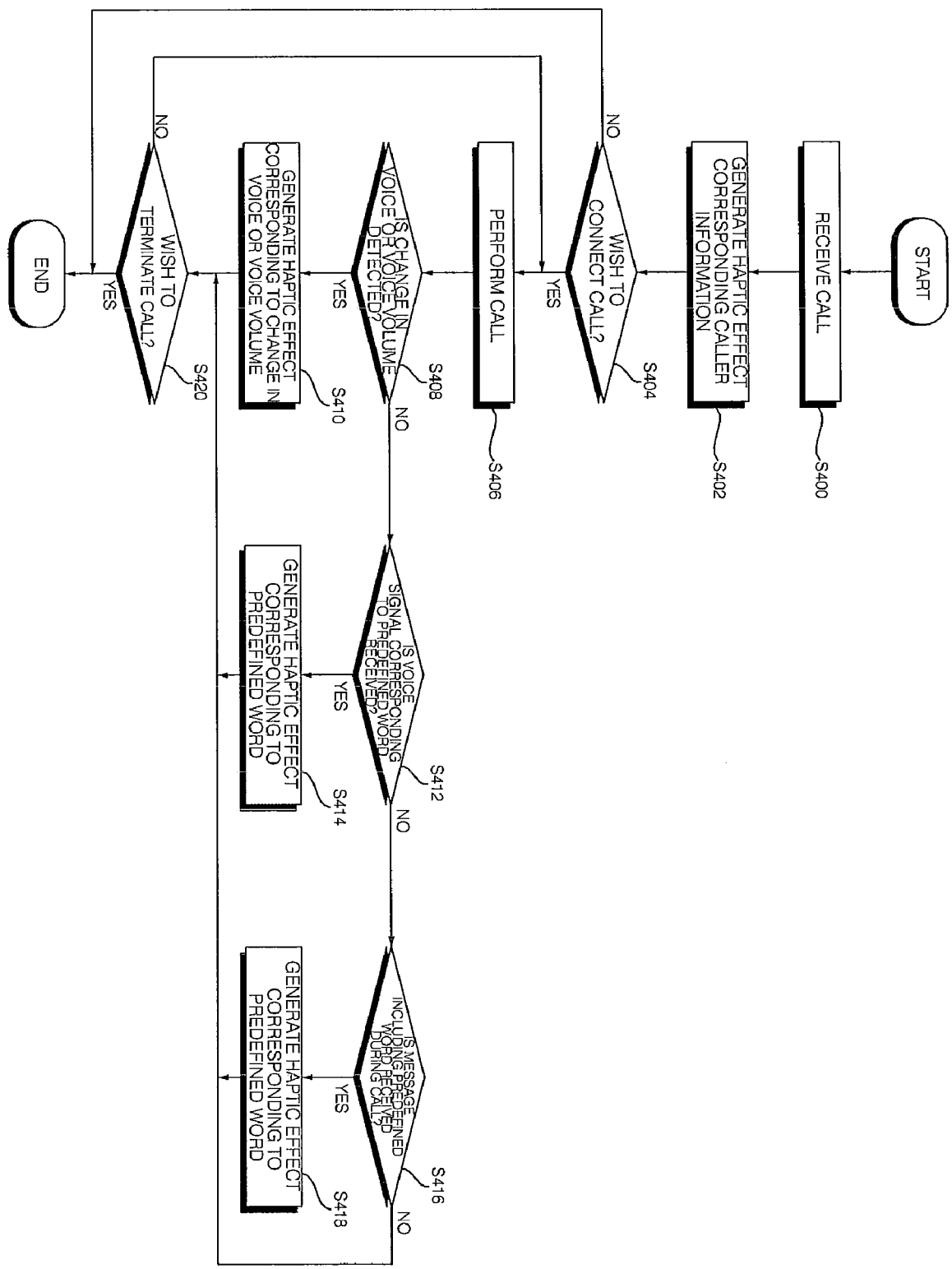
FIG. 10 is a flowchart illustrating a method of controlling a mobile terminal according to a fifth embodiment of the present invention.

Next, FIG. 10 is a flowchart illustrating a method of controlling a mobile terminal according to a fifth embodiment of the present invention. Referring to FIG. 10, if a call such as a voice call or a video call is received (S400), the control unit 180 displays caller information on the screen of the display module 151 and controls the haptic module 157 to analyze the caller information and thus to generate a haptic effect such as vibration based on the results of the analysis (S402). Thereafter, if the user chooses to connect the call (Yes in S404), the control unit 180 controls the call to be performed (S406). If a variation in the voice or the voice volume of a caller or a callee is detected by the control unit 180 (Yes in S408), the control unit 180 controls the haptic module 157 to generate a haptic effect corresponding to the detected voice or voice volume variation (S410). If a voice signal corresponding to a predefined word is received during a call with the caller or the callee (Yes in S412), the control unit 180 controls the haptic module 157 to generate a haptic effect corresponding to the predefined word (S414).

If a message including a predetermined word is received during the call with the caller or the callee (Yes in S416), the control unit 180 also controls the haptic module 157 to generate a haptic effect corresponding to the predetermined word (S418). If another call is requested during the call with the caller or the callee, the control unit 180 controls the haptic module 157 to analyze caller information and thus to generate a haptic effect corresponding to the requested call. In addition, if a predefined event occurs during the call with the caller or the callee, the control unit 180 may control the haptic module 157 to generate a haptic effect corresponding to the predefined event. Operations S404 through S418 may be repeatedly performed until the user chooses to terminate the call (Yes in S420). In this manner, it is possible for the user to easily identify an event that occurs during the call with the caller or the callee by using the sense of touch.

Figure 11:
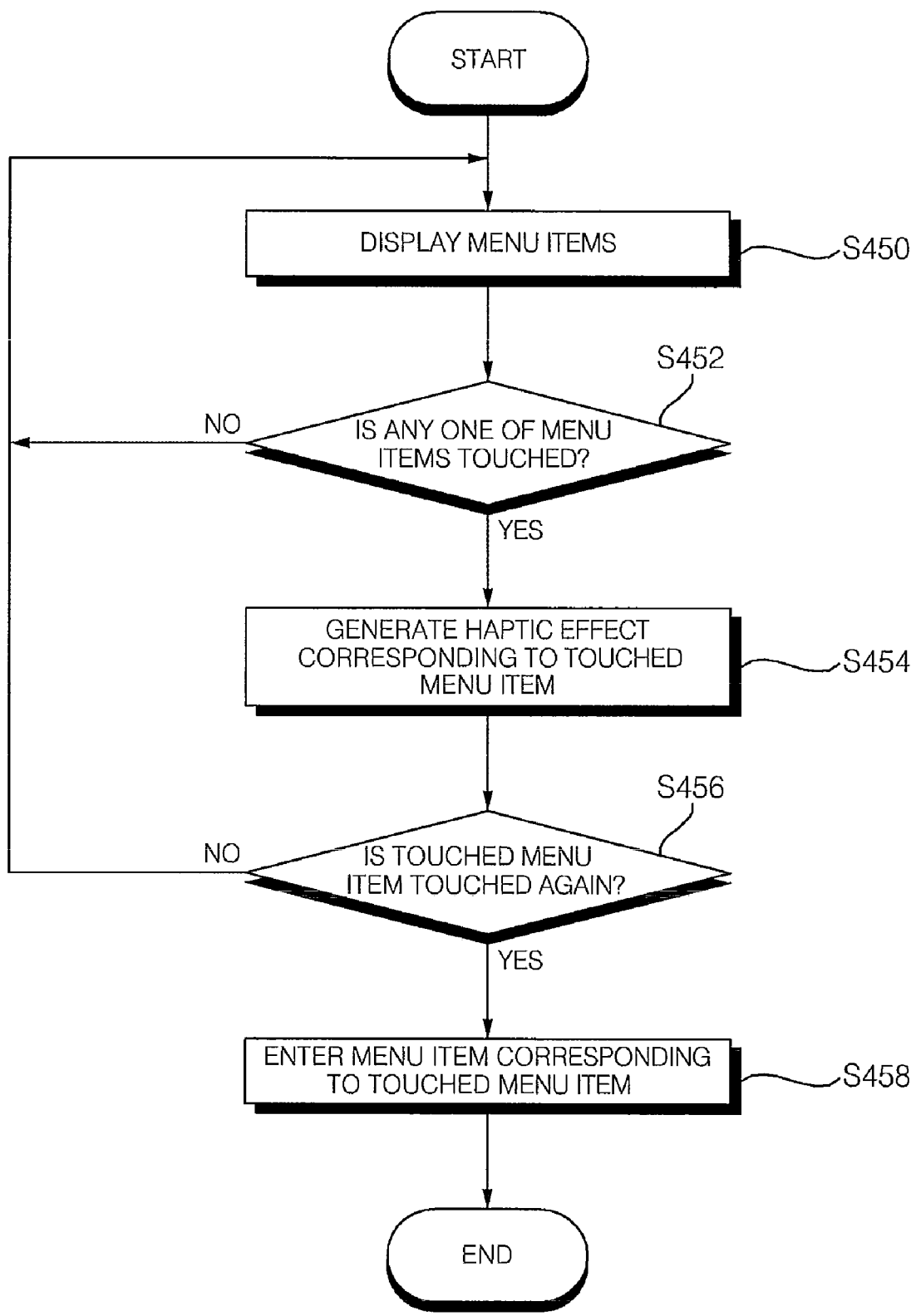
FIG. 11 is a flowchart illustrating a method of controlling a mobile terminal according to a sixth embodiment of the present invention.

Next, FIG. 11 is a flowchart illustrating a method of controlling a mobile terminal according to a sixth embodiment of the present invention. Referring to FIG. 11, if a menu is chosen, the control unit 180 displays a number of menu items of the chosen menu on the screen of the display module 151, e.g., on a touch screen (S450). If one of the menu items is touched and thus chosen by the user (Yes in S452), the control unit 180 controls the haptic module 157 to generate a haptic effect corresponding to the chosen menu item (S454). If one of the menu items is approached in a proximity manner by, for example, the user's finger, the control unit 180 may also control the haptic module 157 to generate a haptic effect corresponding to the approached menu item.

If the chosen menu item is touched again (Yes in S456), the control unit 180 enters a menu corresponding to the chosen menu item (S458). On the other hand, if a menu item other than the chosen menu item is touched, the control unit 180 controls the haptic module 157 to generate a haptic effect corresponding to the touched menu item. Alternatively, if any one of the menu items is touched for longer than a predefined amount of time, the control unit 180 enters a menu corresponding to the touched menu item. In this manner, it is possible to generate different haptic effects for different menu items. Thus, it is possible for the user to easily determine which of the menu items has been touched or approached by using the sense of touch.

Figure 12:
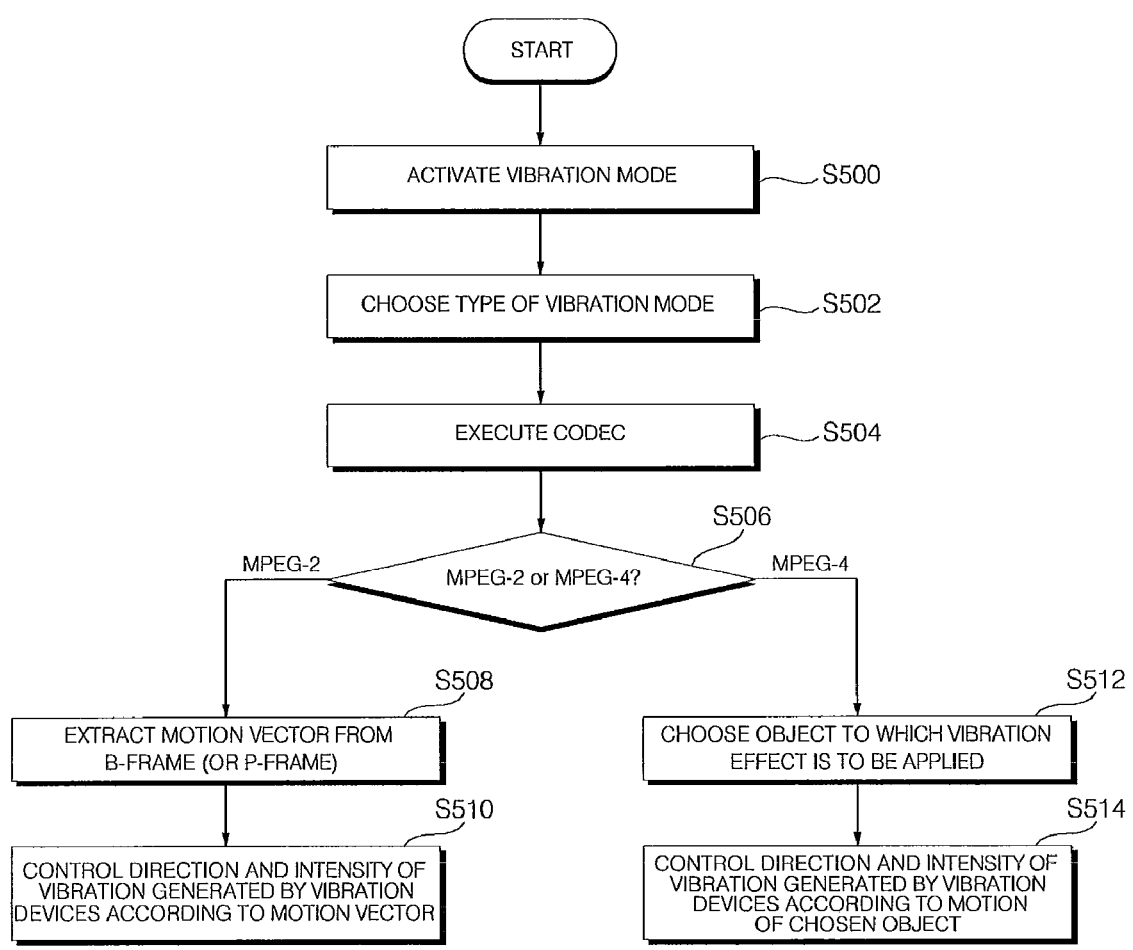
FIG. 12 is a flowchart illustrating a method of controlling a mobile terminal according to a seventh embodiment of the present invention.

In addition, FIG. 12 is a flowchart illustrating a method of controlling a mobile terminal according to a seventh embodiment of the present invention. Referring to FIG. 7, the controller 180 determines whether to activate a vibration mode, i.e., whether to set or release a vibration mode (S500). Thereafter, the controller 180 may choose one of various types of vibration modes, for example, an action mode, a sports mode, a drama mode, a concert mode, a game mode, and an FX mode (8502). Then, a codec for playing a moving image is executed (S504) and a moving image to be played is chosen in response to user input, and the controller 180 identifies how the chosen moving image is compressed (S506). If the chosen moving image is MPEG 2-compressed, the controller 180 extracts a motion vector from predetermined video data of the chosen moving image, e.g., a B frame (or a P frame) of the chosen moving image (S508). Thereafter, the controller 180 controls the direction and intensity of vibration generated by a plurality of vibration devices included in the haptic module 157. One embodiment has the haptic module 157 including four vibration devices.

Further, MPEG-2 is an expansion of MPEG-1 and is suitable for high-quality video applications and TV broadcast applications, whereas MPEG-1 is suitable for use in CD-ROM drive systems. MPEG-2 also allows five or more digital satellite broadcast channels to be encoded without any deterioration of picture quality simply using the same bandwidth as that used by a single analog channel. Also, MPEG-4, unlike MPEG-1 or MPEG-2, has been standardized for the purpose of expanding the use of MPEG compression techniques in various low-bitrate circumstances. MPEG-4 has been designed based on H.263, but is distinguished from H.263 in terms of using B-frames in inter-frame prediction and performing the alternative coefficient (AC)/discrete coefficient (DC) prediction of discrete cosine transform (DCT) coefficients. MPEG-4 is also characterized by separating various objects from a single frame or image, compressing each of the separated objects and transmitting the compressed objects.

Referring to FIG. 12, if the chosen moving image is determined to be MPEG-4-compressed (or H.264-compressed) (S506), an object to which a vibration effect is to be applied may be chosen from a number of objects included in the chosen moving image (S512). Thereafter, the controller 180 displays a UI screen on the display module 151 so as to allow the user to choose one of the objects included in the chosen moving image. If one of the objects included in the chosen moving image is chosen by the user with the use of the UI screen, the controller 180 controls the direction and intensity of vibration generated by the vibration devices included in the haptic module 157 according to the emotion of the chosen object (e.g., the motion vector of the chosen object) (S514).

Figure 13:
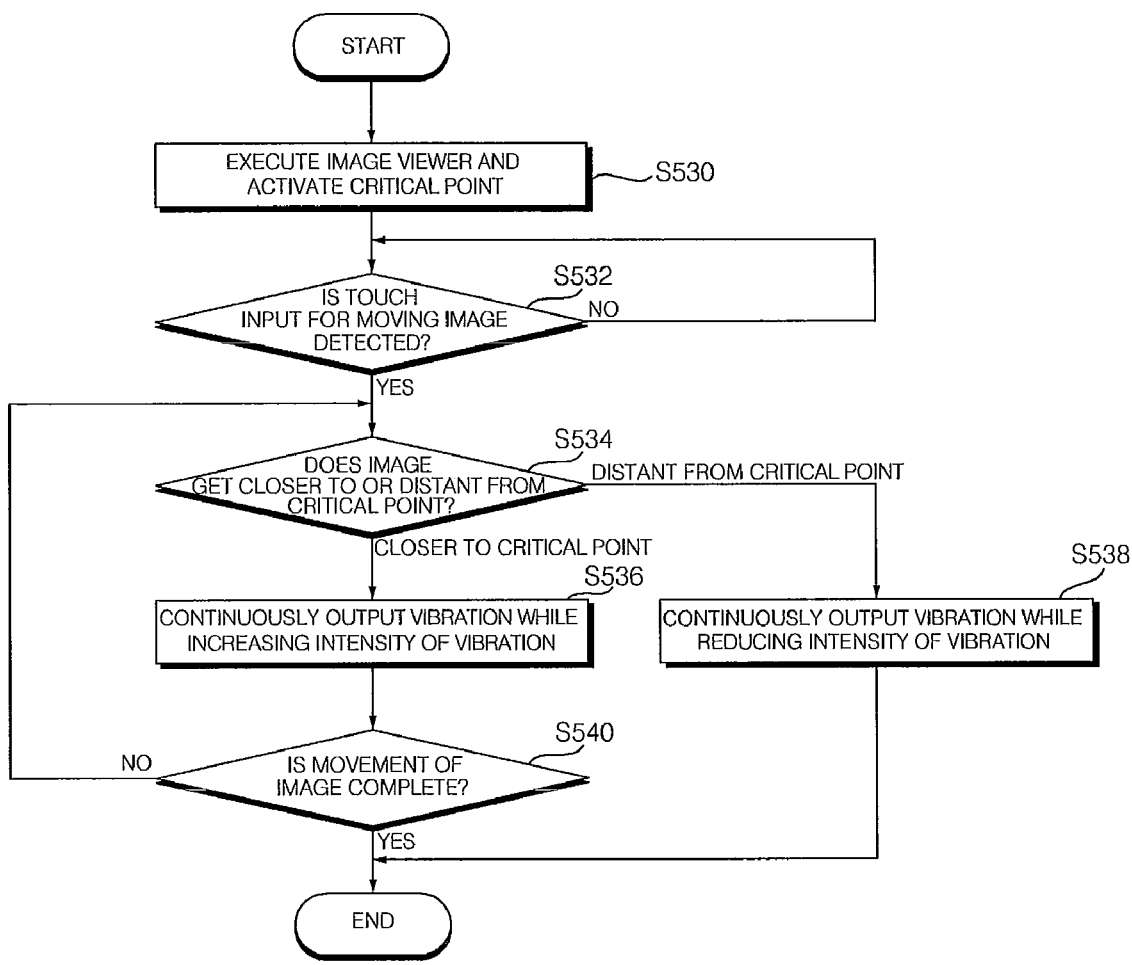
FIG. 13 is a flowchart illustrating a method of controlling a mobile terminal according to an eighth embodiment of the present invention.

Next, FIG. 13 is a flowchart illustrating a method of controlling a mobile terminal according to an eighth embodiment of the present invention. Referring to FIG. 13, when an image viewer is executed, the controller 180 sets a critical value (hereinafter referred to as the critical point) for the movement of an image (S530). The setting of the critical point may be interpreted as activating the critical point for the movement of an image, rather than applying a predetermined value. If an image is moved in response to a touch input (e.g., a touch-and-drag operation or flicking) generated by the user, the controller 180 detects the movement of the image (S532). Further, the controller 180 lay continuously output vibration upon the detection of the movement of the image while varying the intensity of vibration according to the distance between the image and the critical point. More specifically, the closer the image becomes to the critical point (S534), the stronger the vibration output by the controller 180 becomes (S536).

On the other hand, once the image passes the critical point (S534), the controller 180 gradually reduces the intensity of vibration (S538). When the movement of the image is complete (Yes in S540), the process ends. In the eighth embodiment, the intensity of vibration may be set to be proportional to the distance between an image and a critical point. Thus, if an image gradually becomes distant from a critical point by being moved by the user, the controller 180 may continuously output vibration while gradually reducing the intensity of the vibration. Also, because the controller 180 gradually reduces the intensity of vibration as soon as an image passes a critical point, the user may be able to easily determine the location of the critical point simply using his or her sense of touch and to decide when to stop moving the image.

Figure 14:
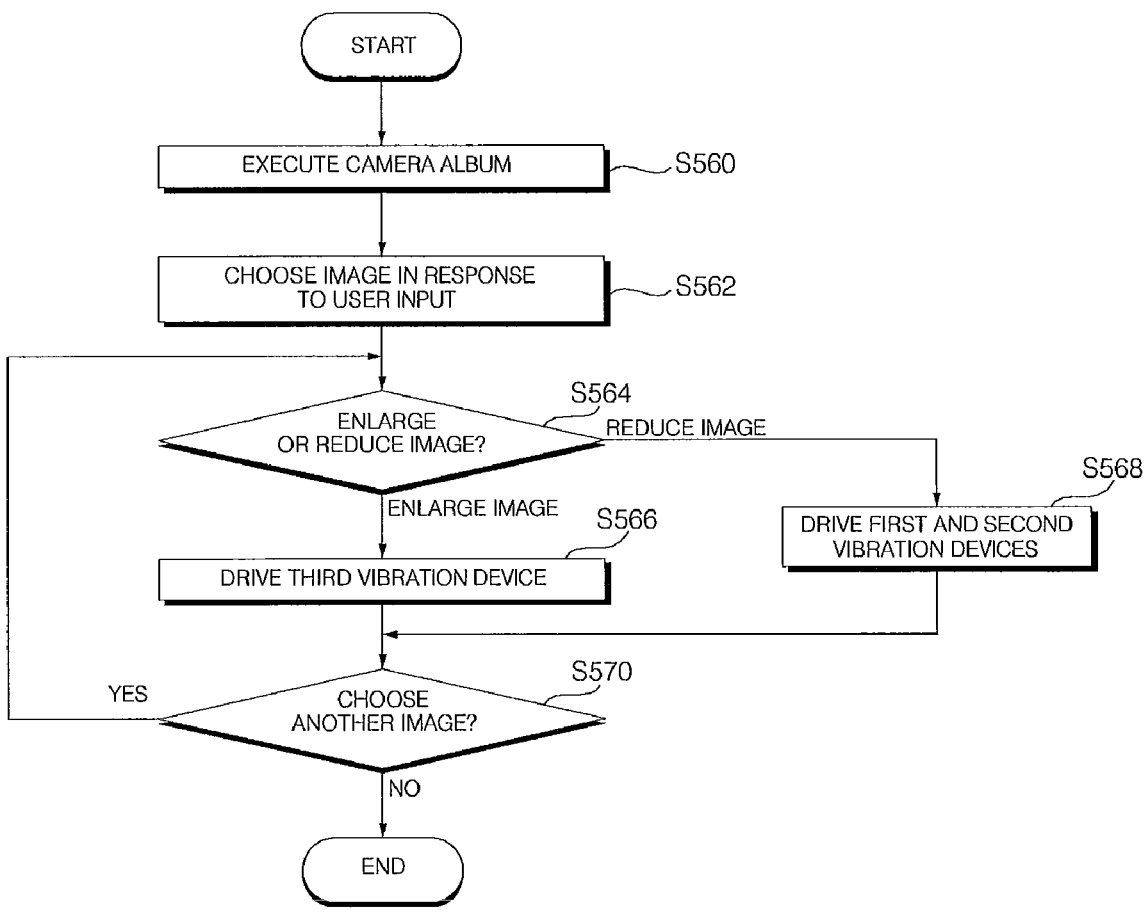
FIG. 14 is a flowchart of a method of controlling a mobile terminal according to a ninth embodiment of the present invention.
Figure 15:
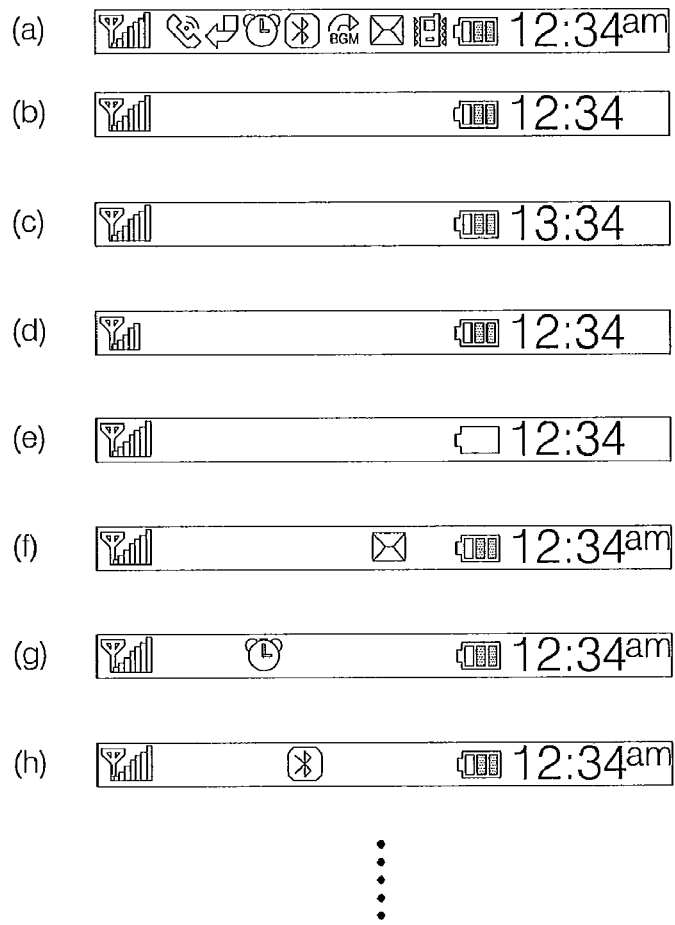
FIGS. 15-24 are diagrams for explaining how to generate a haptic effect in accordance with a change in a screen image displayed by a display unit of the mobile terminal shown in FIG. 1.

FIG. 14 is a flowchart illustrating a method of controlling a mobile terminal according to a ninth embodiment of the present invention. In this embodiment, it is assumed that the mobile terminal 100 includes first and second vibration devices transmitting vibration radially from the edges to the center of the screen of the display module 151 and a third vibration device transmitting vibration radially from the edges to the center of the screen of the display module 151.

Referring to FIG. 14, if an image viewer (e.g., a camera album) is executed (S560), the controller 180 chooses an image in response to user input (S562). Thereafter, the controller 180 displays the chosen image on the display module 151 and waits for another user input. Thereafter, if a command to enlarge the chosen image (e.g., a zoom-in command) is received from the user (S564), the controller 180 drives the third vibration device and controls the third vibration device to transmit vibration radially from the center to the edges of the screen the display module 151 (S566). On the other hand, if a command to reduce the chosen image (e.g., a zoom-out command) is received from the user (S453), the controller 180 drives the first and second vibration devices and controls the first and second vibration devices to transmit vibration radially from the edges to the center of the screen of the display module 151 (S568). The controller 180 may also continuously drive the first and second vibration devices or the third vibration device as long as the user keeps pressing a key or button for reducing or enlarging the chosen image (e.g., a software key or a hardware button). If the user selects another image (Yes in S570), the process returns to step S564.

Next, FIGS. 15-52 are overviews of display screens for explaining the methods shown in FIGS. 6-11. For convenience of explanation, it is assumed the mobile terminal 100 generates vibration as a haptic effect. However, the present invention is not restricted to this. That is, the mobile terminal 100 may generate various haptic effects, other than a vibration effect.

FIGS. 15-24 are diagrams explaining how to generate a haptic effect in accordance with a change in a screen image displayed by the display module 151. More specifically, FIG. 15 includes diagrams for explaining how to generate a haptic effect in accordance with a change in an indicator region including a plurality of indicator icons. Referring to FIG. 15(a), a plurality of indicator icons indicating a received signal strength, remaining battery power, current time information and various states of the mobile terminal 100 such as whether the mobile terminal 100 is receiving or making a voice call, whether an alarm function or a morning call function is set, and whether there are unchecked new messages are displayed. The indicator icons may appear on or disappear from the screen of the display module 151 according to the settings or the operating state of the mobile terminal 100. A haptic effect may also be generated in accordance with a change in an indicator region in which the indicator icons are displayed.

Figure 16:
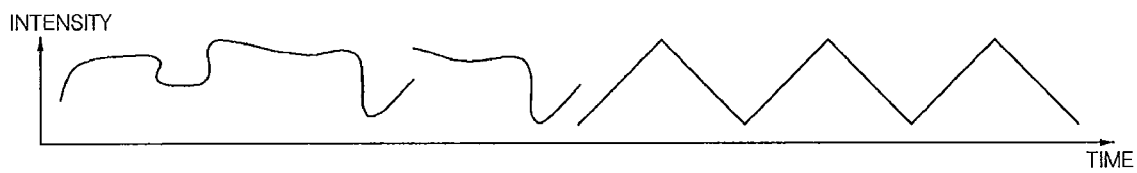

For example, a haptic effect may be generated in accordance with the lapse of time, as illustrated in FIGS. 15(b) and 15(c), or in accordance with a change in a level bar indicating a remaining battery power, as illustrated in FIGS. 15(d) and 15(e). In addition, a haptic effect may be generated whenever a new indicator icon appears in an indicator region or whenever an existing indicator icon disappears from the indicator region, as illustrated in FIGS. 15(f) through 15(h). Further, sometimes a plurality of vibration effects or a plurality of non-vibration haptic effects are output according to the type or the state of an indicator icon. In this instance, and as shown in FIG. 16, the vibration effects or the non-vibration haptic effects may be sequentially generated in order of priority.

Figure 17:
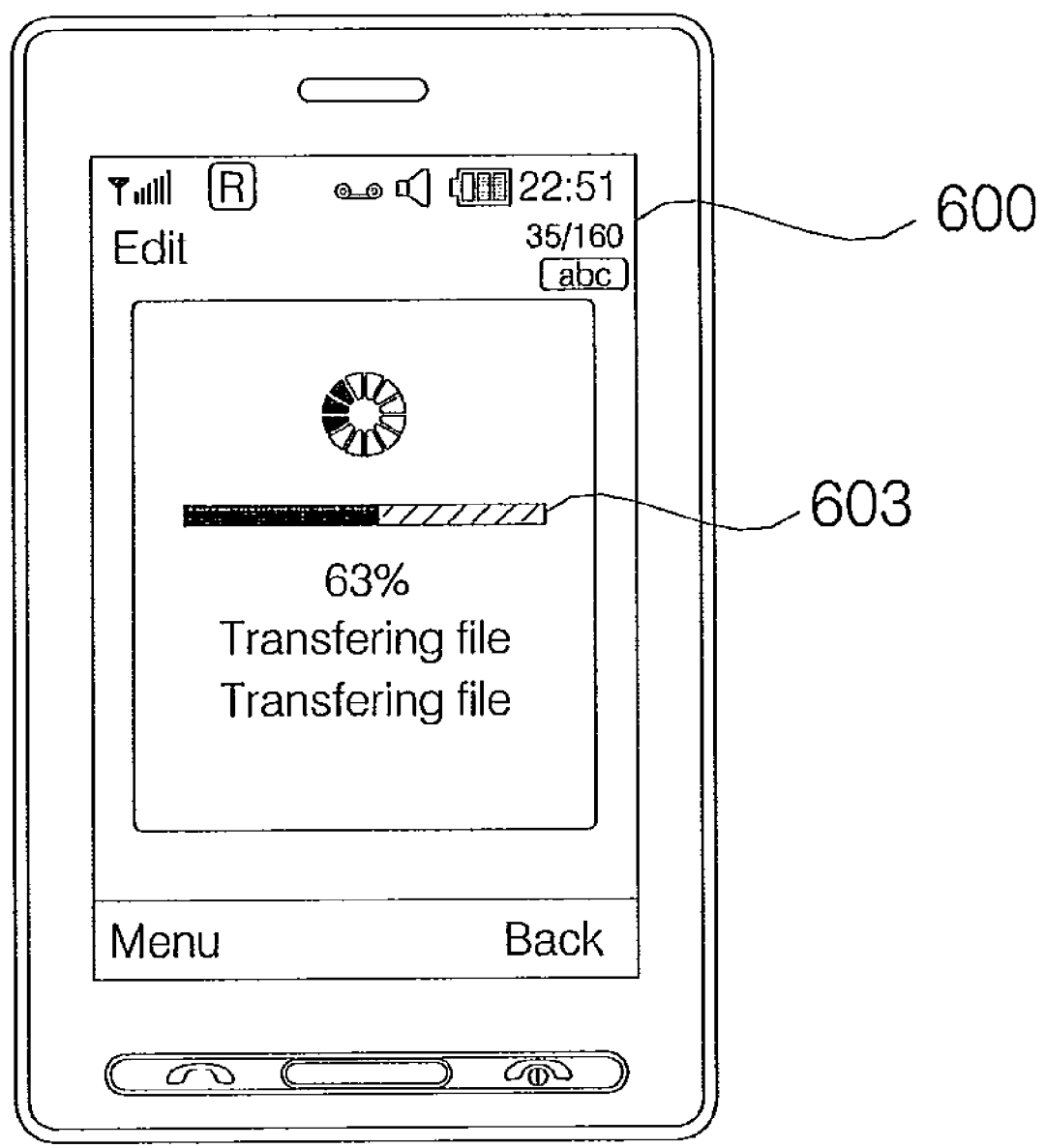

Next, FIG. 17 is a diagram of a file transmission screen 600. Referring to FIG. 17, if the user chooses to transmit a file, the file transmission screen is displayed. The file transmission screen 600 includes a progress bar 603, which indicates how much of the transmission of a file has been done. In this example, a haptic effect may be generated in accordance with a change in the progress bar 603 or a change in an image or an animated image. Different haptic effects may be generated for different types of images or animated images.

Figure 18:
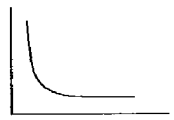
Figure 18:
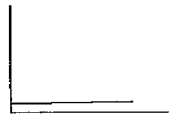
Figure 18:
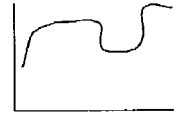
Figure 18:
Figure 18:
Figure 18:
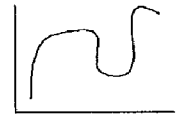
Figure 18:
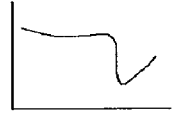
Figure 18:
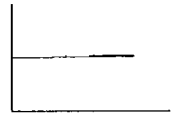
Figure 18:
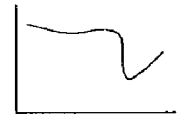

FIG. 18 are diagrams for explaining how to generate different haptic effects having different patterns or different intensities for different types of operations, different speeds of a change of an image or for different rates of a change of an image. As shown in FIG. 18, the intensity and the pattern of vibration may be set for each desired item. The user can also set the intensity and pattern of vibration using the displayed menu options.

Figure 19:
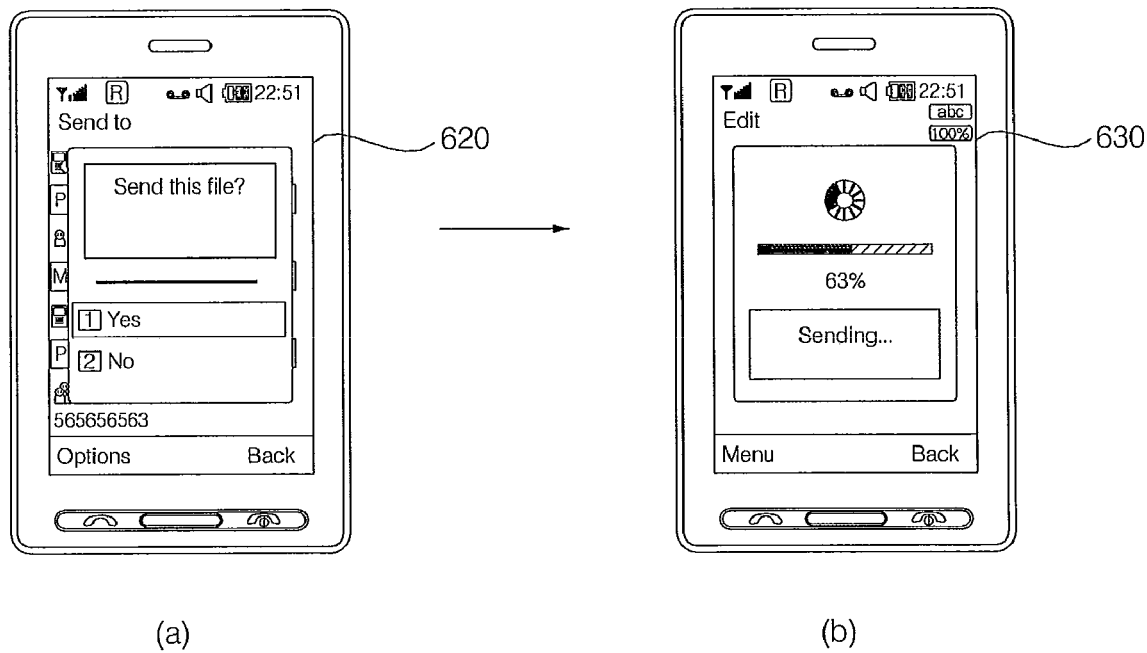

Next, FIG. 19 includes diagrams for explaining how to generate a haptic effect in accordance with the progress in an operation. If the user chooses to send a file from a screen 620 for sending a file, as illustrated in FIG. 19(a), a file transmission screen 630 is displayed, as illustrated in FIG. 19(b). Thereafter, a haptic effect may be generated in accordance with the progress in the transmission of a file. More specifically, the configuration of an operation execution screen may change in various manners for various operating states of the mobile terminal 100 such as at the beginning of an operation, in the middle of the operation, at the end of the operation, upon the occurrence of an error at the beginning of the operation, upon the occurrence of an error during the operation, or upon the occurrence of an error at the end of the operation. A haptic effect may also be generated in accordance with a change in the configuration of the operation execution screen, and the type of the haptic effect may vary according to the type of operation, the type of animated image, or the progression rate of an operation.

Figure 20:
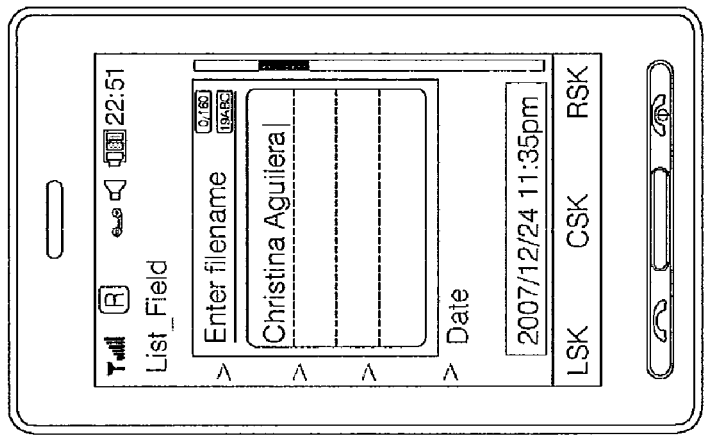
Figure 20:
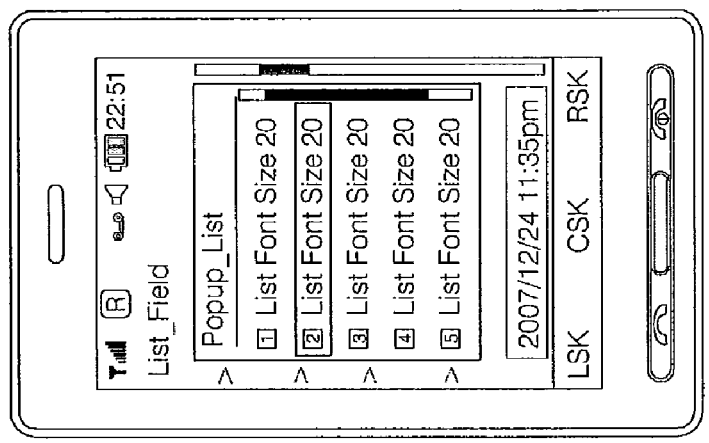
Figure 20:
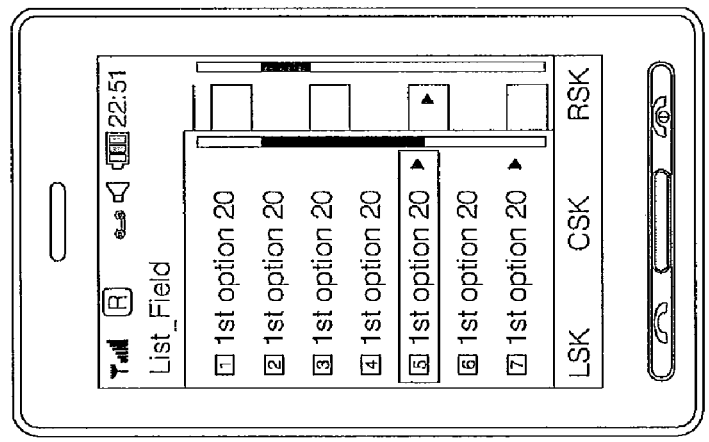
Figure 21:
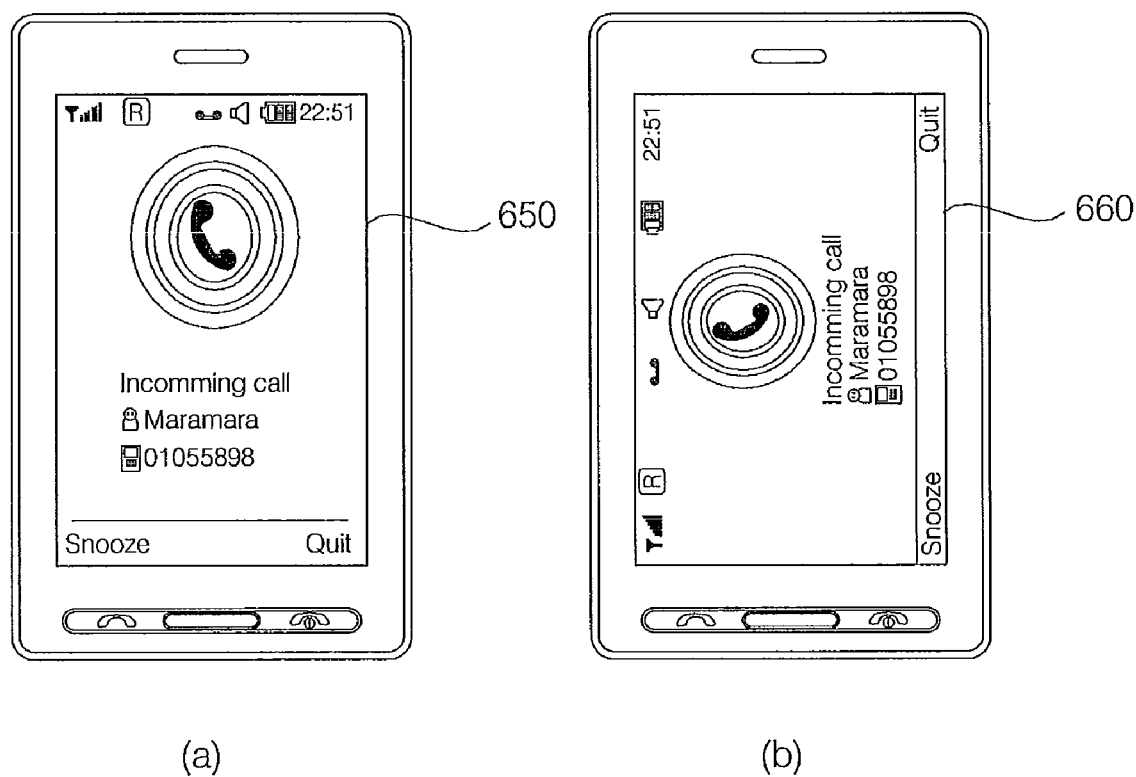

FIG. 20 includes diagrams of various popup screens. Referring to FIG. 20, when a button or a predetermined position on the screen of the display module 151 is touched, a popup screen 641, 643 or 645 including a menu or a number of icons may be displayed, and a haptic effect corresponding to the popup screen 641, 643 or 645 are generated. In this instance, the type of the haptic effect may vary according to the number of popup screens displayed by the display module 151, the relative position of each of the popup screens to a whole screen, the types of the popup screens, and the ratio of the area of each of the popup screens to the area of the whole screen. Next, FIG. 21 includes diagrams for explaining the rotation of a screen image. If the mobile terminal 100 is rotated by 90° when a screen image 650 is displayed as illustrated in FIG. 21(a), a screen image 660 obtained by rotating the screen image 650 by 90° is displayed as illustrated in FIG. 21(b), and a haptic effect indicating the rotation of the screen image 650 may be generated.

Figure 22:
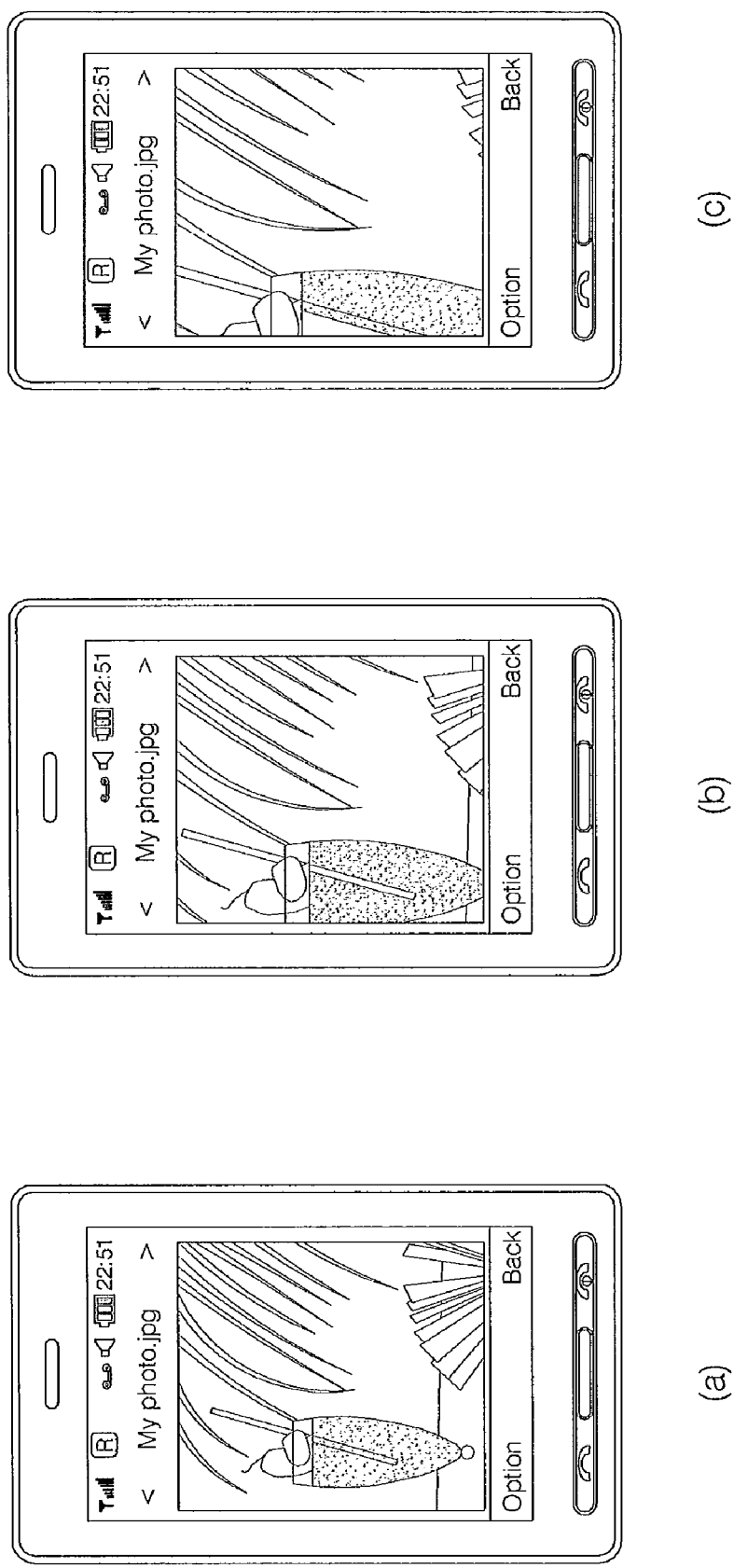
Figure 23:
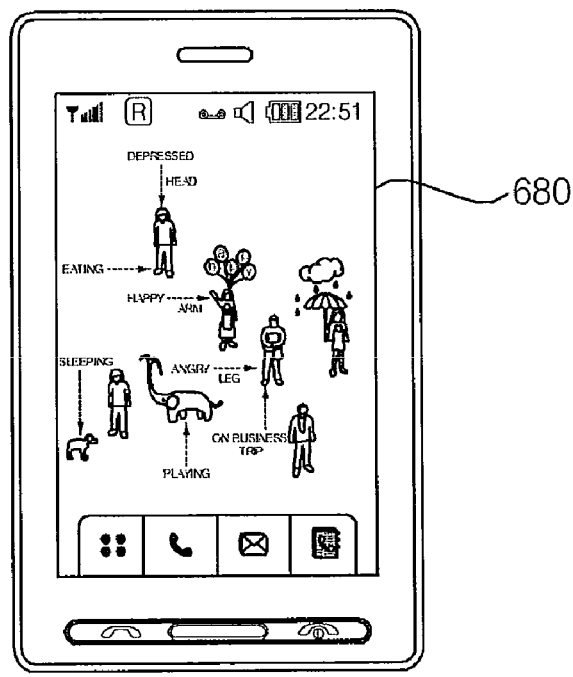

FIG. 22 includes diagrams for explaining the enlargement or the reduction of a screen image. If the user chooses to enlarge or reduce a current screen image when a screen image 673 is displayed as illustrated in FIG. 22(b), an enlarged screen image 675 or a reduced screen image 671 of the screen image 673 is displayed as illustrated in FIG. 22(c) or 22(a), respectively, and a haptic effect corresponding to the enlargement or reduction of the screen image 673 may be generated. In this instance, the type of the haptic effect may vary according to the rate or the speed of enlargement or reduction of the screen image 673. In addition, FIG. 23 is a diagram of an idle avatar screen 680. Referring to FIG. 23, if an avatar mode is chosen from a menu for decorating an idle screen, the idle avatar screen 680 is displayed. If a communication event such as making/receiving a call or the transmission/reception of messages occurs, a number of avatar images representing the parties who engage in the communication event may be displayed on the idle avatar screen 680, and the shapes of the avatar images may be altered according to the progress in the communication event.

In addition, the states of the parties who engage in the communication event, date information, time information, and simple text messages may also be displayed on the idle avatar screen 680. Different avatar images may be designated for different groups registered in a phone book. If any one of the avatar images displayed on the idle avatar screen 680 is touched, the configuration of the idle avatar screen 680 may change. In this instance, a haptic effect corresponding to the change in the configuration of the idle avatar screen 680 may be generated. The type of the haptic effect may vary according to which of the avatar images displayed on the idle avatar screen 680 has been touched and which part of the touched avatar images has been touched.

Figure 24:
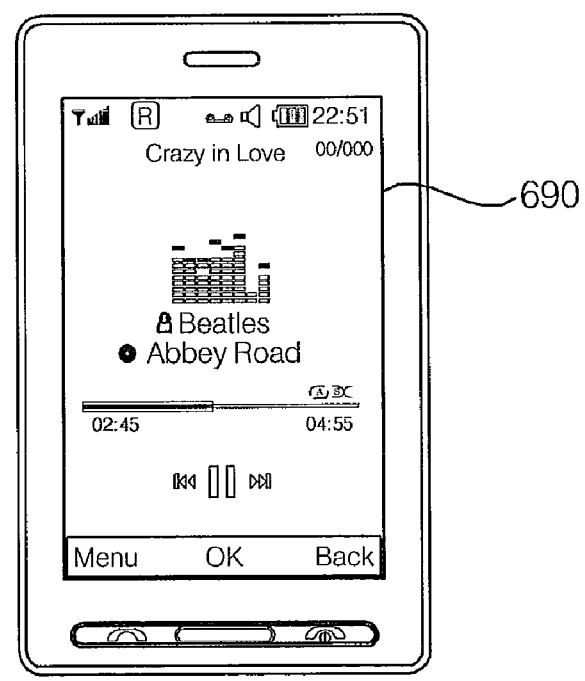

Next, FIG. 24 is a diagram of a music file play screen 690. Referring to FIG. 24, a haptic effect may be generated in accordance with a change in voice/sound, pitch, frequency or amplitude by using the music file play screen 690. For example, an equalizer showing changes in sound in each frequency band may be displayed on the music file play screen 690. The equalizer may include a plurality of bars respectively representing a plurality of frequency bands, and the size of each of the bars of the equalizer may vary in accordance with a change in sound in a corresponding frequency band. In this instance, haptic effect may be generated in accordance with a change in the size of each of the bars of the equalizer. The pattern and the intensity of vibration may vary according to the rate of change of the size of each of the bars of the equalizer.

Figure 25:
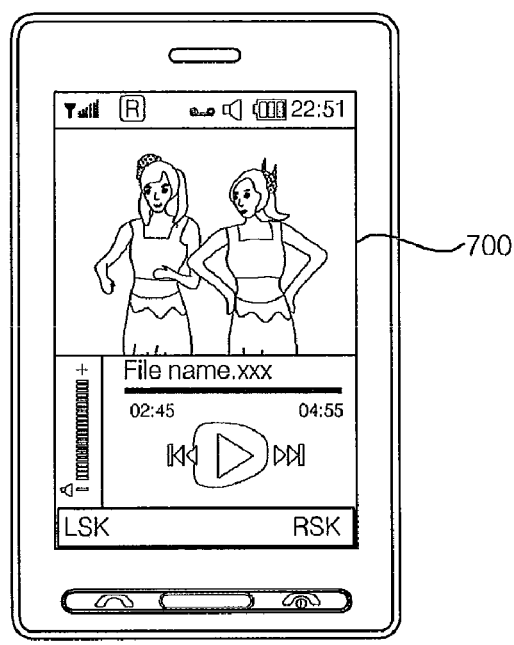
FIGS. 25-31 are diagrams for explaining how to generate and store a haptic effect during the play of a moving image file.
Figure 26:
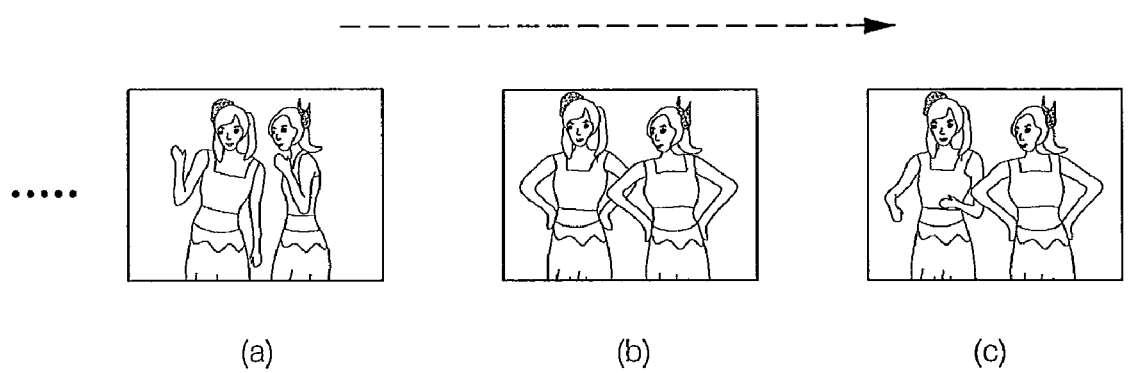

FIGS. 25-31 are diagrams for explaining how to generate and store a haptic effect during the reproduction of a moving image file. More specifically, FIG. 25 is a diagram of a moving image reproduction screen 700. Referring to FIG. 25, various haptic effects may be generated for various changes in the moving image reproduction screen 700. For example, assuming that frames shown in FIGS. 25(a) and 25(b) are previous frames and a frame shown in FIG. 25(c) is a current frame, various vibration effects having different patterns and/or different intensities may be generated according to the rate of change of an image between the previous frames and the current frame. For this, one of a plurality of previous frames stored in advance may be chosen, and the chosen previous frame may be compared with the current frame.

Figure 27:
Figure 27:
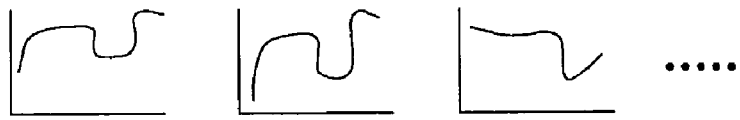
Figure 28:
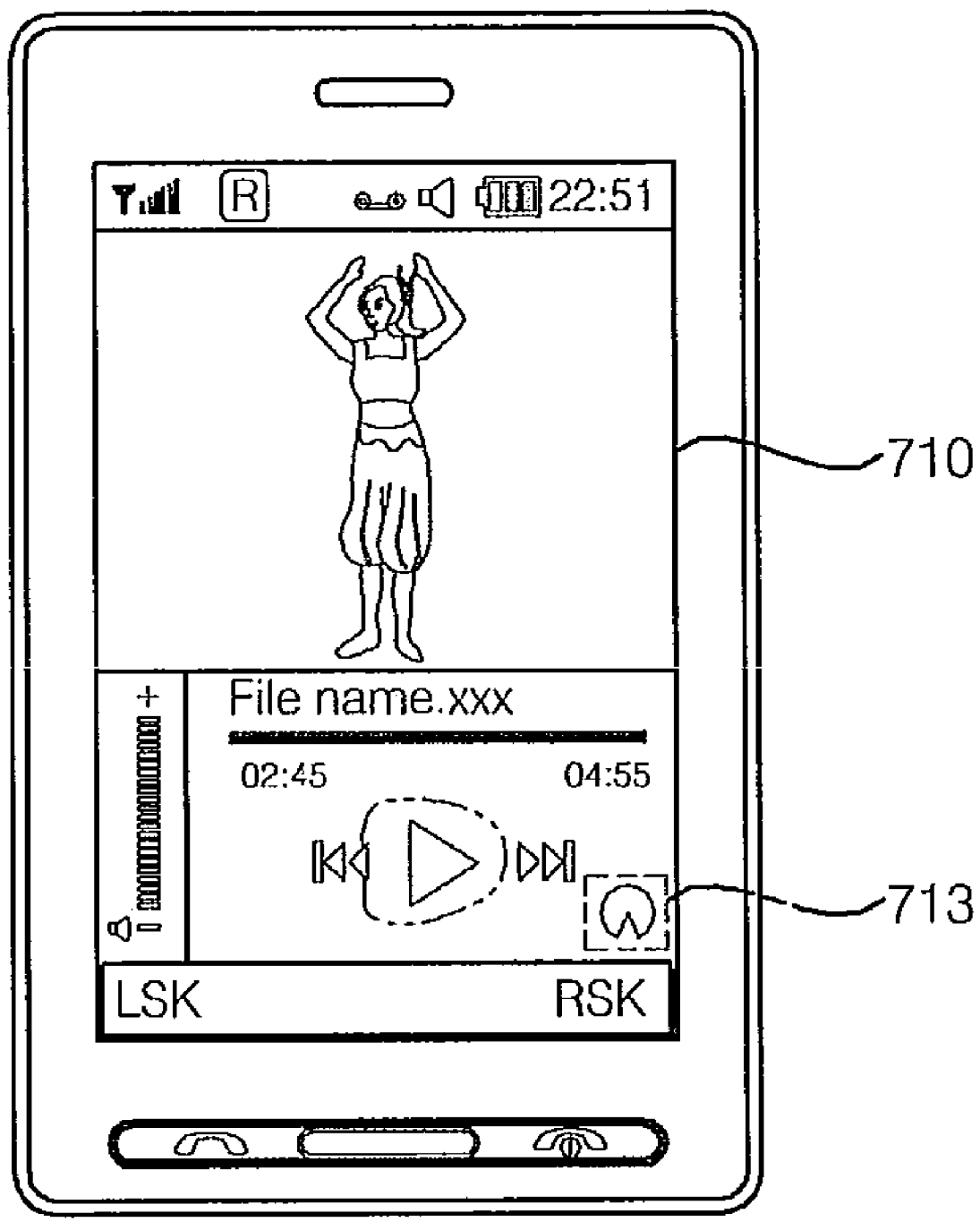
Figure 29:
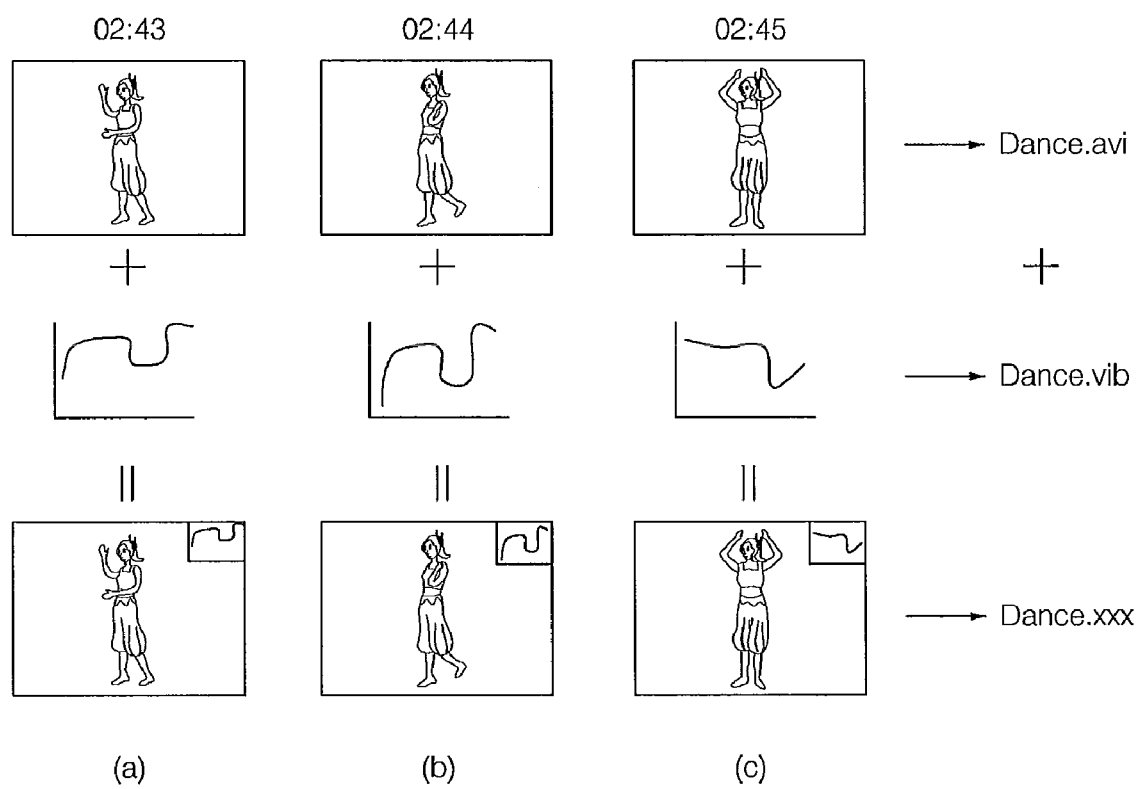

In addition, a number of objects included in a frame may be recognized by their size. Thus, a haptic effect corresponding to whichever of the objects changes most considerably may be generated. FIG. 27 is a diagram showing how to set different vibration effects or different non-vibration haptic effects for different rates of change of an image or for objects having different sizes. Referring to FIG. 27, the user may set different haptic effects for different rates of change of an image or for objects having different sizes. Next, FIG. 28 is a diagram for explaining how to set a haptic effect with the use of a moving image screen 710. Referring to FIG. 28, if the user chooses to reproduce a moving image file, the moving image screen 710 is displayed. The moving image screen 710 includes an icon 713 for setting a haptic effect such as vibration. If the user chooses the icon 713, the user may set a haptic effect for each desired frame of the moving image file, as illustrated in FIG. 29.

If the user sets a vibration effect for a moving image file, vibration data corresponding to the vibration effect may be stored along with synchronization information so as to be synchronized with the moving image file. Referring to FIG. 29, if the moving image file is 'Dance.avi', the vibration data may be stored as 'Dance.vib'. That is, the vibration data may be stored as a file sharing the same file name as that of the moving image file, but having a different extension from that of the moving image file. Therefore, if there is a vibration data file having the same file name as that of a moving image file, the moving image file may be reproduced along with the vibration data file. On the other hand, if there is no vibration data file having the same file name as that of a moving image file, only the moving image file may be reproduced. Further, this embodiment may be applied not only to moving image files but also to music files.

Figure 30:
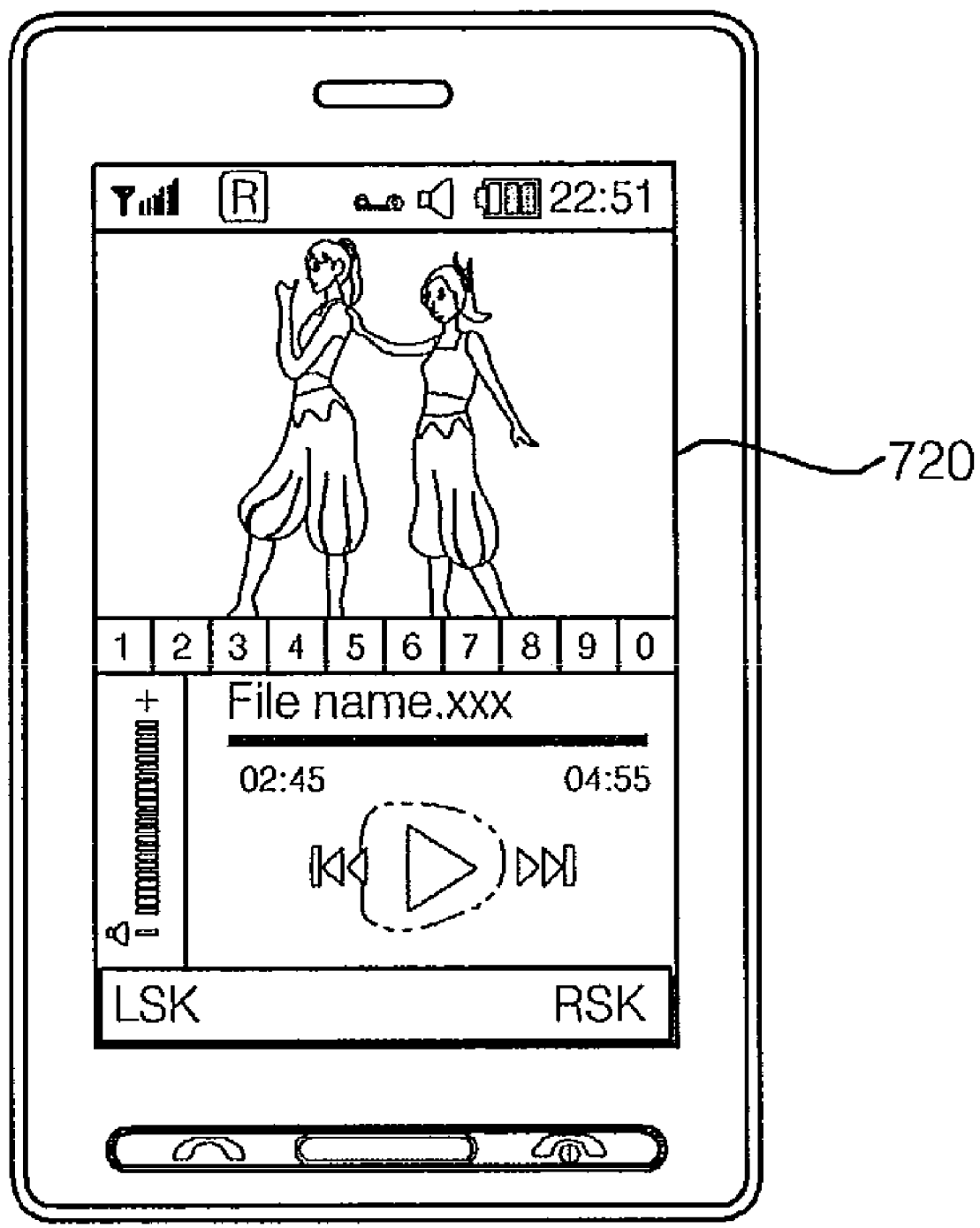
Figure 31:
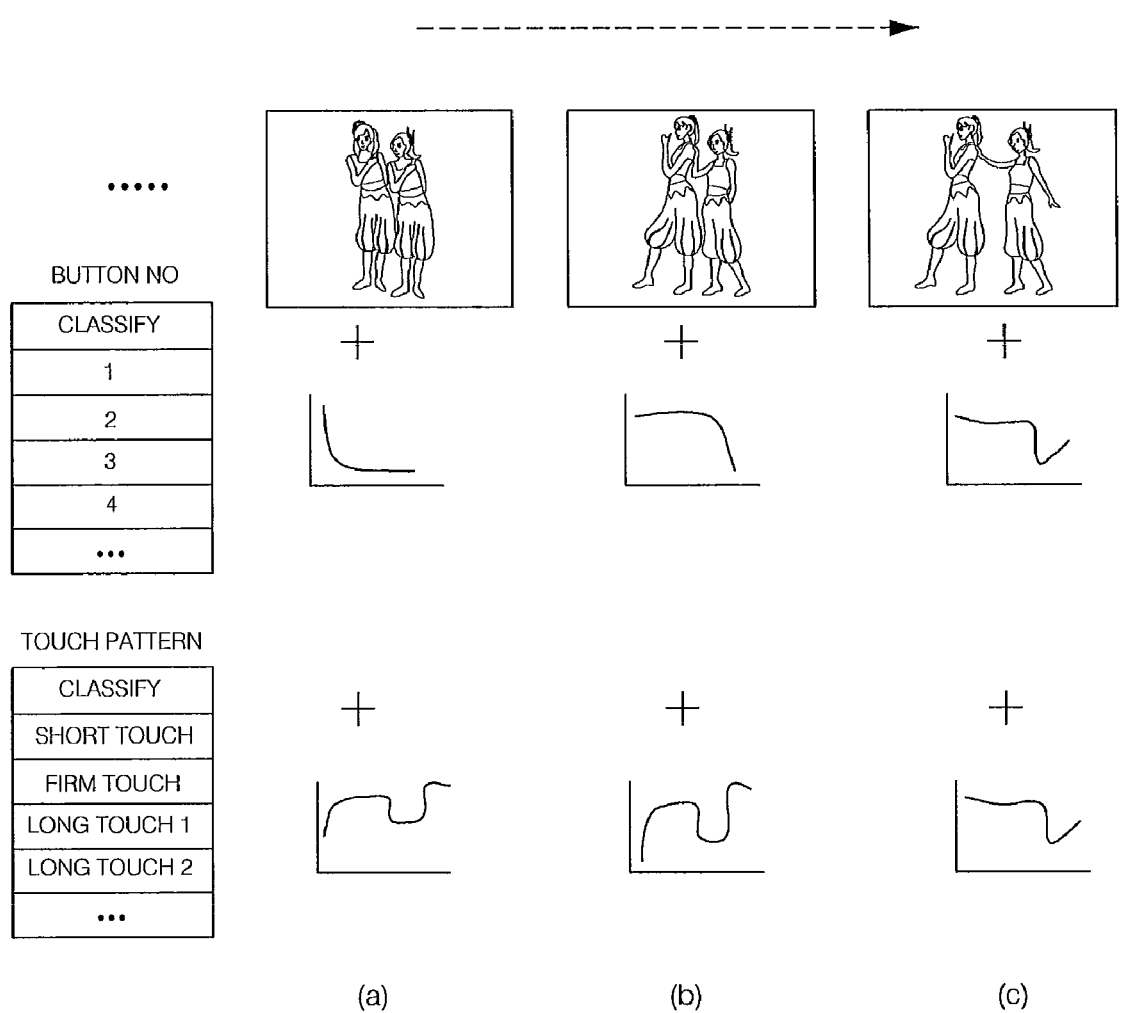

If a number of number icons or menu icons are displayed at a lower portion of a moving image screen 720 as illustrated in FIG. 30, a vibration may be generated in various manners according to which of the number icons or the menu icons is chosen. More specifically, referring to FIG. 31, various vibration effects may be set using the moving image screen 720 so that the pattern and the intensity of vibration can vary according to which of a plurality of icons displayed on the moving image screen 720 has been chosen and how the chosen icon has been touched, i.e., whether the chosen icon has been touched for a short time or for a long time and whether the chosen icon has been touched lightly or firmly.

Figure 32:
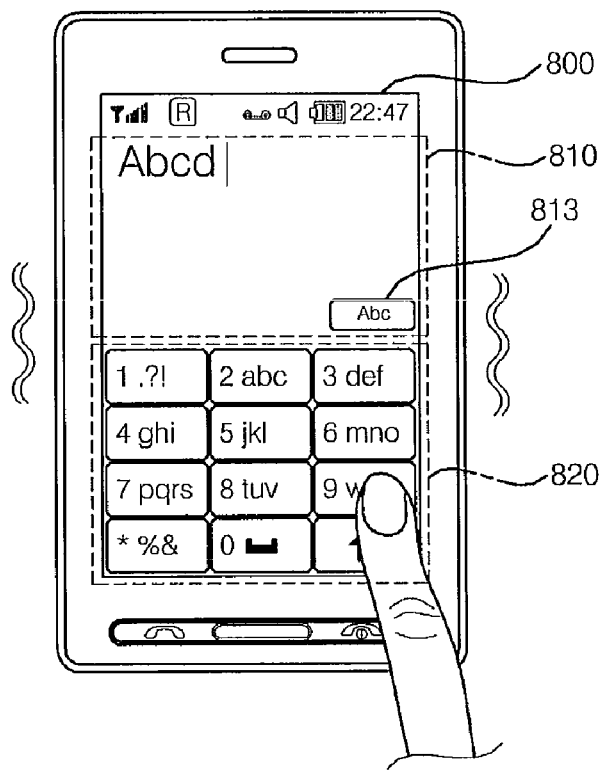
FIGS. 32-42 are diagrams for explaining how to generate a haptic effect according to the content of information displayed on the screen of the display module of the mobile terminal shown in FIG. 1.
Figure 33:
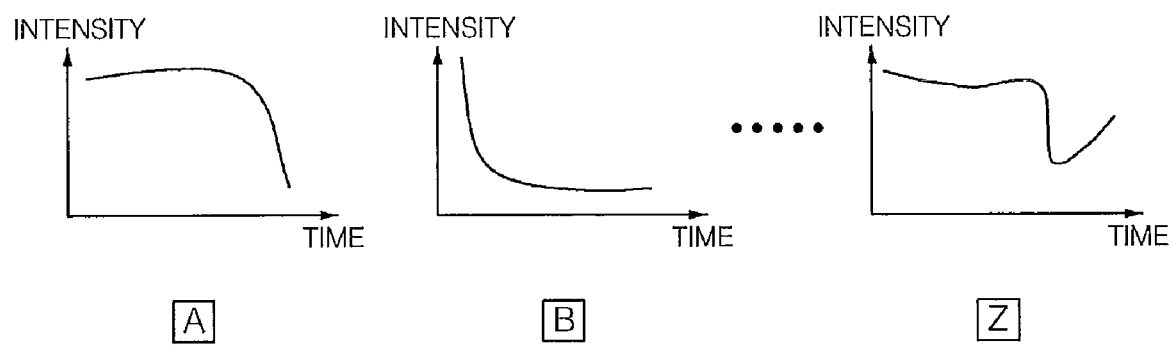

Next, FIGS. 32-42 are diagrams for explaining how to generate a haptic effect according to the content of information displayed on the screen of the display module 151. More specifically, FIG. 32 is a diagram of a character input window 820. Referring to FIG. 32, the character input window 820 and a display window 810 are displayed on a screen 800 of the display module 151. In this example, the character input window 820 includes a plurality of touch keys for inputting numerals to the screen 800 during a call mode. Thus, the display window 810 displays a number of numerals input through the character input window 820. Further, different haptic effects may be generated for different characters mapped to each of the touch keys of the character input window 820. If a character is input using the character input window 820, a haptic effect may be generated in consideration of the configuration of the input character. More specifically, if a vibration is output in response to a touch input for each of the touch keys of the character input window 820, different vibration effects may be designated for different characters mapped to each of the touch keys of the character input window 820. In this manner, the user can easily recognize a character input by the user based on the pattern and the intensity of vibration output by the mobile terminal 100 without the need to look at the screen of the mobile terminal 100. A soft key 813 in FIG. 32 may also be selected to toggle between different types of keypads shown in the window 820. FIG. 33 are graphs illustrating different haptic effect intensities for different characters.

Figure 34:
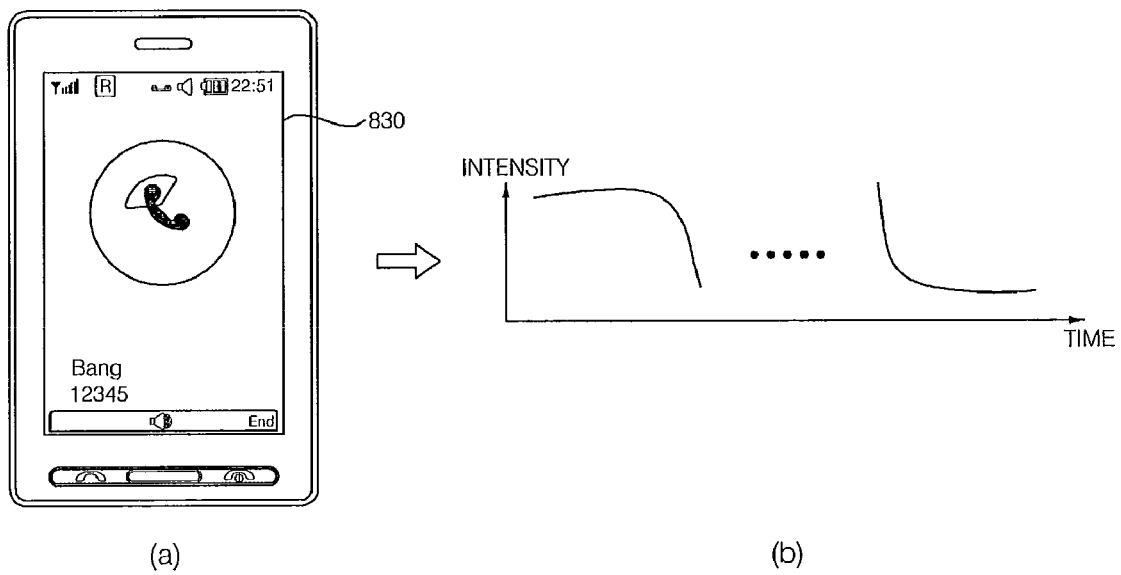

Further, FIG. 34 is a diagram of a call reception screen 830 and a graph of haptic effect intensities. Referring to FIG. 34, if a request for the receipt of a call is issued, the call reception screen 830 is displayed. In this instance, caller information regarding a caller who has issued the request is analyzed, and a haptic effect corresponding to the caller may be generated. In addition, if another call or a message is received during a call with the caller, caller information corresponding to the received call or the received message is analyzed. If the received call or message is associated with any one of a plurality of phone numbers registered in a phone book, a haptic effect corresponding to the caller of the received call or message may be generated. On the other hand, if the received call or message is not associated with any one of the registered phone numbers, a haptic effect corresponding to the phone number of the received call or message may be generated.

Figure 35:
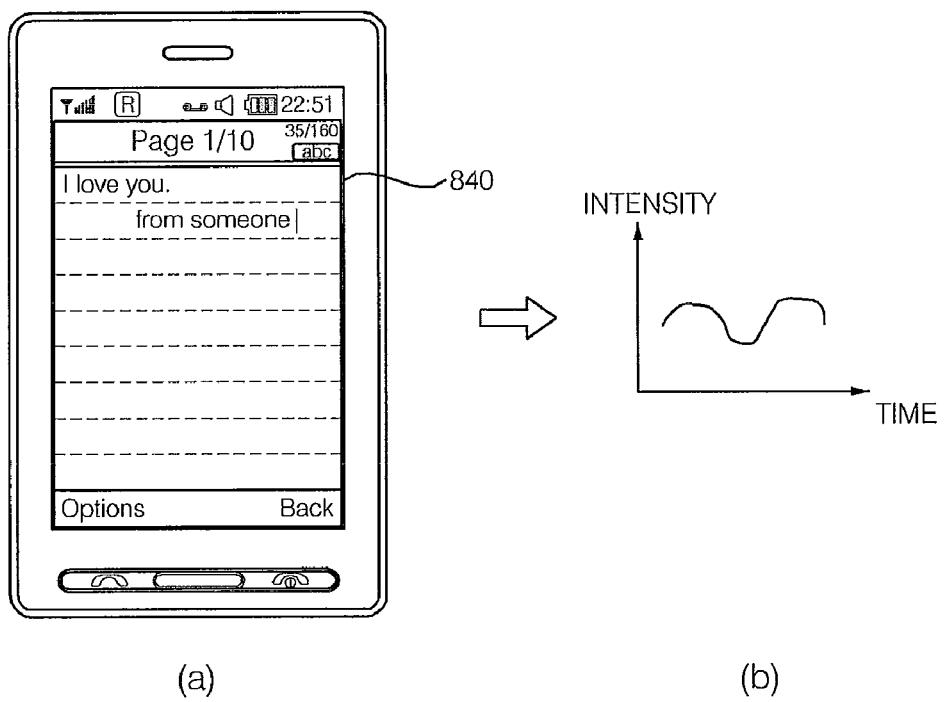

FIG. 35 is a diagram of a message reception screen 840 and a graph of a haptic effect intensities. Referring to FIG. 35, if a message is received during a call, a predetermined word may be parsed from the received message, and a haptic effect corresponding to the parsed word may be generated. The predefined word may be chosen in advance by the user. If vibration is generated as a haptic effect, the intensity and the pattern of vibration to be generated for the predefined word may be set and altered by the user. If a message is received, the content of the received message may be analyzed. If the results of the analysis indicate that the received message includes a predefined word for which a haptic effect is to be generated, a haptic effect corresponding to the predefined word may be generated. The predefined word may be chosen in advance by the user, and the pattern and the intensity of the haptic effect may be set by the user.

Further, during a call with a caller or a callee, the speech of the caller or the callee may be analyzed. If the speech of the caller or the callee includes a predefined word, a haptic effect corresponding to the predefined word may be generated. The predefined word may be chosen by the user. If the voice of the caller or the callee is stored in a database, a haptic effect corresponding to the voice of the caller or the callee may be generated. In addition, if a change in the voice or the voice volume of the caller or the callee is detected during the call with the caller or the callee, a haptic effect corresponding to the voice change or the voice volume change may be generated.

Figure 36:
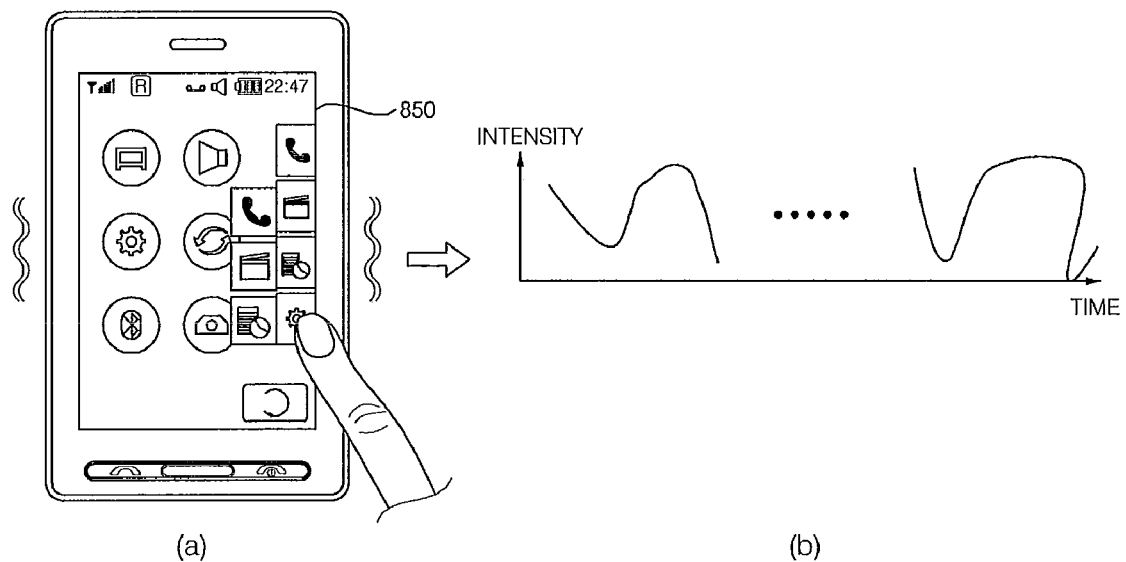

FIG. 36 is a diagram of a screen image 850 including a plurality of menu items and a graph corresponding haptic effect intensities. Referring to FIG. 36, if the user touches or approaches and thus chooses one of the menu items, the name of the chosen menu item may be analyzed, and a haptic effect corresponding to the name of the chosen menu item may be generated. For example, if the user touches and thus chooses a menu item 'setting', haptic effects (such as vibration effects) respectively corresponding to alphabet letters 's', 'e', 't', 't', 'i', 'n', and 'g' may be sequentially output. Alternatively, a predefined haptic effect corresponding to the word 'setting' may be generated so that the user can identify the chosen menu item as the menu item 'setting'. In order to enter the chosen menu item, the user may touch the chosen menu item again. If a new menu item, other than the chosen menu item is selected during the output of a vibration effect corresponding to the chosen menu item, the output of the vibration effect corresponding to the previously-chosen menu item may be terminated, and a haptic effect corresponding to the new menu item may be generated. In this manner, it is possible for the user to recognize the content of any chosen menu item based on a haptic effect.

Figure 37:
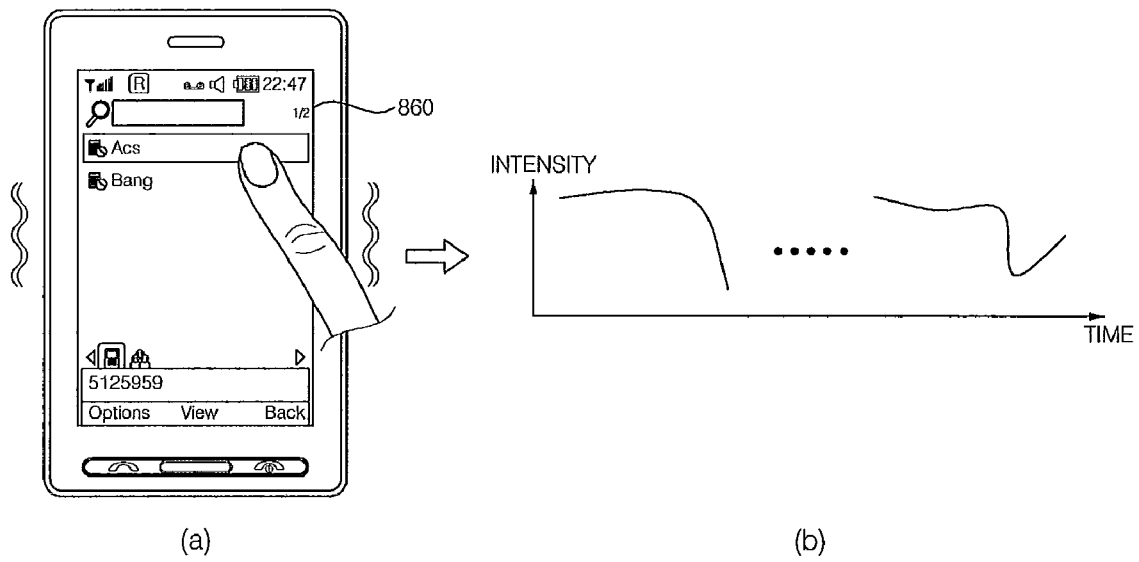

FIG. 37 is a diagram of a phone book list screen 860 and a graph of corresponding haptic effect intensities. Referring to FIG. 37, if the user touches and thus chooses one of a plurality of items displayed on the phone book list screen 860, the name of a person corresponding to the chosen item is analyzed, and a haptic effect may be generated according to the results of the analysis. If the user looks someone up in a phone book by inputting a character string to the phone book list screen 860, the input character string may be analyzed, and a haptic effect corresponding to the input character string may be generated.

Figure 38:
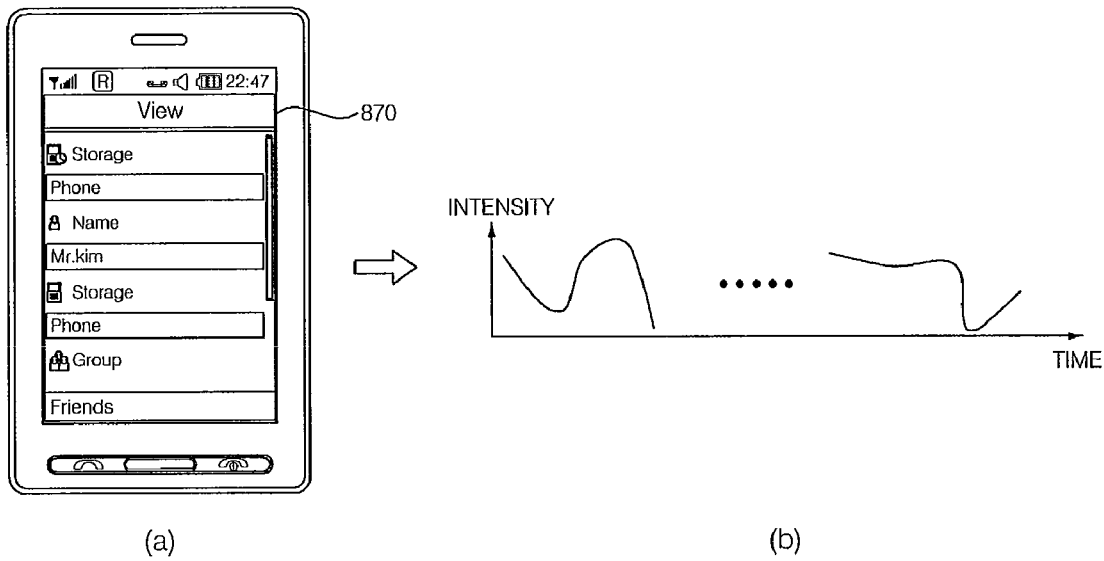

In addition, FIG. 38 is a diagram of a screen image 870 displayed when one of the items of the phone book list screen 860 is selected and a graph corresponding haptic effect intensities. Referring to FIG. 38, if one of the items of the phone book list screen 860 is selected, a group information string corresponding to the chosen item may be analyzed, and a haptic effect may be generated according to the results of the analysis. Alternatively, a haptic effect corresponding to various information, other than group information, may be generated. For example, a haptic effect corresponding to a phone number or a memo may be generated, or a haptic effect indicating whether an image or an avatar is registered may be generated.

Figure 39:
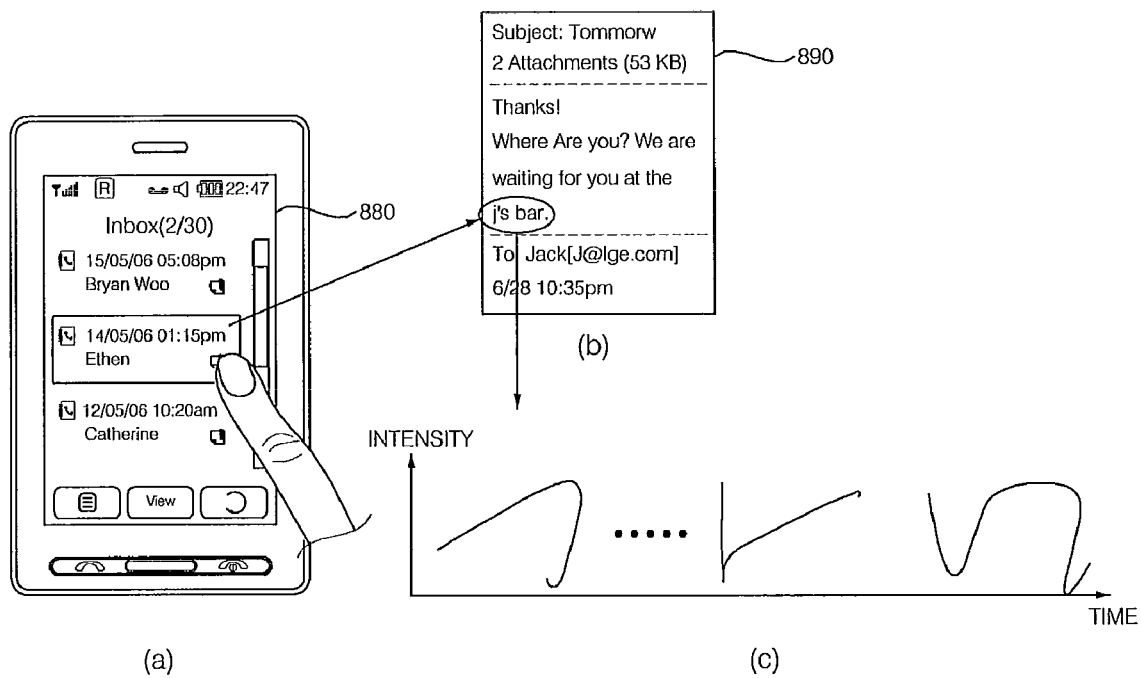

Next, FIG. 39 is a diagram of a message list screen 880 and a graph of corresponding haptic effect intensities. Referring to FIG. 39, if the user chooses to view a list of received messages or sent messages, the message list screen 880 is displayed. If the user touches one of a plurality of items displayed on the message list screen 880, a message 890 corresponding to the selected item may be parsed. If the results of the parsing indicate that the message 890 includes a predefined word, a haptic effect corresponding to the predefined word may be generated.

If a message has a file attached thereto, a haptic effect corresponding to the type of the attached file may be generated. That is, the attached file may be classified into, for example, an image file, a music file, or a game file, according to the extension of the attached file, and a haptic effect corresponding to the type of the attached file may be generated. In this manner, different haptic effects may be generated for different types of attached files. For example, if a message has a game file attached thereto, a haptic effect corresponding to game files may be generated. If a haptic effect is not yet designated for game files, a vibration effect corresponding to a string of alphabet letters 'g', 'a', 'm', and 'e' may be generated. If a message has an image file or a music file attached thereto, a haptic effect may be generated in the above-described manner.

Figure 40:
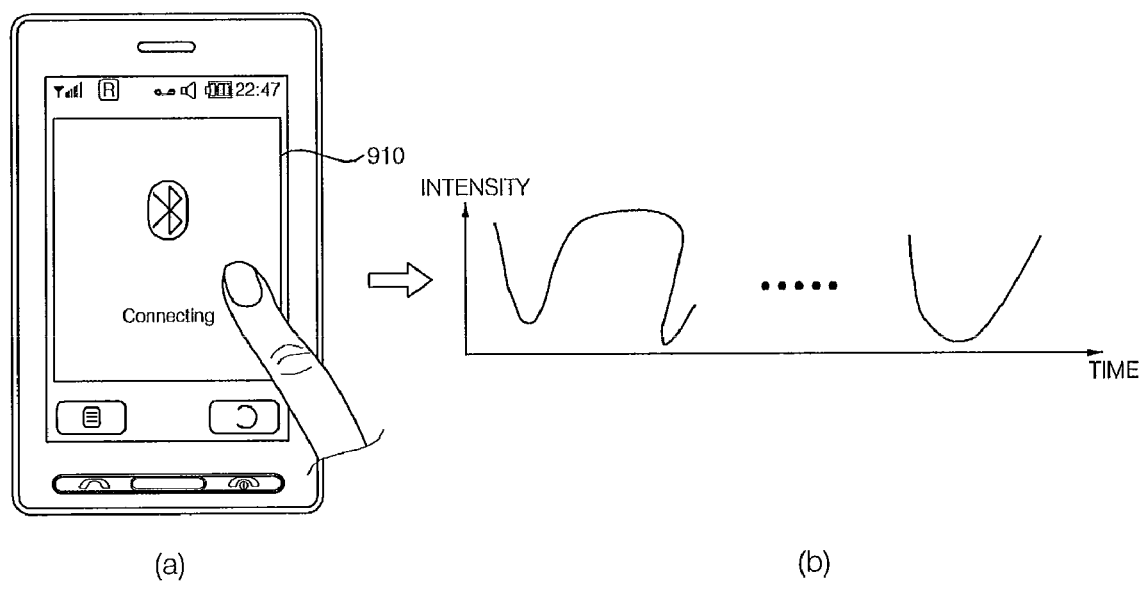

FIG. 40 is a diagram of a short-range communication connection screen 910 and a graph of corresponding haptic effect intensities. Referring to FIG. 40, if the mobile terminal 100 is connected to a short-range communication device such as a Bluetooth device, the short-range communication connection screen 910 is displayed. In this instance, a haptic effect indicating that a short-range communication channel has been established between the mobile terminal 100 and the communication device may be generated. If the mobile terminal 100 receives a file through short-range communication, a haptic effect corresponding to the type of the received file may be generated. That is, the received file may be classified into, for example, an image file, a music file, or a game file, and a haptic effect corresponding to the type of the received file may be generated. For example, if the received file is an image file, a haptic effect corresponding to image files may be generated. If a haptic effect is not yet designated for image files, a haptic effect corresponding to a string of alphabet letters 'i', 'm', 'a', 'g', and 'e' may be generated. In this manner, the user can easily recognize the type of the received file based on a haptic effect generated by the mobile terminal 100 without the need to open the received file.

Figure 41:
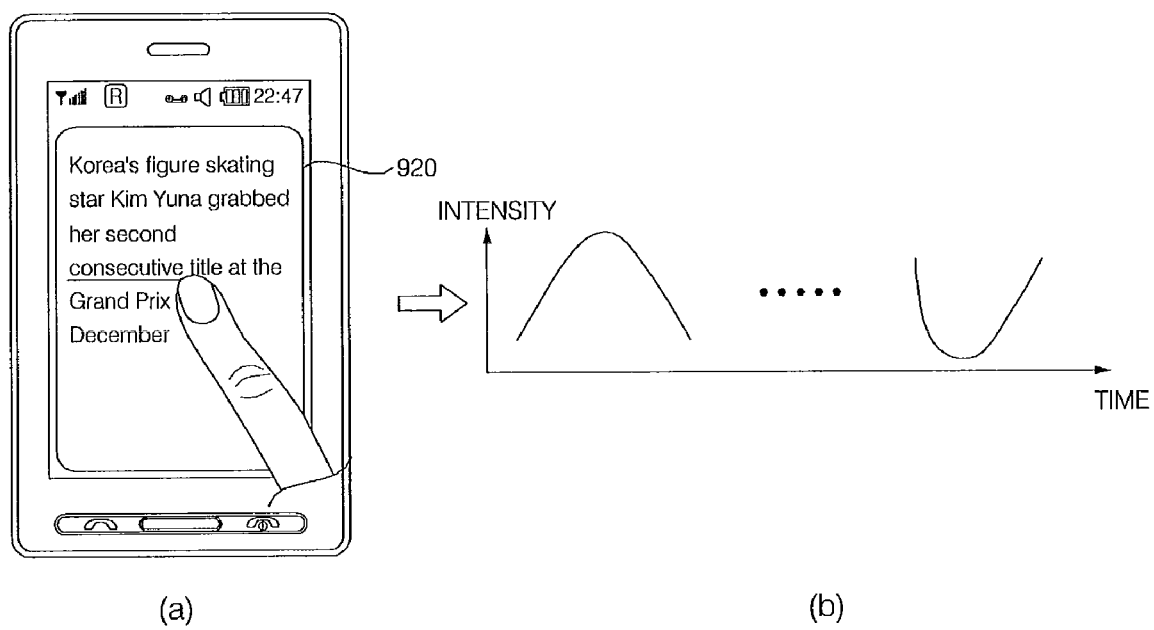

FIG. 41 is a diagram of a document viewer screen 920 and a graph of corresponding haptic effect intensities. Referring to FIG. 41, if a predetermined word included in a document displayed on the document viewer screen 920 is touched and thus chosen, the chosen word is analyzed, and a haptic effect corresponding to the chosen word may be generated. That is, if the chosen word is registered in a wordbook, the user's dictionary or a recent search list database, a haptic effect corresponding to the chosen word may be generated. If the chosen word is touched again during the generation of the haptic effect corresponding to the chosen word, a wordbook or dictionary screen may be displayed.

Figure 42:
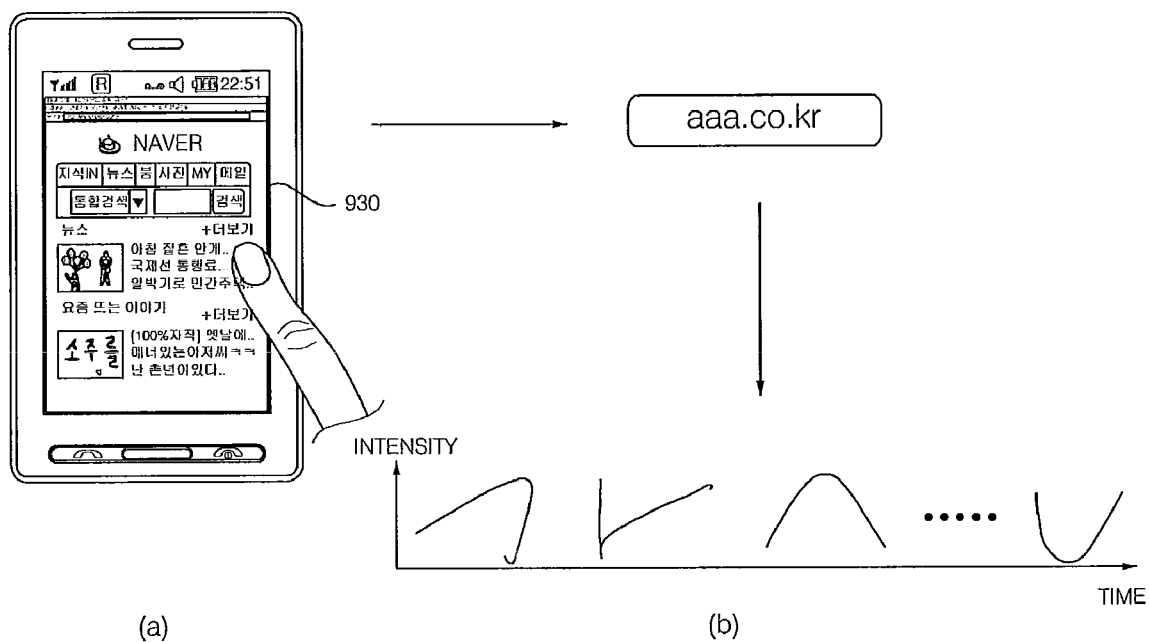

Next, FIG. 42 is a diagram of a web page screen 930 and a graph of corresponding haptic effect intensities. Referring to FIG. 42, if a uniform resource locator (URL) displayed on the web page screen 930 is touched, a vibration effect or a non-vibration haptic effect corresponding to the character pattern of the URL may be generated. If the URL is touched again during the generation of the haptic effect corresponding to the character pattern of the URL, a web page corresponding to the URL may be displayed. If a web browser is executed and a link corresponding to a URL registered as Favorites is touched, a URL string corresponding to the URL is analyzed, and a haptic effect corresponding to the URL string may be generated. In this instance, if the URL is touched again during the generation of the haptic effect corresponding to the character pattern of the URL, a web page corresponding to the touched link may be displayed.

Further, if a single application currently being executed on the mobile terminal is a web browser function corresponding to a particular webpage, the controller 180 can first activate a second vibration module and then activates a first vibration module to represent a change of an item displayed on the particular webpage. The first vibration module can be disposed in a central area of the mobile terminal, and the second vibration module can be disposed at an area outside the central area. Similarly, if the function for the single application currently being executed on the mobile terminal is a web browser function corresponding to a particular webpage, the controller 180 can first activate the first vibration module and then activate the at least one second vibration module to represent data has been successfully transferred to the particular webpage. A similar concept can be applied to an incoming or outgoing call or message, a missed call or text message, etc.

In more detail, the plurality of vibration modules can be disposed at different positions on the mobile terminal. For example, a first vibration module can disposed in a central area of the mobile terminal and at least one second vibration module can disposed at an area outside of the central area of the mobile terminal. Then, when the function for the single application currently being executed on the mobile terminal is an incoming function, the controller 180 can first activate the at least one second vibration module and then activate the first vibration module to represent the incoming function. This vibration gives an incoming sensation to the user so they intuitively know the function being performed on the mobile terminal. The incoming function can include an incoming email, and incoming message, incoming phone call, etc.

In another embodiment, when the function for the single application currently being executed on the mobile terminal is an outgoing function, the controller 180 can first activate the first vibration module and then activate the at least one second vibration module to represent the outgoing function. Further, the outgoing function can include an outgoing email, and outgoing message, outgoing phone call, etc. In still another embodiment, when the function for the single application currently being executed on the mobile terminal is a web browser function corresponding to a particular webpage, the controller 180 can first activate the at least one second vibration module and then activate the first vibration module to represent a change of an item displayed on the particular webpage.

Also, when the function for the single application currently being executed on the mobile terminal is a web browser function corresponding to a particular webpage, the controller 180 can first activate the first vibration module and then activate the at least one second vibration module to represent data has been successfully transferred to the particular webpage. When the function for the single application currently being executed on the mobile terminal is a missed incoming function, the controller 180 can first activate the at least one second vibration module and then activate the first vibration module to represent the missed incoming function.

In addition, the controller 180 can activate the vibration modules in a particular pattern around the terminal to inform the user of a particular function. For example, for an incoming function, the controller 180 can activate the vibration modules in a spiral pattern going from outside vibration modules spirally towards inside vibration modules. This gives the user an inward spiral feeling intuitively information them of an incoming function. Similar concepts apply to outgoing functions, web browser functions, etc.

Figure 43:
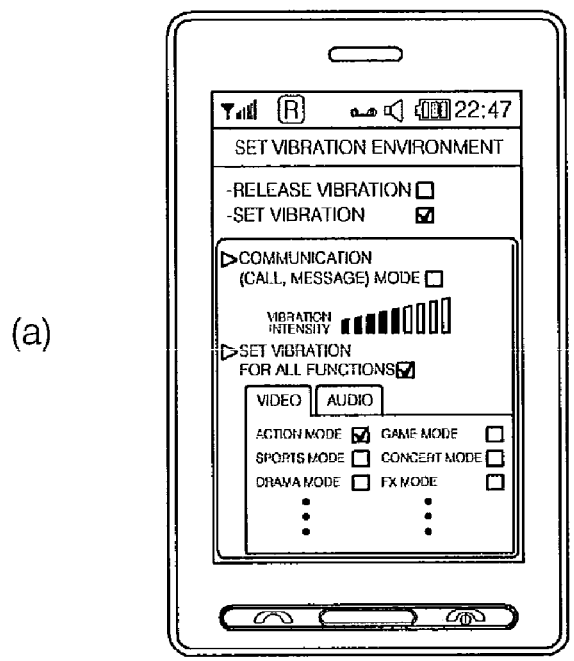
FIGS. 43-45 are diagrams for explaining how to set a vibration mode.
Figure 43:
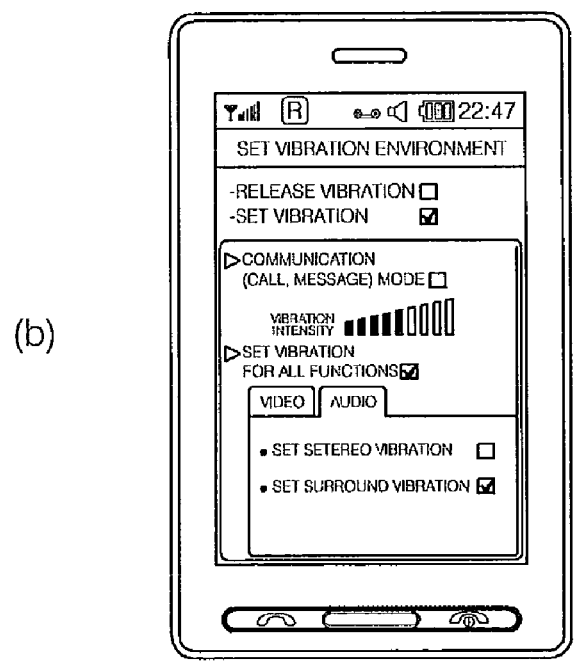
Figure 44:
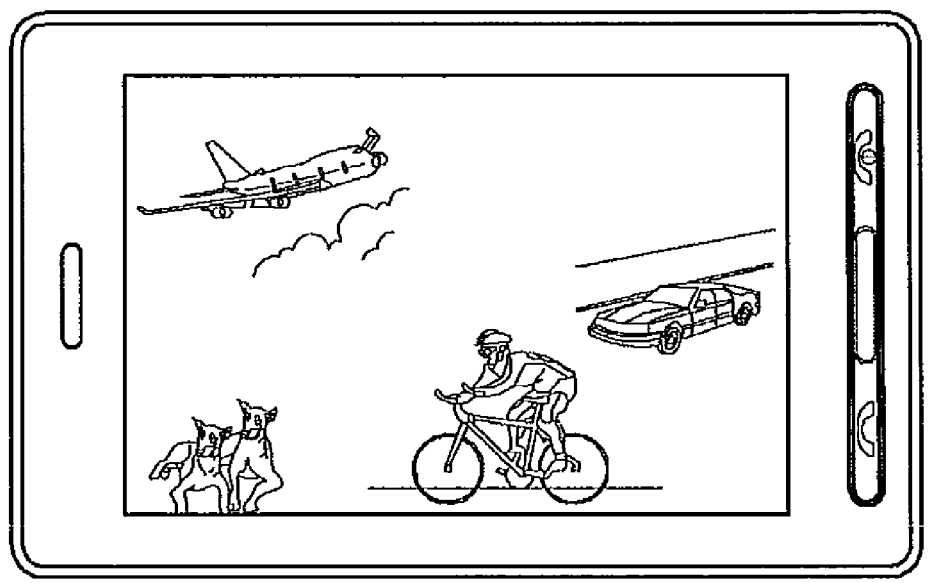
Figure 44:
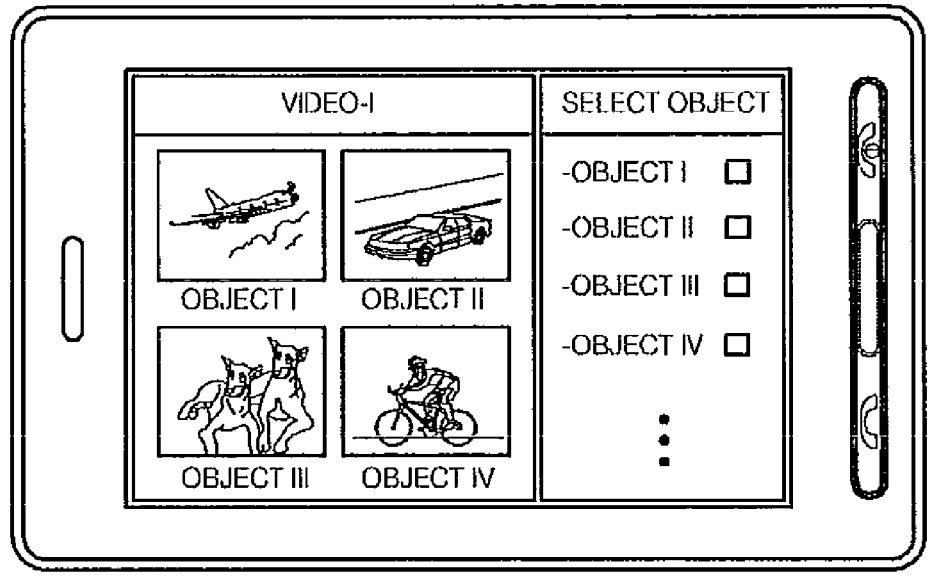
Figure 45:
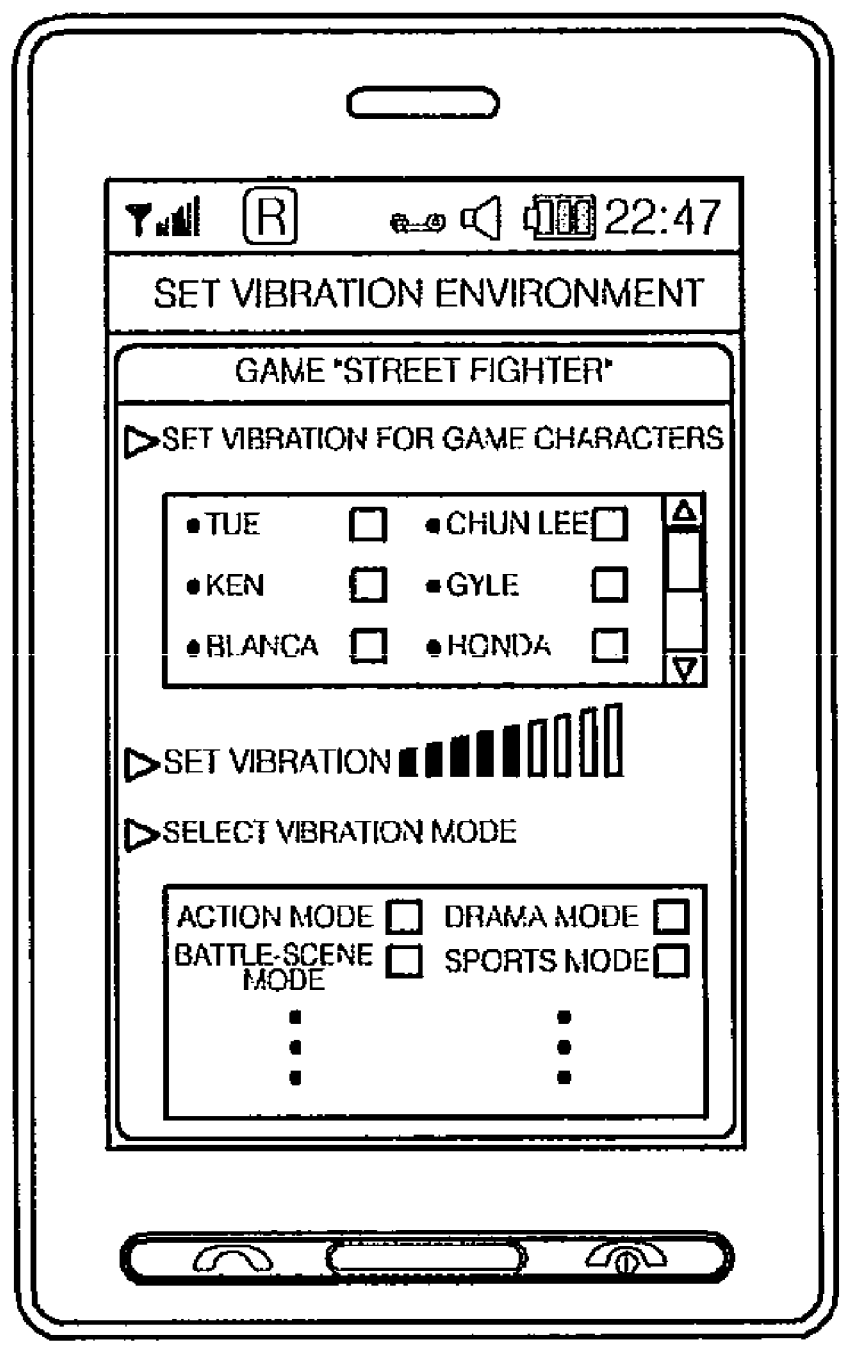

FIGS. 43-45 are diagrams showing how to set a vibration mode. More specifically, FIG. 43(*a*) illustrates a diagram showing how to activate a vibration mode before the play of a moving image, and FIG. 43(b) is a diagram showing how to control the output of vibration using audio data. Referring to FIG. 43, the mobile terminal 100 may control the output of vibration using pulse amplitude modulation (PAM) data. For this, the controller 180 may detect PAM data of stereo audio data from a moving image currently being played by a codec, and may determine the direction and intensity of vibration to be output based on the detected PAM data. More specifically, if the user chooses a stereo-vibration mode, the controller 180 may drive at least one vibration device (particularly, two or more vibration devices) and may control the operation of the vibration device based on the detected PAM data. If the user chooses a surround-vibration mode, the controller 180 may drive at least two or more vibration devices (particularly, three or more vibration devices) and may control the operation of the vibration devices based on the detected PAM data. The control of vibration using audio data or the control of vibration using video data may be selectively applied to the mobile terminal 100. Alternatively, the control of vibration using both audio data and video data may be applied to the mobile terminal 100.

FIG. 44 includes diagrams showing how to set a vibration effect for a moving image. Referring to FIGS. 44(a) and (b), a vibration effect may be set for each of a number of objects included in a moving image during the play of the moving image using an MPEG-4 method. FIG. 45 is a diagram showing how to apply vibration control to a game. Referring to FIG. 45, the vibration devices included in the mobile terminal 100 may be controlled using a similar method to that used in MPEG-4 (or H.264). That is, the user may choose one or more of a number of game characters to which a vibration effect is to be applied, and may determine the type of vibration mode (e.g., an action mode, a sports mode, a drama mode, a concert mode, or a battle-scene mode) and the intensity of vibration for the chosen game character. Once a game character to which a vibration effect is to be applied is chosen, the direction and intensity of vibration generated by the vibration devices included in the mobile terminal 100 may be appropriately controlled according to the movement (e.g., a motion vector) of the chosen game character.

Figure 46:
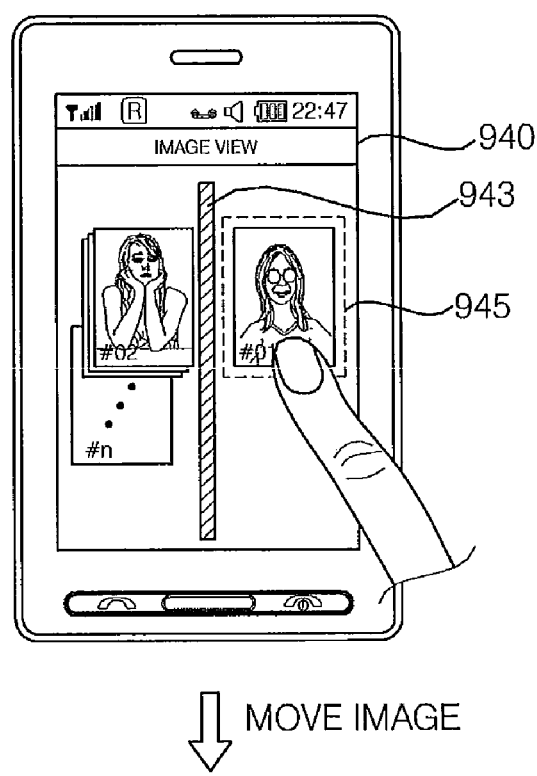
FIGS. 46 and 47 are diagrams for explaining how to generate a haptic effect when an image viewer is executed.
Figure 46:
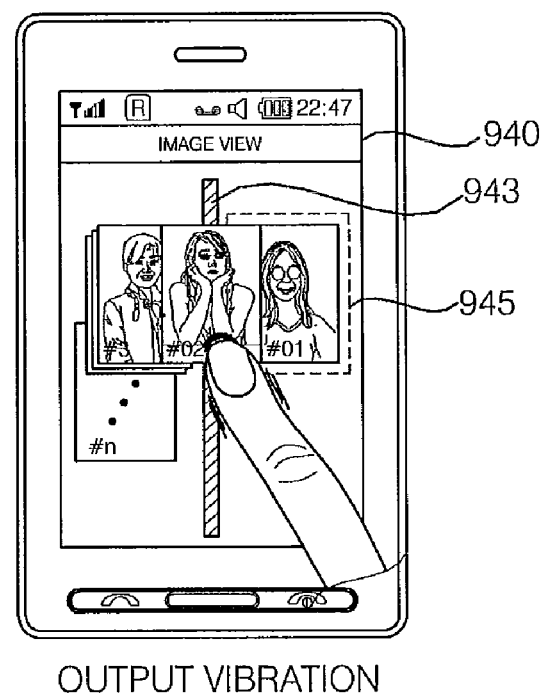

Next, FIG. 46 includes diagrams of an image viewer screen 940. Referring to FIG. 46, a plurality of images, i.e., images #1 through #n, are displayed on one side of the image viewer screen 940. After viewing each of images #1 through #n, the user may move a corresponding image to a target point 945 beyond a critical point 943 by performing a touch manipulation operation such as using a touch-and-drag operation or a flicking operation. The critical point 943 may be a reference point for moving an image. That is, an image may be moved to the target point 945 only when being moved beyond the critical point 943. Therefore, if the user terminates a touch manipulation operation after moving an image beyond the critical point 943, the image may be automatically moved to the target point 943. On the other hand, if the user terminates a touch manipulation operation before moving an image beyond the critical point 943, the image may automatically return to its original location.

In addition, an acceleration motion technique may be applied to the rendering of an image moved either to the target point 945 or to its original location upon the termination of a touch manipulation operation by the user. An acceleration motion technique is an animation technique in which various physical principles regarding the motion of an object such as acceleration and deceleration are applied to the rendering of the motion of an object. That is, referring to FIG. 46, if the user terminates a touch manipulation operation after moving an image beyond the critical point 945, the image is automatically moved to the target point 945.

Figure 47:
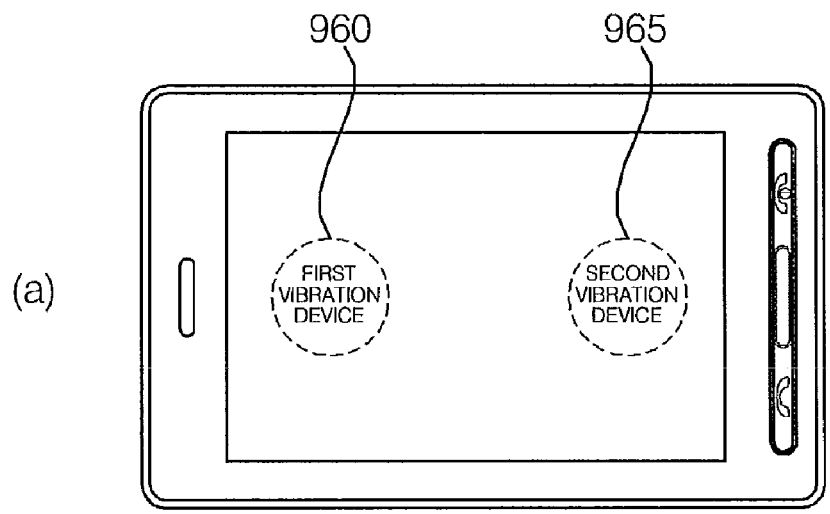
Figure 47:
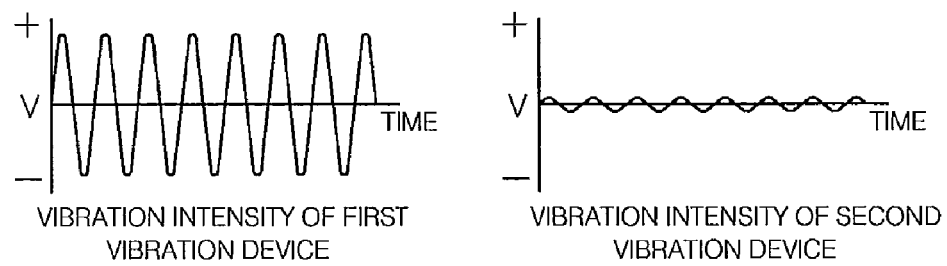
Figure 47:
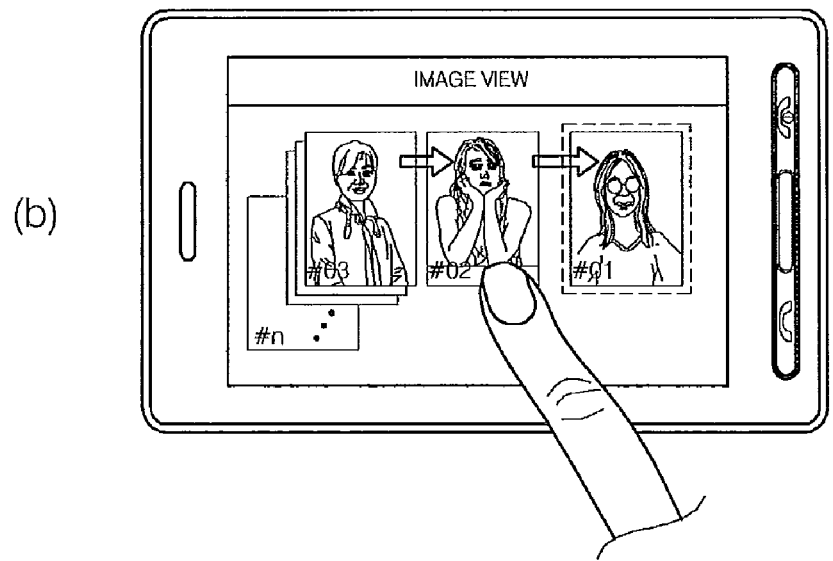

FIG. 47 includes diagrams showing how to control the output of vibration using two vibration devices. Referring to FIG. 47, when an image viewer is executed, first and second vibration devices 960 and 965 may be driven, instead of setting a critical point. If the user moves an image from one side to another side of the image viewer in order to view the next image, the first and second vibration devices 960 and 965 may be driven. More specifically, if the user moves an image from one side to another side of the image viewer by performing, for example, a touch-and-drag operation or a flicking operation, the controller 180 may drive the first and second vibration devices 960 and 965, and thus, the first and second vibration devices 960 and 965 may generate vibration with different intensities. The intensity of vibration generated by the first vibration device 960 may be higher than the intensity of vibration generated by the second vibration device 965. Thus, the closer an image gets to a target point, the weaker vibration the user gets from the mobile terminal 100.

Figure 48:
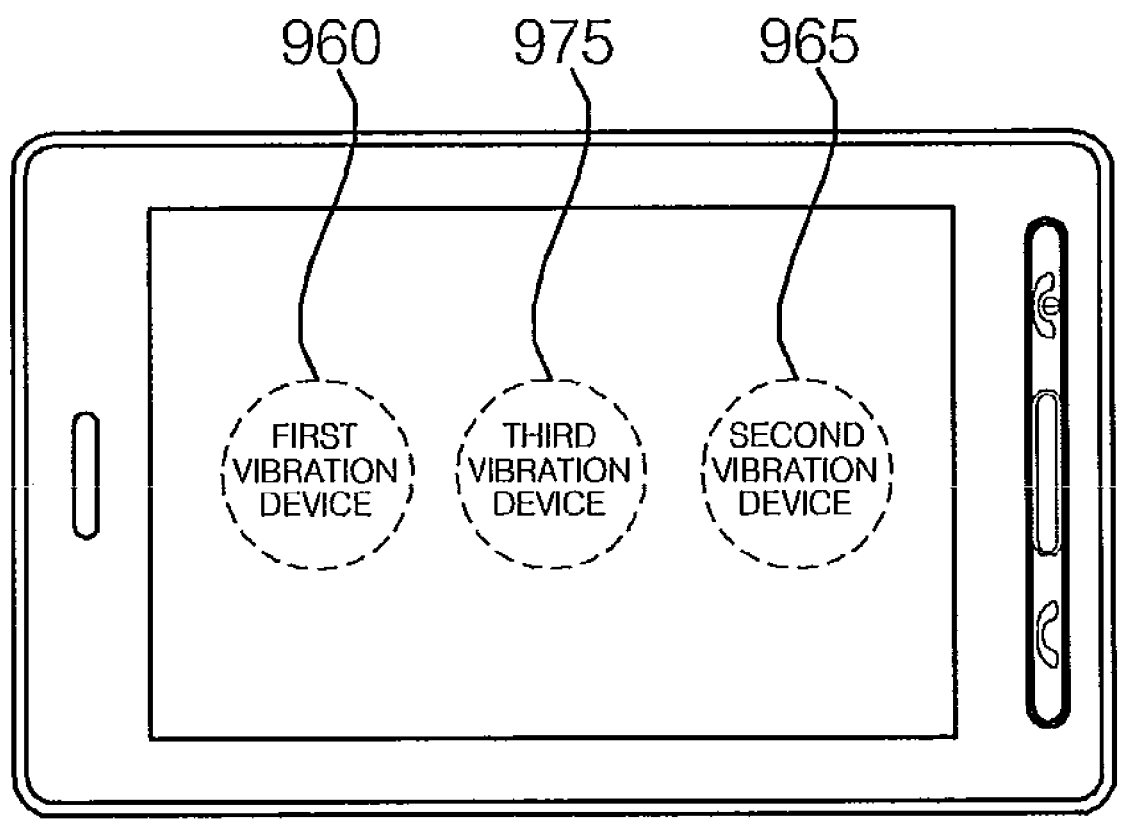
FIGS. 48-52 are diagrams for explaining how to generate a haptic effect upon the enlargement or reduction of an image.

Next, FIGS. 48-52 are diagrams showing how to generate a haptic effect upon the enlargement or reduction of an image. In more detail, FIG. 48 is a diagram showing how a plurality of first, second and third vibration devices 960, 975 and 965 are arranged. Referring to FIG. 48, the first and second vibration devices 960 and 965 may be arranged so as to transmit vibration radially from the edges to the center of the screen of the display module 151. The third vibration device 975 may be arranged so as to transmit vibration radially from the center to the edges of the screen of the display module 151.

Figure 49:
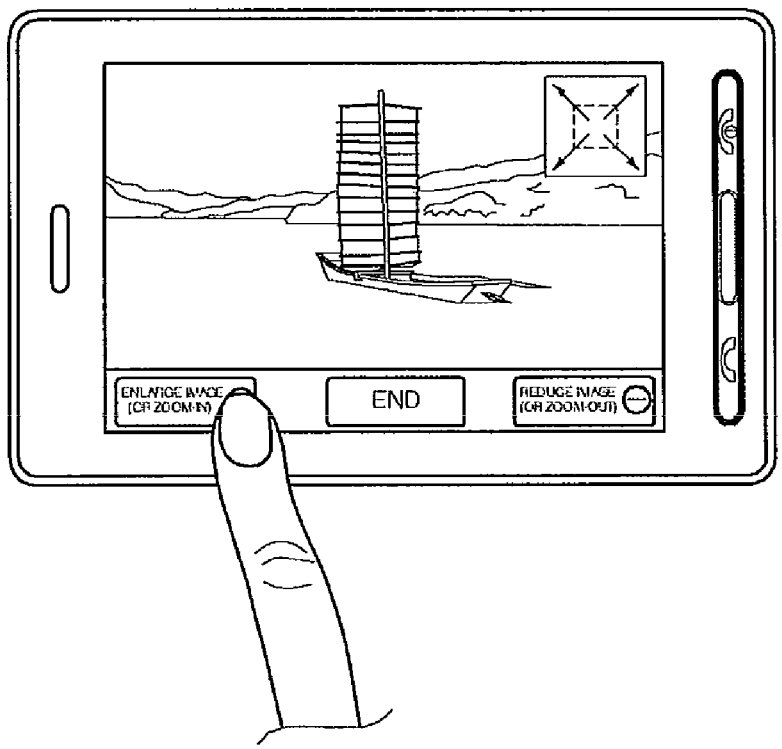
Figure 49:
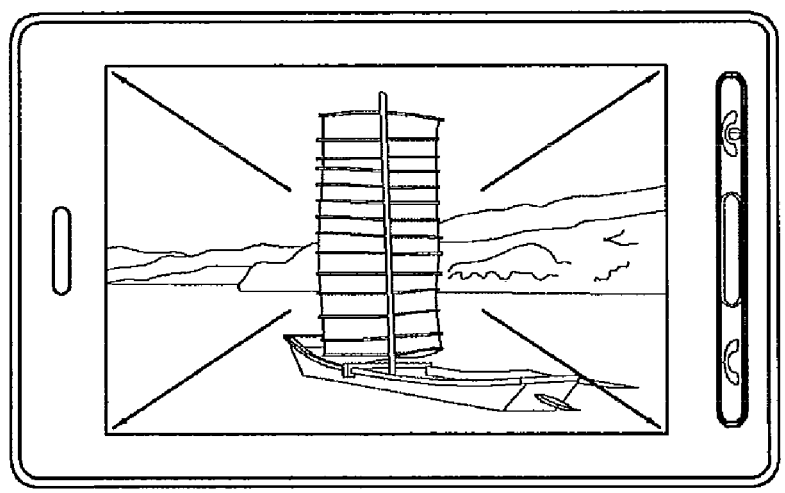
Figure 50:
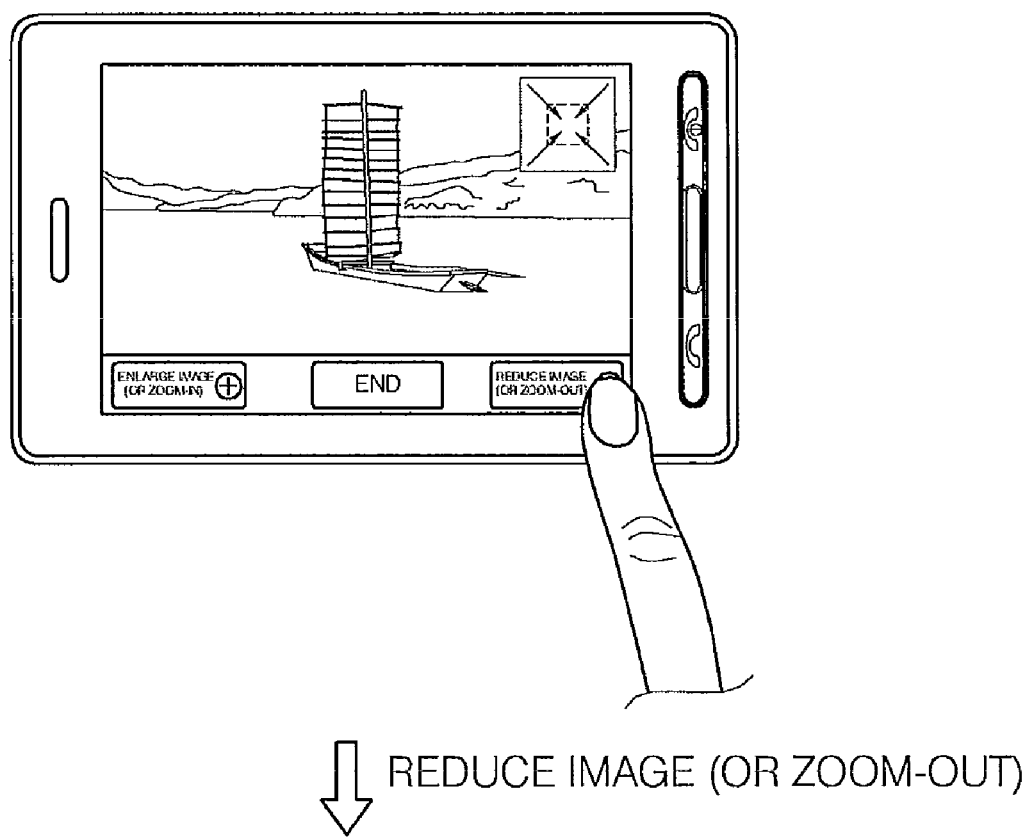
Figure 50:
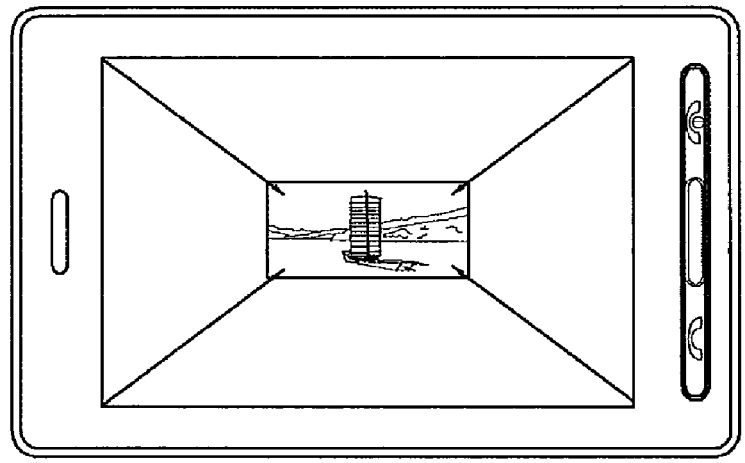

Thereafter, if a command to enlarge an image (or a zoom-in command) is received from the user, the controller 180 may drive the third vibration device 975, and thus, the third vibration device 975 may generate vibration and may then transmit the vibration radially from the center to the edges of the screen of the display module 151, as shown in FIG. 49. On the other hand, if a command to reduce an image (or a zoom-out command) is received from the user, the controller 180 may drive the first and second vibration devices 960 and 965, and thus, the first and second vibration devices 960 and 965 may generate vibration and may then transmit the vibration radially from the edges to the center of the screen of the display module 151, as shown in FIG. 50.

Figure 51:
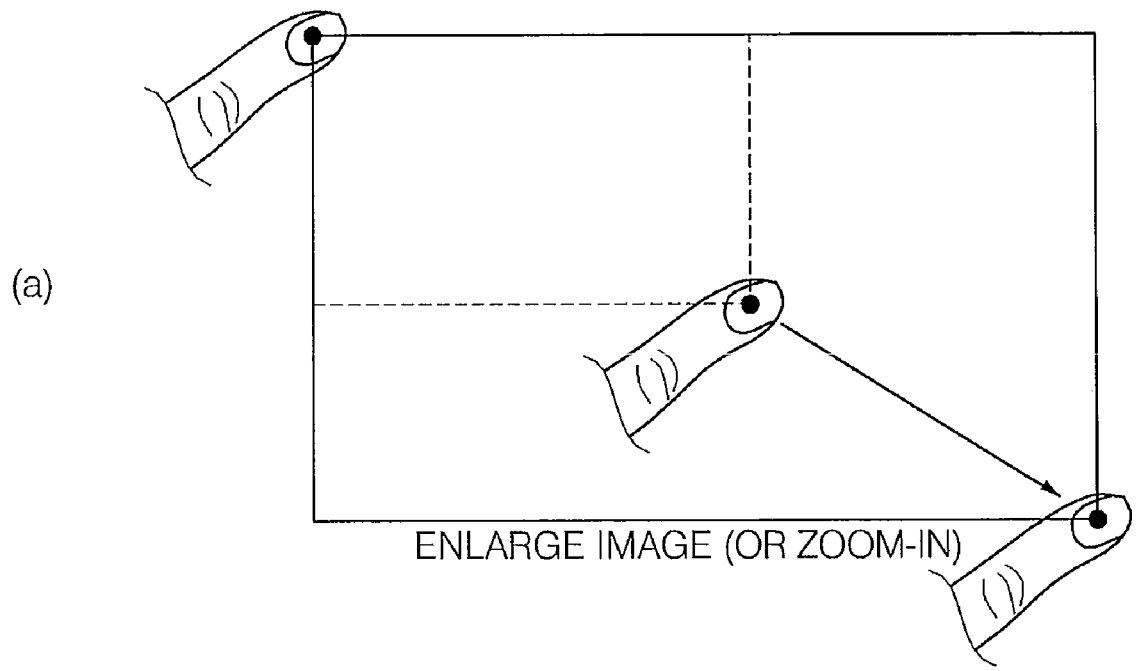
Figure 51:
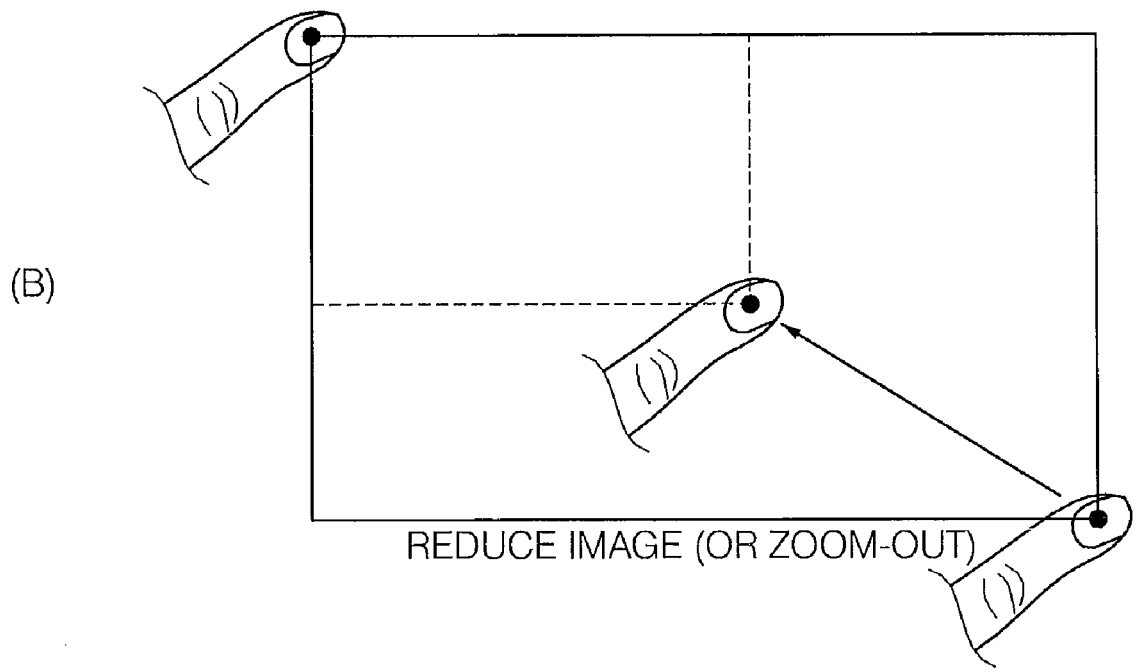
Figure 52:
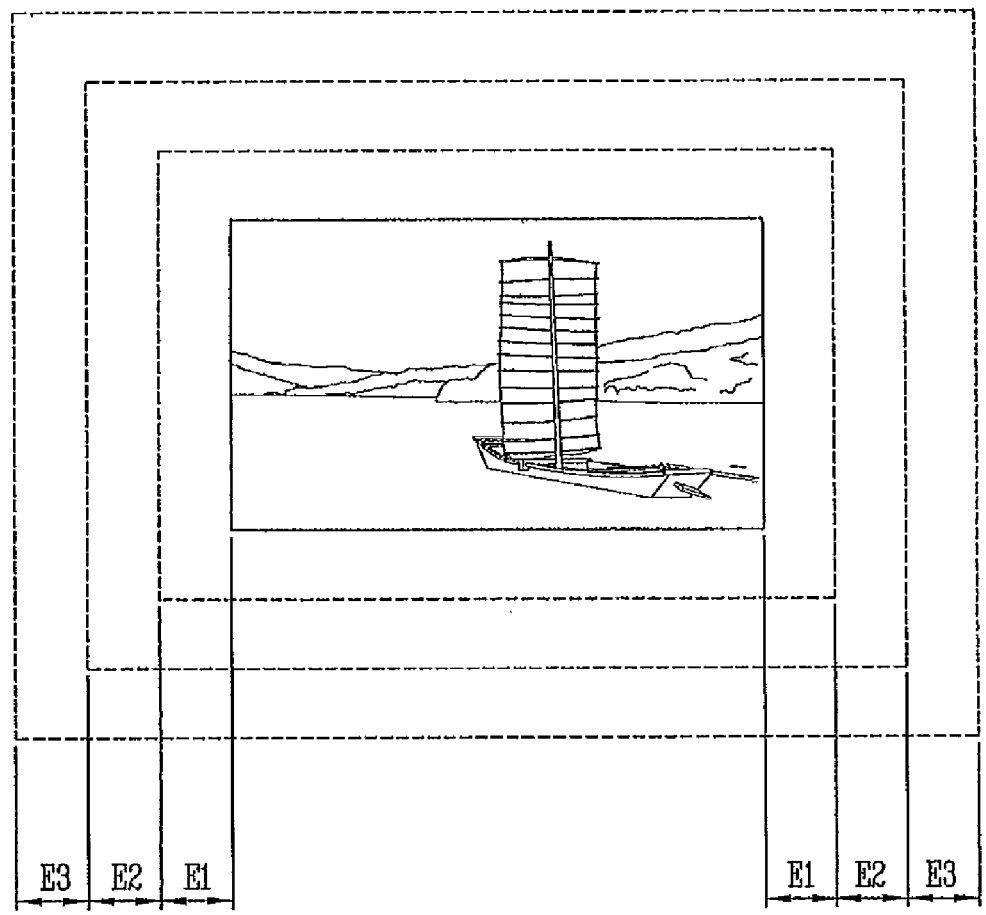
Figure 52:
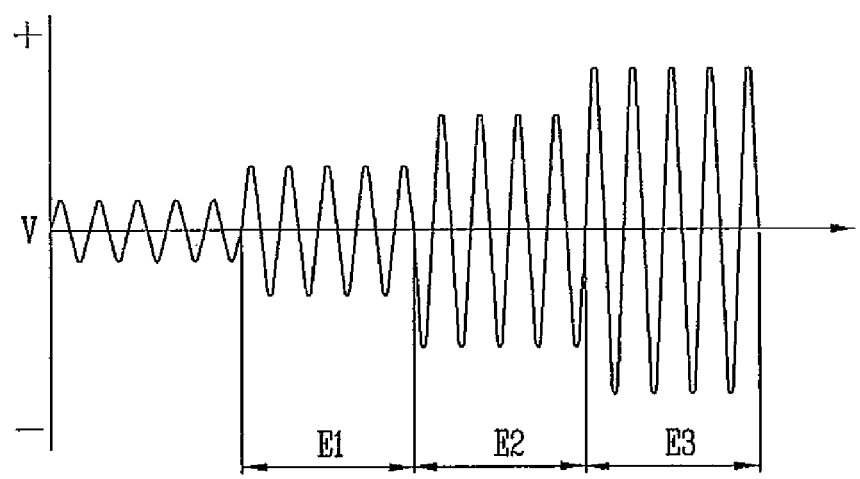

FIG. 51 includes diagrams showing how to enlarge or reduce an image in response to a multi-touch input, and FIG. 52 includes diagrams showing how to vary the intensity of vibration according to the degree of enlargement or reduction of an image. Referring to FIG. 51, if the user enlarges or reduces an image by generating a multi-touch input, the controller 180 may generate vibration while varying the intensity of the vibration. Therefore, it is possible for the user to perceive the enlargement or reduction of an image based on variations in the intensity of vibration generated by the mobile terminal 100. Referring to FIG. 52, the controller 180 may increase the intensity of vibration whenever a button for enlarging an image (or a zoom-in button) is pressed. In addition, the controller 180 may reduce the intensity of vibration whenever a button for reducing an image (or a zoom-out button) is pressed. In this manner, the controller 180 may increase or reduce the intensity of vibration in stages.

The mobile terminal and corresponding method according to embodiments of the present invention are not restricted to the exemplary embodiments set forth herein. Therefore, variations and combinations of the exemplary embodiments set forth herein may fall within the scope of the present invention. Further, the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to embodiments of the present invention, it is possible to notify a user of variations in an image displayed by a mobile terminal, variations in the operating state of the mobile terminal or the result of processing a user command by outputting various haptic effects. Therefore, it is possible for a user to easily determine the state of a mobile terminal not only based on his or her vision but also based on his or her sense of touch and thus to effectively control the operation of the mobile terminal. In addition, it is possible to add a sense of realism to a moving image or a game by providing a haptic effect with directivity. Therefore, it is possible to provide various synthetic effects.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   pre-storing a plurality of haptic vibrations respectively representing different variations in a screen image, the plurality of haptic vibrations having different patterns or intensities according to the variations in the screen image;
   displaying a first screen image corresponding to an execution of a function on a display module;
   detecting a variation of display in a screen being displayed by the display module, the detected variation comprising a variation of display in the first screen image, a variation of displaying a popup window on the first screen image, a variation of displaying a second screen image corresponding to a predetermined operation instead of the first screen image or a variation of a brightness of the screen being displayed by the display module;
   selecting a haptic vibration corresponding to the detected variation from the plurality of haptic vibrations; and
   generating the selected haptic vibration using at least one vibration module disposed on the mobile terminal in which the at least one vibration module is activated to represent the detected variation,
   wherein an intensity of the selected haptic vibration is automatically adjusted according to a brightness level of the screen currently being displayed by the display module if the detected variation is the variation of the brightness of the screen.

2. The method of claim 1, wherein a plurality of vibration modules are disposed at different positions on the mobile terminal.

3. The method of claim 2, wherein a first vibration module is disposed in a central area of the mobile terminal and at least one second vibration module is disposed at an area outside of the central area of the mobile terminal.

4. The method of claim 1, wherein when the function currently being executed on the mobile terminal is a web browser function corresponding to a particular webpage, the generating step first activates at least one second vibration module and then activates a first vibration module to represent a change of an item displayed on the particular webpage.

5. The method of claim 1, wherein when the function currently being executed on the mobile terminal is a web browser function corresponding to a particular webpage, the generating step first activates a first vibration module and then activates at least one second vibration module to represent data has been successfully transferred to the particular webpage.

6. The method of claim 1, wherein the detected variation in the first screen image includes an appearance of a new indicator icon on the first screen image or a disappearance of an existing indicator icon on the first screen image.

7. The method of claim 1, wherein the detected variation in the first screen image includes a change of a shape of at least one indicator icon on the first screen image.

8. The method of claim 1, wherein the detected variation in the first screen image includes a change of a scale of the first screen image.

9. The method of claim 1, wherein the detected variation in the first screen image includes a rotation of the first screen image.

10. The method of claim 1, wherein the detected variation in the first screen image includes a change of a shape of the first screen image.

11. A mobile terminal, comprising:
    a wireless communication unit configured to wirelessly communicate with at least one other terminal;
    a memory configured to store in advance a plurality of haptic vibrations respectively representing different variations in a screen image, the plurality of haptic vibrations having different patterns or intensities according to the variations in the screen image;
    a display module configured to display a first screen image corresponding to an execution of a function on a display module;
    at least one vibration module disposed on the mobile terminal; and
    a controller configured to detect a variation of display in a screen being displayed by the display module, to select a haptic vibration corresponding to the detected variation from the plurality of haptic vibrations stored in the memory, and to activate the at least one vibration module to generate the selected haptic vibration,
    wherein the detected variation comprises a variation of display in the first screen image, a variation of displaying a popup window on the first screen image, a variation of displaying a second screen image corresponding to a predetermined operation instead of the first screen image or a variation of a brightness of the screen being displayed by the display module, and
    wherein an intensity of the selected haptic vibration is automatically adjusted according to a brightness level of the screen currently being displayed by the display module if the detected variation is the variation of the brightness of the screen.

12. The mobile terminal of claim 11, wherein a plurality of vibration modules are disposed at different positions on the mobile terminal.

13. The mobile terminal of claim 12, wherein a first vibration module is disposed in a central area of the mobile terminal and at least one second vibration module is disposed at an area outside of the central area of the mobile terminal.

14. The mobile terminal of claim 11, wherein when the function currently being executed on the mobile terminal is a web browser function corresponding to a particular webpage, the controller is further configured to first activate at least one second vibration module and then activate a first vibration module to represent a change of an item displayed on the particular webpage.

15. The mobile terminal of claim 11, wherein when the function currently being executed on the mobile terminal is a web browser function corresponding to a particular webpage, the controller is further configured to first activate a first vibration module and then activate at least one second vibration module to represent data has been successfully transferred to the particular webpage.

16. The mobile terminal of claim 11, wherein the detected variation in the first screen image includes an appearance of a new indicator icon on the first screen image or a disappearance of an existing indicator icon on the first screen image.

17. The method of claim 11, wherein the detected variation in the first screen image includes a change of a shape of at least one indicator icon on the first screen image.

18. The mobile terminal of claim 11, wherein the detected variation in the first screen image includes a change of a scale of the first screen image.

19. The mobile terminal of claim 11, wherein the detected variation in the first screen image includes a rotation of the first screen image.

20. The mobile terminal of claim 11, wherein the detected variation in the first screen image includes a change of a shape of the first screen image.

* * * * *